US012694660B2

(12) United States Patent
Solovyev et al.

(10) Patent No.: US 12,694,660 B2
(45) Date of Patent: Jul. 28, 2026

(54) INDEPENDENT POSITIONING OF AUXILIARY INFORMATION IN NEURAL NETWORK BASED PICTURE PROCESSING

(71) Applicant: HUAWEI TECHNOLOGIES CO., LTD., Shenzhen (CN)

(72) Inventors: Timofey Mikhailovich Solovyev, Munich (DE); Elena Alexandrovna Alshina, Munich (DE); Biao Wang, Shenzhen (CN); Alexander Alexandrovich Karabutov, Munich (DE); Mikhail Vyacheslavovich Sosulnikov, Munich (DE); Georgy Petrovich Gaikov, Munich (DE); Han Gao, Shenzhen (CN); Panqi Jia, Munich (DE); Esin Koyuncu, Munich (DE); Sergey Yurievich Ikonin, Moscow (RU); Semih Esenlik, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 18/479,611

(22) Filed: Oct. 2, 2023

(65) Prior Publication Data

US 2024/0161488 A1 May 16, 2024

Related U.S. Application Data

(63) Continuation of application No. PCT/RU2021/000137, filed on Apr. 1, 2021.

(51) Int. Cl.
*G06V 10/00* (2022.01)
*G06V 10/77* (2022.01)
(Continued)

(52) U.S. Cl.
CPC .......... *G06V 10/82* (2022.01); *G06V 10/7715* (2022.01); *G06V 20/46* (2022.01); *H04N 19/521* (2014.11); *H04N 19/91* (2014.11)

(58) Field of Classification Search
CPC .. G06N 3/02; G06N 3/04; G06N 3/08; G06N 3/042; G06N 3/045; G06N 3/047;
(Continued)

(56) References Cited

U.S. PATENT DOCUMENTS

| | | | | |
|---|---|---|---|---|
| 11,323,716 B2 * | 5/2022 | Galpin | ................ | H04N 19/132 |
| 11,716,469 B2 * | 8/2023 | Li | .......................... | H04N 19/91 |
| | | | | 375/240.03 |

(Continued)

FOREIGN PATENT DOCUMENTS

| | | |
|---|---|---|
| JP | 2021520162 A | 8/2021 |
| JP | 2024510433 A | 3/2024 |

(Continued)

OTHER PUBLICATIONS

Lu et al., "[EE] Tests on Decomposition, Compression, Synthesis (DCS)-based Technology," Document: JVET-U0096, Joint Video Experts Team (JVET) of ITU-T SG 16 WP 3 and ISO/IEC JTC 1/SC 29 21st Meeting, by teleconference, total 9 pages (Jan. 6-15, 2021).

(Continued)

*Primary Examiner* — Amir Alavi
(74) *Attorney, Agent, or Firm* — Leydig, Voit & Mayer, Ltd.

(57) ABSTRACT

This application provides methods and apparatuses for processing of picture data or picture feature data using a neural network with two or more layers. The present disclosure may be applied in the field of artificial intelligence (AI)-based video or picture compression technologies, and in particular, to the field of neural network-based video compression technologies. According to some embodiments, (Continued)

two kinds of data are combined during the processing including processing by the neural network. The two kinds of data are obtained from different stages of processing by the network. Some of the advantages may include greater scalability and a more flexible design of the neural network architecture which may further lead to better encoding/decoding performance.

23 Claims, 27 Drawing Sheets

(51) Int. Cl.

| | |
|---|---|
| *G06V 10/82* | (2022.01) |
| *G06V 20/40* | (2022.01) |
| *H04N 19/513* | (2014.01) |
| *H04N 19/91* | (2014.01) |

(58) Field of Classification Search
CPC ........ G06N 3/082; G06N 3/088; G06N 3/092; G06N 3/0454; G06N 3/0475; G06N 3/0464; G06V 10/82; G06V 10/761; G06V 10/762; G06V 10/764; G06V 10/765; G06V 10/7715; G06V 10/85; G06V 20/46; H04N 19/51; H04N 19/513; H04N 19/105; H04N 19/13; H04N 19/132; H04N 19/139; H04N 19/147; H04N 19/184; H04N 19/46; H04N 19/521; H04N 19/91
See application file for complete search history.

(56) References Cited

U.S. PATENT DOCUMENTS

| | | | | |
|---|---|---|---|---|
| 11,758,168 | B2 * | 9/2023 | Ding | G06N 3/09 |
| | | | | 375/240.25 |
| 11,831,867 | B2 * | 11/2023 | Cricri | H04N 19/174 |
| 12,149,726 | B2 * | 11/2024 | Galpin | H04N 19/543 |
| 12,206,862 | B2 * | 1/2025 | Zhou | G06T 7/00 |
| 12,206,894 | B2 * | 1/2025 | Kim | H04N 19/436 |
| 12,323,596 | B2 * | 6/2025 | Dumas | H04N 19/176 |
| 12,439,029 | B2 * | 10/2025 | Kang | H04N 19/105 |
| 2019/0075301 | A1 | 3/2019 | Chou et al. | |
| 2021/0044804 | A1 | 2/2021 | Lu et al. | |
| 2023/0412820 | A1 * | 12/2023 | Yu | G06V 10/44 |

FOREIGN PATENT DOCUMENTS

| | | |
|---|---|---|
| WO | 2020107877 A1 | 6/2020 |
| WO | 2022197772 A1 | 9/2022 |
| WO | 2022211657 A1 | 10/2022 |

OTHER PUBLICATIONS

Lin et al., "Convolutional Neural Network-Based Block Up-Sampling for HEVC," IEEE Transactions on Circuits and Systems for Video Technology vol. 29, No. 12, XP011760926, pp. 3701-3715, Institute of Electrical and Electronics Engineers, New York, New York (Dec. 2019).

"Series H: Audiovisual and Multimedia Systems, Infrastructure of audiovisual services—Coding of moving video, High Efficiency video coding," Recommendation ITU-T H.265, total 664 pages, ITUT—International Union of Telecommunication, Geneva, Switzerland (Dec. 2016).

Ma et al.,"Image and Video Compression with Neural Networks:A Review," arxiv:1904.03567v2,XP055765818, IEEE Transactions on Circuits and Systems for Video Technology, pp. 1-16, Institute of Electrical and Electronics Engineers, New York, New York (Apr. 10, 2019).

Boyce et al.,"JVET common test conditions and software reference configurations," Document: JVET-J1010-v1, Joint Video Experts Team (JVET) of ITU-T SG 16 WP 3 and ISO/IEC JTC 1/SC 29/WG 11 10th Meeting:San Diego, US, total 5 pages (Apr. 10-20, 2018).

Song et al., "Neural Network-Based Arithmetic Coding of Intra Prediction Modes in HEVC," arxiv:1709.05737v1, XP081291879, total 4 pages (Sep. 18, 2017).

Cui et al.,"G-VAE: A Continuously Variable Rate Deep Image Compression Framework," arXiv preprint arXiv:2003.02012v2, total 8 pages (Apr. 22, 2020).

Schiopu et al.,"CNN-Based Intra-Prediction for Lossless HEVC," IEEE Transactions on Circuits and Systems for Video Technology, vol. 30, No. 7, XP011796774, total 13 pages, Institute of Electrical and Electronics Engineers, New York, New York (Jul. 2020).

Cooley et al.,"An Algorithm for the Machine Calculation of Complex Fourier Series," Mathematics of Computation, vol. 19, No. 90, total 6 pages (Apr. 1965).

Sze et al., "High Efficiency Video Coding (HEVC):Algorithms and Architectures," total 384 pages (2014).

Hassaballah et al., "Recent Advances in Computer Vision: Theories and Applications," total 430 pages (2019).

Ballé et al.,"Variational Image Compression with a Scale Hyperprior," ICLR 2018, arxiv:1802.01436v2, total 23 pages (May 1, 2018).

Guo et al., "3-D Context Entropy Model for Improved Practical Image Compression," 3rd Challenge on Learned Image Compression, total 4 pages (2020).

* cited by examiner

Fig. 10

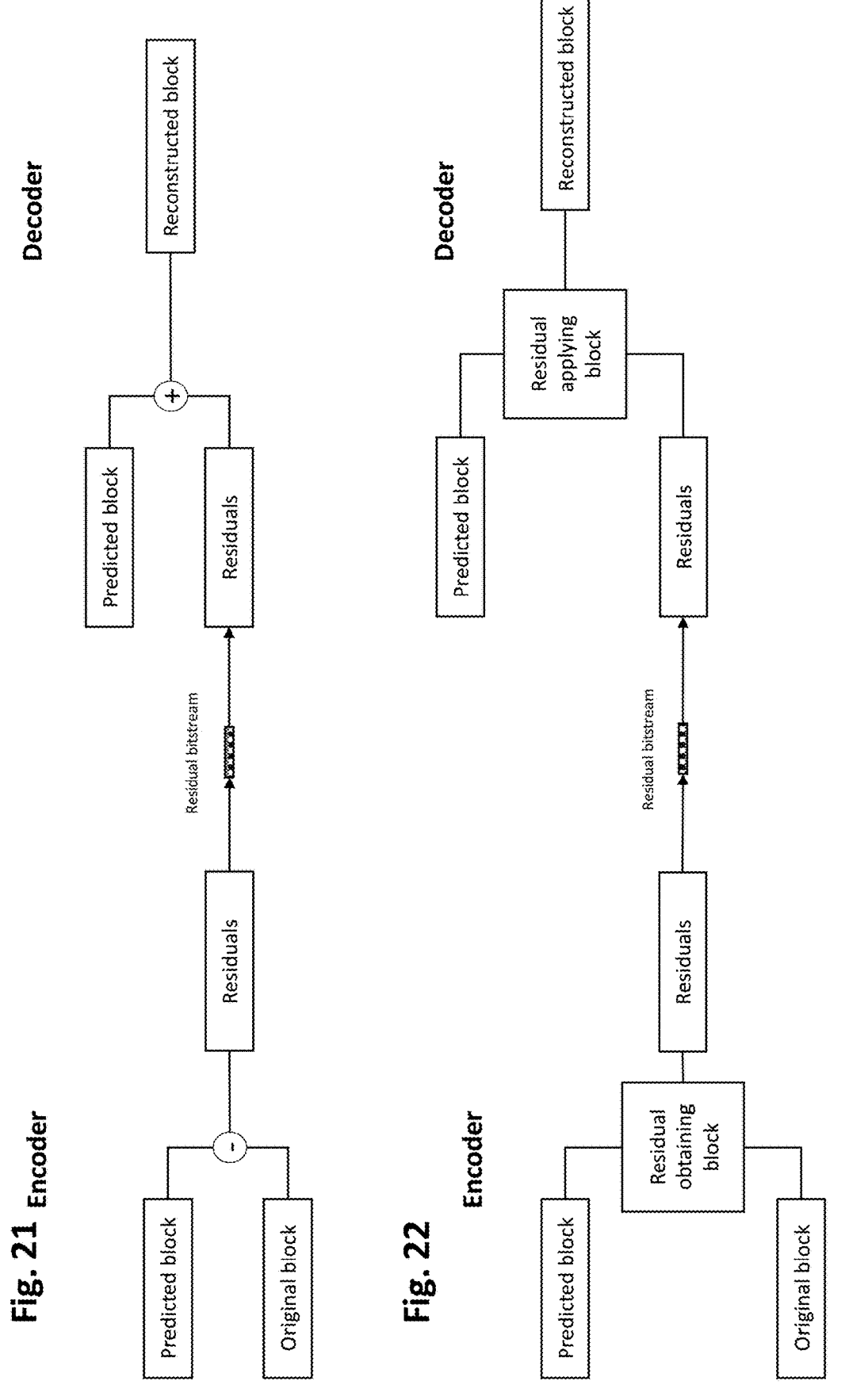

Fig. 25

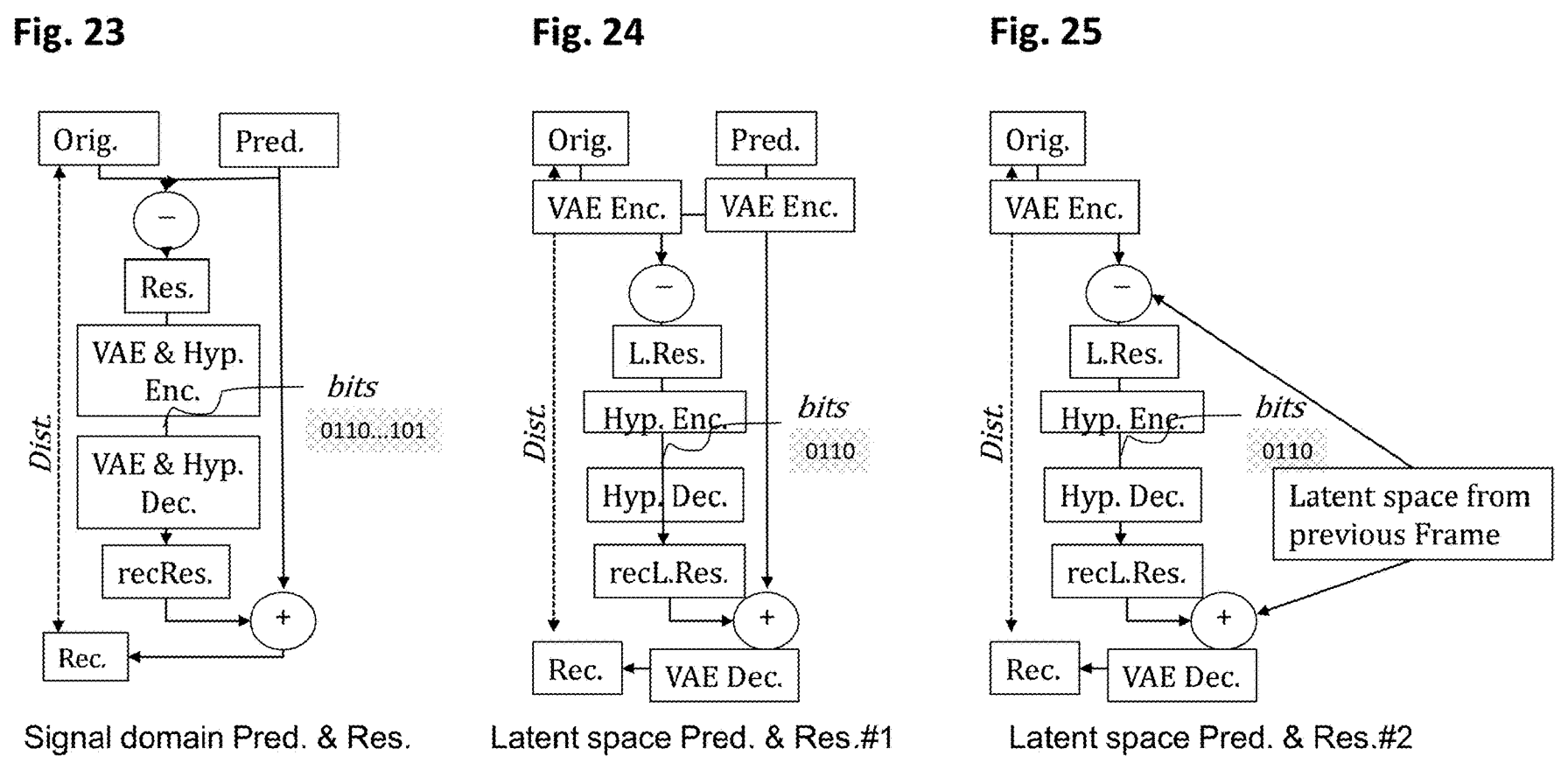

Latent space from previous Frame

*bits* 0110

Orig.

VAE Enc.

−

L.Res.

Hyp. Enc.

Hyp. Dec.

recL.Res.

+

VAE Dec.

Rec.

*Dist.*

Latent space Pred. & Res.#2

Fig. 24

Pred.

VAE Enc.

Orig.

VAE Enc.

−

L.Res.

*bits* 0110

Hyp. Enc.

Hyp. Dec.

recL.Res.

+

VAE Dec.

Rec.

*Dist.*

Latent space Pred. & Res.#1

Fig. 23

Pred.

Orig.

−

Res.

*bits* 0110...101

VAE & Hyp. Enc.

VAE & Hyp. Dec.

recRes.

+

Rec.

*Dist.*

Signal domain Pred. & Res.

500

INDEPENDENT POSITIONING OF AUXILIARY INFORMATION IN NEURAL NETWORK BASED PICTURE PROCESSING

CROSS-REFERENCE TO RELATED APPLICATIONS

This application is a continuation of International Application No. PCT/RU2021/000137, filed on Apr. 1, 2021, the disclosure of which is hereby incorporated by reference in its entirety.

Embodiments of the present invention relate to the field of artificial intelligence (AI)-based video or picture compression technologies, and in particular, to methods and apparatuses for processing picture feature data to generate a bitstream or for processing to decode the picture feature data to a bitstream using a neural network.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video pictures. The compressed data is then received at the destination by a video decompression device that decodes the video data. With limited network resources and ever increasing demands of higher video quality, improved compression and decompression techniques that improve compression ratio with little to no sacrifice in picture quality are desirable.

In recent years, deep learning is gaining popularity in the fields of picture and video encoding and decoding.

SUMMARY

This application provides methods and apparatuses, which may improve configurability of a neural network and thereby achieve a higher efficiency.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

According to a first aspect, the present disclosure relates to a method for processing feature data of one or more pictures from a bitstream using a neural network which comprises two or more stages including a first stage and a second stage. The method comprises the steps of obtaining first data based on the bitstream, processing the first data using the neural network, and outputting the result of the processing. The processing includes: obtaining second data, which is based on data processed previously by the neural network, from the second stage of the neural network; and using the first data together with the second data to generate input to the first stage of the neural network, wherein the first stage precedes the second stage in the feature data processing of the neural network.

Obtaining of two kinds of data that are used together in one stage wherein the obtaining of at least one of the kinds of data is performed on another stage further increases the flexibility of the neural network architecture and may result in higher efficiency in terms of reduced complexity or latency or rate, or higher quality.

In a possible implementation, the first data is obtained in a third stage of the neural network preceding the first stage and the second stage or equal to the first stage in the feature data processing of the neural network.

Obtaining the first data and the second data from different stages may further improve the efficiency.

In a possible implementation, the first data represents a prediction error and the second data represents a prediction.

The present disclosure is readily applicable to the prediction error and prediction signals. By obtaining at least one of them in a resolution different from the resolution in which they are combined may save complexity, bitstream length as well as latency. Moreover, prediction is auxiliary data which may improve performance of the decoding (and encoding) using neural networks, as in picture coding, there is a high correlation in spatial and temporal domain. Moreover, there are many approaches known fro the art, which may be very efficient for providing prediction.

In a possible implementation, the prediction is obtained by: obtaining reference feature data which is feature data outputted by the neural network at said second stage, obtaining, based on the bitstream, prediction information including motion information or spatial information related to the reference feature data, and generating the prediction based on the reference feature data and the prediction information.

This implementation is an example of obtaining the prediction with help of an additional prediction information that may help to further improve the prediction quality.

In a possible implementation, the prediction error is obtained by processing a current picture with the neural network. The prediction information is motion information and the reference feature data is generated by the neural network processing of picture data representing picture preceding the current picture in decoding order.

Temporal prediction is typically more efficient than the spatial prediction or only lossless coding. Thus, the above mentioned neural network architecture may further improve the performance of the decoding (as well as encoding).

In a possible implementation, the using the first data together with the second data includes element-wise addition of the prediction or re-scaled prediction with the prediction error or re-scaled prediction error.

Such combination may be particularly relevant for handling picture or picture feature data, prediction, and residuals.

In a possible implementation, the motion information includes motion vectors.

Motion vectors are efficient means for indicating motion information and there are many available approached for their obtaining and signaling which may be readily applied with the embodiments described herein.

In a possible implementation, said second stage is the output of the neural network.

Output of the neural network is the reconstructed picture (at the decoding side). Obtaining the second data from this stage provides the full resolution, which may improve the quality.

In a possible implementation, the first stage is the input of the neural network.

The input of the neural network at the decoding side is the encoded bitstream. The embodiments of the present disclosure may be effectively applied for decoding of the bottle-neck feature data.

In a possible implementation, the first stage is input of the neural network; the first data is entropy encoded data; the second stage is a stage different from the output stage of the neural network; and the second data is probability model data related to the feature data of the second stage. For example, the second data is probability model data for the entropy decoding of the first data.

Gathering of probability model data may enable further reduction of the bitstream size. Acquiring the probability model data from a different stage can provide flexible architecture for better tradeoff between the performance and the complexity.

In a possible implementation, the position of the first stage and/or the second stage are configurable within the neural network, and the method comprises configuring the position of the first stage and/or the second stage according to a gathering condition based on one or more picture coding parameters.

Possibilty of configuring the position of the first stage and the second stage within the neural network provides additional flexibility. It may enable dynamic neural network architecture change. Such flexibility may result to better adaption based on the gathering condition and lead to a more efficient encoding and/or decoding.

The gathering condition is a condition or prerequisite to be fulfilled in order for the second data and/or the first data to be input to a particular processing stage. The gathering condition may include a comparison with some picture characteristics or picture feature characteristics with a threshold to determine whether or not to gather the auxiliary information for a certain position. The picture characteristics or picture feature characteristics may be known to the encoder and the decoder so that no additional signaling is required. Alternatively or in addition, the gathering condition may be configured by an encoding side by means of setting an indicator of whether or not the auxiliary information is to be gathered for a preconfigures position. The indicator may be provided within a bitstream which is available at the decoder.

In particular, the method further comprises parsing from the bitstream a stage selection indicator specifying said first stage and/or said second stage, wherein the position of the first stage and the second stage within the neural network is configured according to the parsed stage selection indicator.

According to a second aspect, the present invention relates to a method for processing at least one picture using a neural network, which comprises two or more stages including a first stage and a second stage, to generate a bitstream, the method comprising processing the at least one picture with the neural network. The processing includes: obtaining first data based on the at least one picture, and obtaining second data at said second stage of the processing, the second data being based on data processed previously by the neural network, and using the first data together with the second data to generate input at said first stage of the neural network, wherein the first stage precedes the second stage in the feature data processing of the neural network. The method further includes inserting into the bitstream feature data obtained by the processing.

The encoding part of the present disclosure may provide the same advantages as mentioned above for the decoding part. The encoder prepares the bitstream and provides it to the decoder so that the decoder may decode or reconstruct the data with the desired quality and application in mind.

In order to avoid redundancy, the advantages provided for the corresponding decoding processing claims apply for the encoding in a similar manner.

In a possible implementation, the first data is obtained in a third stage of the neural network preceding said first stage and said second stage or equal to said first stage in the feature data processing of the neural network.

In a possible implementation, the first data represents a prediction error and the second data represents a prediction.

In a possible implementation, the prediction is obtained by: obtaining reference feature data which is feature data outputted by the neural network at said second stage, obtaining, based on the at least one picture, prediction information including motion information or spatial information related to the reference feature data, generating the prediction based on the reference feature data and the prediction information, and inserting the obtained prediction information into the bitstream.

In a possible implementation, the prediction error is obtained by processing a current picture with the neural network; and the prediction information is motion information and the reference feature data is generated by the neural network processing of picture data representing picture preceding the current picture in decoding order.

In a possible implementation, the using the first data together with the second data includes element-wise subtraction of the prediction or re-scaled prediction from the first data or re-scaled first data.

In a possible implementation, the motion information includes motion vectors.

In a possible implementation, said second stage is the output of the decoding neural network representing reconstructed picture data.

In a possible implementation, said first stage is the output of the neural network.

In a possible implementation, the first stage is output of the neural network; the first data is processed data to be entropy encoded; the second stage is a stage different from the input stage of the neural network; and the second data is probability model data related to the feature data of the second stage.

In a possible implementation, the second data is probability model data for the entropy encoding of the first data.

In a possible implementation, the position of said first stage and/or said second stage are configurable within the neural network, and the method comprises configuring the position of said first stage and/or said second stage according to a gathering condition based on one or more picture coding parameters.

In a possible implementation, the method further comprises determining and including into the bitstream a stage selection indicator specifying said first stage and/or said second stage, and wherein the position of the first stage and the second stage within the neural network is configured according to the determined stage selection indicator.

In a possible implementation, the determining of the stage selection indicator is based on an optimization procedure performed according to a cost function including one or more of rate, distortion, latency, accuracy, and complexity.

Determination of the stage(s) based on a cost function may improve the adaption of the neural network and the result to the desired requirements. Thus, such optimization may improve the performance. In combination with indicating the so obtained stage(s) position, the flexibility is further improved.

According to a third aspect, the present disclosure relates to an apparatus for processing feature data of one or more pictures from a bitstream using a neural network which comprises two or more stages including a first stage and a second stage, the apparatus comprising processing circuitry. The processing circuitry is configured to: obtain first data based on the bitstream, process the first data using the neural network, and output the result of the processing. The processing includes obtaining second data, which is based on data processed previously by the neural network, from the second stage of the neural network; and using the first data together with the second data to generate input to the first stage of the neural network, wherein the first stage precedes the second stage in the feature data processing of the neural network For advantageous effect of the present disclosure, refer to the descriptions of the first aspect. Details are not described herein again. The decoding apparatus has a function of implementing an action in the method example in the first aspect. The function may be implemented by hardware, or may be implemented by hardware executing corresponding software. The hardware or the software includes one or more modules corresponding to the foregoing function. In a possible implementation, the decoding apparatus includes: a bitstream decoding module for obtaining the first data based on the bitstream; and a neural network module, configured to perform the above mentioned processing and outputting. These modules may perform corresponding functions in the method example in the first aspect. For details, refer to the detailed descriptions in the method example. Details are not described herein again.

According to a fourth aspect, the present disclosure relates to an apparatus for processing at least one picture using a neural network, which comprises two or more stages including a first stage and a second stage, to generate a bitstream, the apparatus comprising processing circuitry. The processing circuitry is configured to process the at least one picture with the neural network. The processing includes obtaining first data based on the at least one picture, obtaining second data at said second stage of the processing, the second data being based on data processed previously by the neural network, and using the first data together with the second data to generate input at said first stage of the neural network, wherein the first stage precedes the second stage in the feature data processing of the neural network. The method further includes including into the bitstream feature data obtained by the processing.

For advantageous effect of the present invention, refer to the descriptions of the second aspect. Details are not described herein again. The encoding apparatus has a function of implementing an action in the method example in the second aspect. The function may be implemented by hardware, or may be implemented by hardware executing corresponding software. The hardware or the software includes one or more modules corresponding to the foregoing function. In a possible implementation, the encoding apparatus includes: a neural network module, configured to perform the above mentioned processing; and a bitstream output module, configured to insert into the bitstream data obtained processing the picture by the neural network and output the bitstream. These modules may perform corresponding functions in the method example in the second aspect. For details, refer to the detailed descriptions in the method example. Details are not described herein again.

The method according to the first aspect of the present invention may be performed by the apparatus according to the third aspect of the present invention. Other features and implementations of the method according to the first aspect of the present invention directly depend on functionalities and implementations of the apparatus according to the third aspect of the present invention.

The method according to the second aspect of the present invention may be performed by the apparatus according to the fourth aspect of the present invention. Other features and implementations of the method according to the second aspect of the present invention directly depend on functionalities and implementations of the apparatus according to the fourth aspect of the present invention.

According to a fifth aspect, the present invention relates to a video stream decoding apparatus, including a processor and a memory. The memory stores instructions that cause the processor to perform the method according to the first aspect.

According to a sixth aspect, the present invention relates to a video stream encoding apparatus, including a processor and a memory. The memory stores instructions that cause the processor to perform the method according to the second aspect.

According to a seventh aspect, a computer-readable storage medium having stored thereon instructions that when executed cause one or more processors to encode video data is proposed. The instructions cause the one or more processors to perform the method according to the first or second aspect or any possible embodiment of the first or second aspect.

According to an eighth aspect, the present invention relates to a computer program product including program code for performing the method according to the first or second aspect or any possible embodiment of the first or second aspect when executed on a computer.

Details of one or more embodiments are set forth in the accompanying drawings and the description below. Other features, objects, and advantages will be apparent from the description, drawings, and claims.

BRIEF DESCRIPTION OF DRAWINGS

In the following embodiments of the present invention are described in more detail with reference to the attached figures and drawings, in which:

FIG. 10 is a block diagram illustrating an exemplary configurable conditional auto-encoder with one selectable positions for gathering the auxiliary information.

FIG. 21 is a block diagram illustrating possible handling of residuals and prediction according to a first exemplary implementation.

FIG. 22 is a block diagram illustrating possible handling of residuals and prediction according to a second exemplary implementation.

FIG. 23 is a block diagram illustrating an exemplary overview architecture of handling prediction and residuals in the signal domain.

FIG. 24 is a block diagram illustrating an exemplary overview architecture of handling prediction and residuals in the latent space.

FIG. 25 is a block diagram illustrating an exemplary overview architecture of handling prediction and residuals in the latent space, but the latent space of the prediction being from processing of a preceding picture.

DETAILED DESCRIPTION

Figure 1:
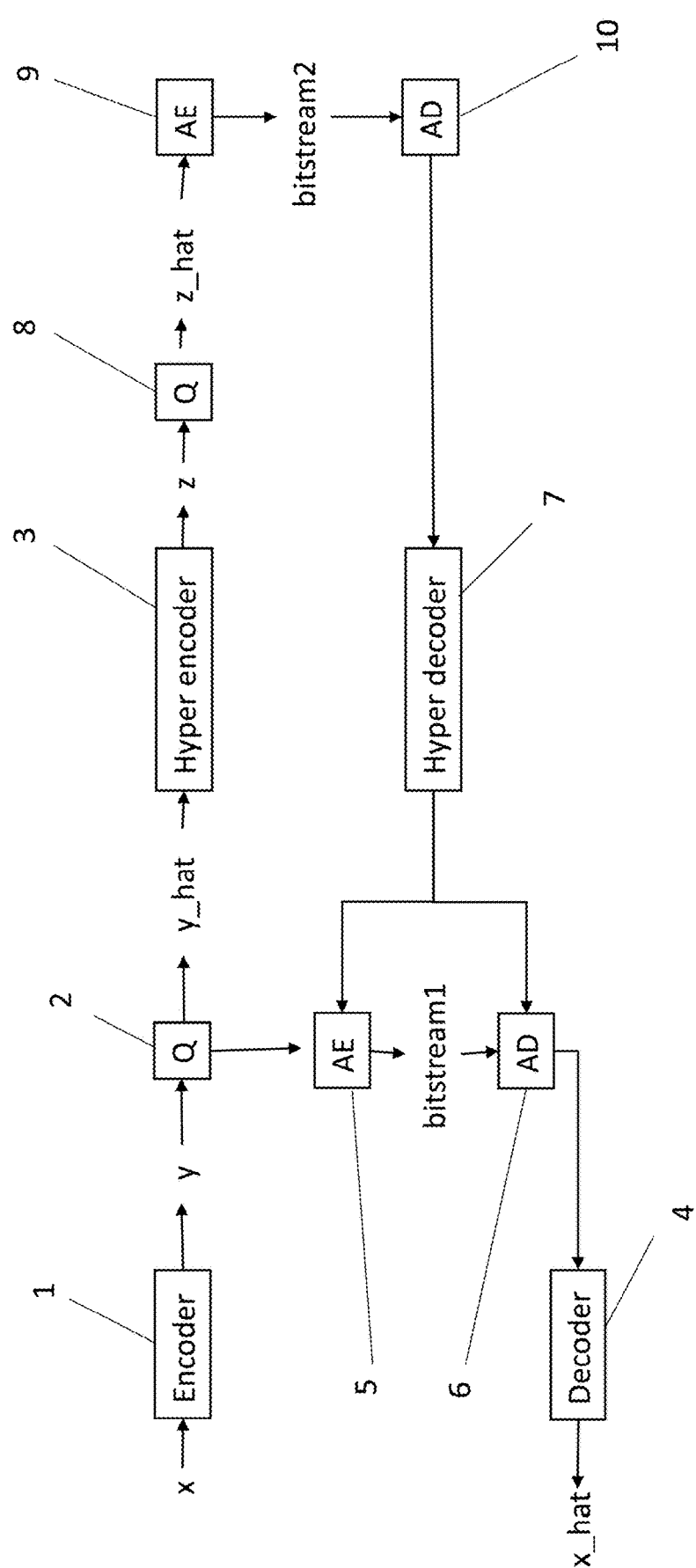
FIG. 1 is a block diagram illustrating an exemplary network architecture for encoder and decoder side including a hyper prior model.

Embodiments of this application provide an AI-based video picture compression technology, in particular, provide a neural network-based video compression technology.

Video coding typically refers to processing of a sequence of pictures, where the sequence of pictures forms a video or a video sequence. In the field of video coding, the terms "picture (picture)", "frame (frame)", and "image (image)" may be used as synonyms. Video coding (or coding in general) includes two parts video encoding and video decoding. Video encoding is performed at the source side, typically including processing (for example, by compression) the original video pictures to reduce the amount of data required for representing the video pictures (for more efficient storage and/or transmission). Video decoding is performed on a destination side, and typically includes inverse processing in comparison with processing of the encoder to reconstruct the video picture. Embodiments referring to "coding" of video pictures (or pictures in general) shall be understood to relate to "encoding" or "decoding" of video pictures or respective video sequences. A combination of an encoding part and a decoding part is also referred to as CODEC (encoding and decoding).

In a case of lossless video coding, an original video picture can be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side. In other words, quality of a reconstructed video picture is lower or poorer than that of the original video picture.

Several H.26x video coding standards (e.g. H.261, H.263, H.264, H.265, H.266) are used for "lossy hybrid video coding" (that is, spatial and temporal prediction in a sample domain is combined with 2D transform coding for applying quantization in a transform domain). Each picture of a video sequence is typically partitioned into a set of non-overlapping blocks, and coding is typically performed at a block level. To be specific, at an encoder side, a video is usually processed, that is, encoded, at a block (video block) level. For example, a prediction block is generated through spatial (intra-picture) prediction and temporal (inter-picture) prediction, the prediction block is subtracted from a current block (block being processed or to be processed) to obtain a residual block, and the residual block is transformed in the transform domain and quantized to reduce an amount of data that is to be transmitted (compressed). At a decoder side, an inverse processing part relative to the encoder is applied to an encoded block or a compressed block to reconstruct the current block for representation. Furthermore, the encoder duplicates the decoder processing loop such that both generate identical predictions (for example, intra- and inter predictions) and/or re-constructions for processing, that is, coding, the subsequent blocks.

The present disclosure relates to processing picture data using a neural network for the purpose of encoding and decoding of the picture data. Such encoding and decoding may still refer to or comprise some components know from the framework of the above mentioned standards.

In the following, some terms used herein are briefly introduced.

Picture size: refers to the width or height or the width-height pair of a picture. Width and height of an image is usually measured in number of luma samples.

Downsampling: downsampling is a process, where the sampling rate of the discrete input signal is reduced. For example if the input signal is an image which has a size of h and w, and the output of the downsampling is h2 and w2, at least one of the following holds true:

h2<h w2<w

In one example implementation downsampling can be implemented as keeping only each m-th sample, discarding the rest of the input signal (e.g. image). However, downsampling may be performed by other means such as by a convolution or other filtering, or the like.

Upsampling: upsampling is a process, where the sampling rate of the discrete input signal is increased. For example if the input image has a size of h and w, and the output of the downsampling is h2 and w2, at least one of the following holds true:

h<h2 w<w2

Resampling: downsampling and upsampling processes are both examples of resampling. Resampling is a process where the sampling rate (sampling interval) of the input signal is changed.

Sampling ratio: If picture size is changed during resampling process (up- or down-sampling) the ratio between output and input picture size is called sampling ratio. Sampling ratio could be different for horizontal and vertical dimension.

Interpolation filtering: During the upsampling or downsampling processes filtering can be applied to improve the accuracy of the resampled signal and to reduce the aliasing affect. Interpolation filter usually includes weighted combination of sample values at sample positions around the resampling position. It can be implemented as:

$$f(x_r, y_r) = \Sigma s(x, y) C(k)$$

Where f( ) is the resampled signal, $(x_r, y_r)$ are the coordinates in resampled image, $C(k)$ are interpolation filter coefficients and $s(x,y)$ are the samples of the input signal. The summation operation is performed for $(x,y)$ that are in the vicinity of $(x_r, y_r)$.

Cropping: Trimming off the outside edges of a digital image. Cropping can be used to make an image smaller (in number of samples) and/or to change the aspect ratio (length to width) of the image.

Padding: padding refers to increasing the size of an image by generating new samples (usually at the borders of the image) by e.g. using sample values that are pre-defined or by using sample values of the positions in the image or the like.

Resizing: Resizing is a general term where the size of the input image is changed. It might be done using one of the methods of padding or cropping. Or it can be done by resampling.

Integer division: Integer division is division in which the fractional part (remainder) is discarded.

Convolution: convolution is given by the following general equation. Below f( ) can be defined as the input signal and g( ) can be defined as the filter.

$$(f * g)[n] = \sum_{m=-\infty}^{\infty} f[m]g[n-m]$$

This convolution is a discrete convolution with n and m being sample indexes and thus integers. The range of the indexes n and m may depend on the signal size (dimensions) and the filter size. In general, in theory, it may range from minus infinity to infinity.

NN module: neural network module, a component of a neural network. It could be a layer or a sub-network in a neural network. Neural network is a sequence of one or more NN modules.

Position (stage) within pipeline: specifies a position within the processing pipeline in processing network, which may be or comprise a neural network. The position within the network may be specified, e.g., by the number of NN modules (or layers) preceding the position. Applying a transformation at the $i_{th}$ position of the pipeline means applying the transformation to the output of $i_{th}$ NN module and using the result of the transformation as the input of $(i+1)_{th}$ NN module. Applying a transformation at the $0_{th}$ position of the pipeline is interpreted as applying the transformation to the input of the NN. Applying a transformation at the $K_{th}$ position of the pipeline is interpreted as applying the transformation to the output of the NN.

Latent space: intermediate steps of neural network processing, latent space representation includes output of input layer or hidden layer(s), they are usually not supposed to be viewed.

Lossy NN module: information processed by a lossy NN module results in information loss, lossy module makes its processed information not revertible.

Lossless NN module: information processed by a lossless NN module results in no information loss, lossless processing makes its processed information revertible.

Bottleneck: latent space tensor which may be entered to a lossless coding module. The term bottleneck relates to the fact that the channel size is usually smaller than in preceding stages.

NN layer: a processing step of a neural network performing one processing operation on the input data.

Variational Auto-Encoder (VAE)

An exemplary deep learning based image and video compression algorithms follows the Variational Auto-Encoder (VAE) framework, e.g. Z. Cui, J. Wang, B. Bai, T. Guo, Y. Feng, "G-VAE: A Continuously Variable Rate Deep Image Compression Framework", arXiv preprint arXiv: 2003.02012, 2020.

FIG. 1 exemplifies the VAE framework. The VAE framework could be considered as a nonlinear transforming coding model. At the encoder side of the network, an encoder 1 maps an image x into a latent representation via the function y=f(x). The encoder may include or consist of a neural network. A quantizer 2 transforms the latent representation into discrete values, y_hat=Q(y) of a desired bitlength and/or precision. The quantized signal (latent space) y_hat is included into a bitstream (bitstream1) using arithmetic coding, denoted as AE standing for arithmetic encoder 5.

At the decoder side of the network, the encoded latent space is decoded from the bitstream by an arithmetic decoder AD 6. A decoder 4 that transforms the quantized latent representation which is output from the AD 6 into the decoded image, x_hat=g(y_hat). The decoder 4 may include or consist of a neural network.

In FIG. 1, two subnetworks are concatenated to each other. The first network comprises the above mentioned processing units 1 (encoder 1), 2 (quantizer), 4 (decoder), 5 (AE) and 6 (AD). At least the units 1, 2, and 4 are called the auto-encoder/decoder or simply the encoder/decoder network.

The second subnetwork comprises at least units 3 and 7 and is called a hyper encoder/decoder or context modeler. In particular, the second subnetwork models the probability model (context) for the AE 5 and the AD 6. An entropy model, or in this case the hyper encoder 3 estimates a distribution z of the quantized signal y_hat to come close to the minimum rate achievable with lossless entropy source coding. The estimated distribution is quantized by a quantizer 8 to obtain quantized probability model z_hat which represents side information that may be conveyed to the decoder side within a bitstream. In order to do so, an arithmetic encoder, AE 9 may encode the probability model into a bitstream2. Bitstream2 may be conveyed together with bitstream1 to the decoder side and provided also to the encoder. In particular, in order to be provided to the AE 5 and AD 6, the quantized probability model z_hat is arithmetically decoded by the AD 10 and then decoded with the hyper decoder 7 and inserted to AD6 and to AE 5.

Figure 2:
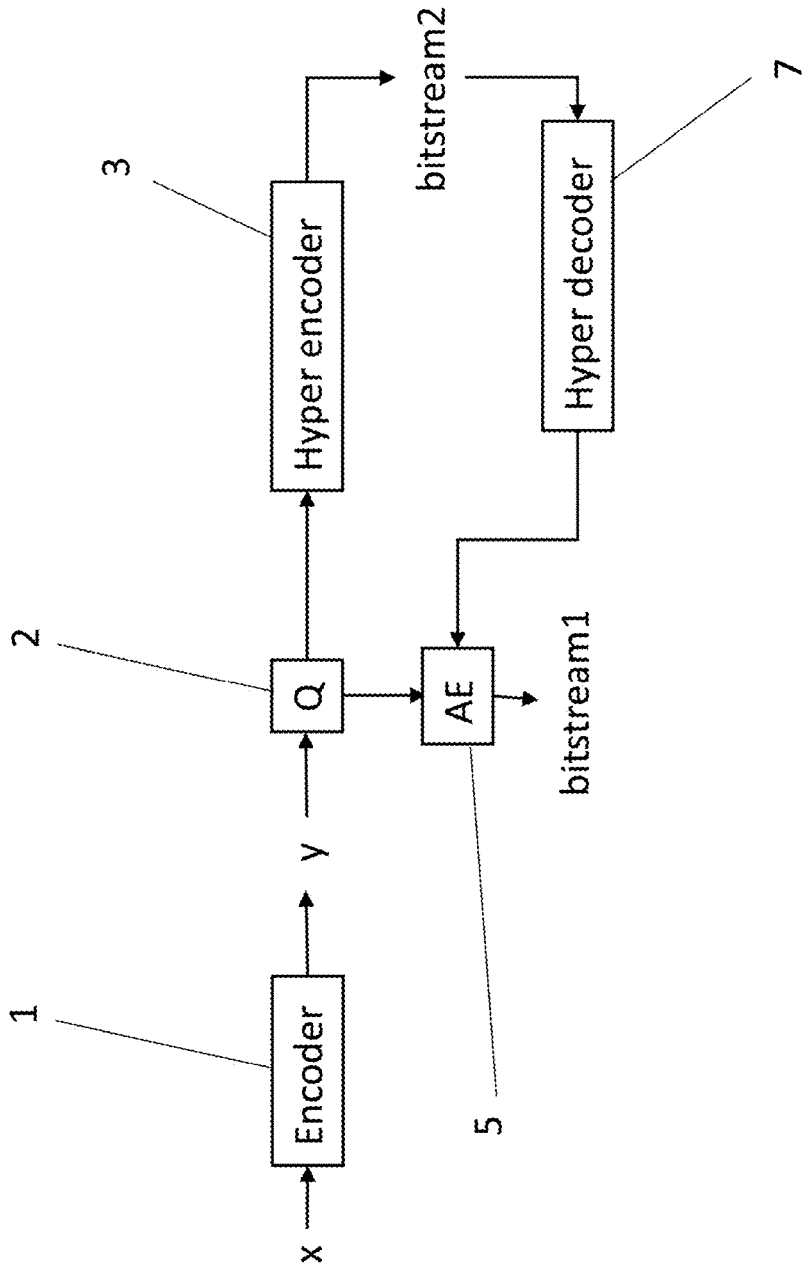
FIG. 2 is a block diagram illustrating a general network architecture for encoder side including a hyper prior model.
Figure 3:
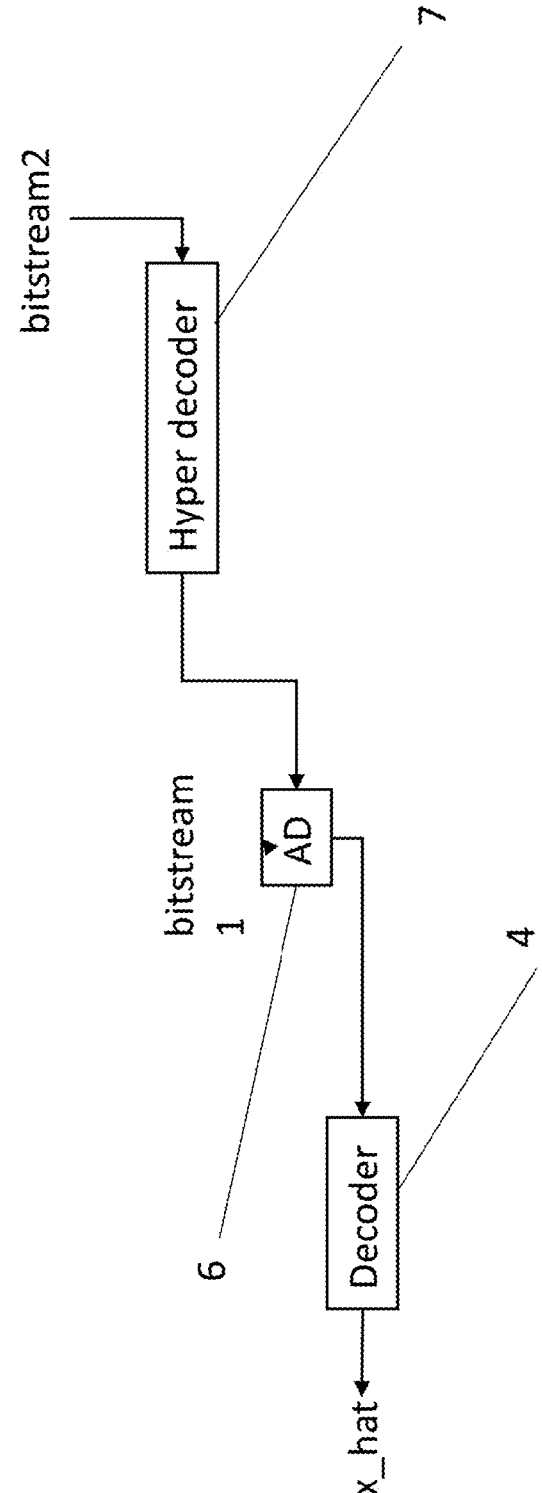
FIG. 3 is a block diagram illustrating a general network architecture for decoder side including a hyper prior model.

FIG. 1 depicts the encoder and the decoder in a single figure. On the other hand, FIGS. 2 and 3 shows an encoder and a decoder separately, as they may work separately. In other words, the encoder may generate the bitstream1 and the bitstream2. The decoder may receive such bitstream from storage, or via a channel or the like and may decode it without any further communication with the encoder. The above description of the encoder and decoder elements applies also for FIGS. 2 and 3.

Majority of Deep Learning based image/video compression systems reduce dimensionality of the signal before converting the signal into binary digits (bits).

In the VAE framework, for example, the encoder which is a non-linear transform, maps the input image x into y, where y has a smaller width and height than x. Since the y has a smaller width and height, hence a smaller size, the dimension of the signal is reduced, and hence it is easier to compress the signal y.

Figure 4:
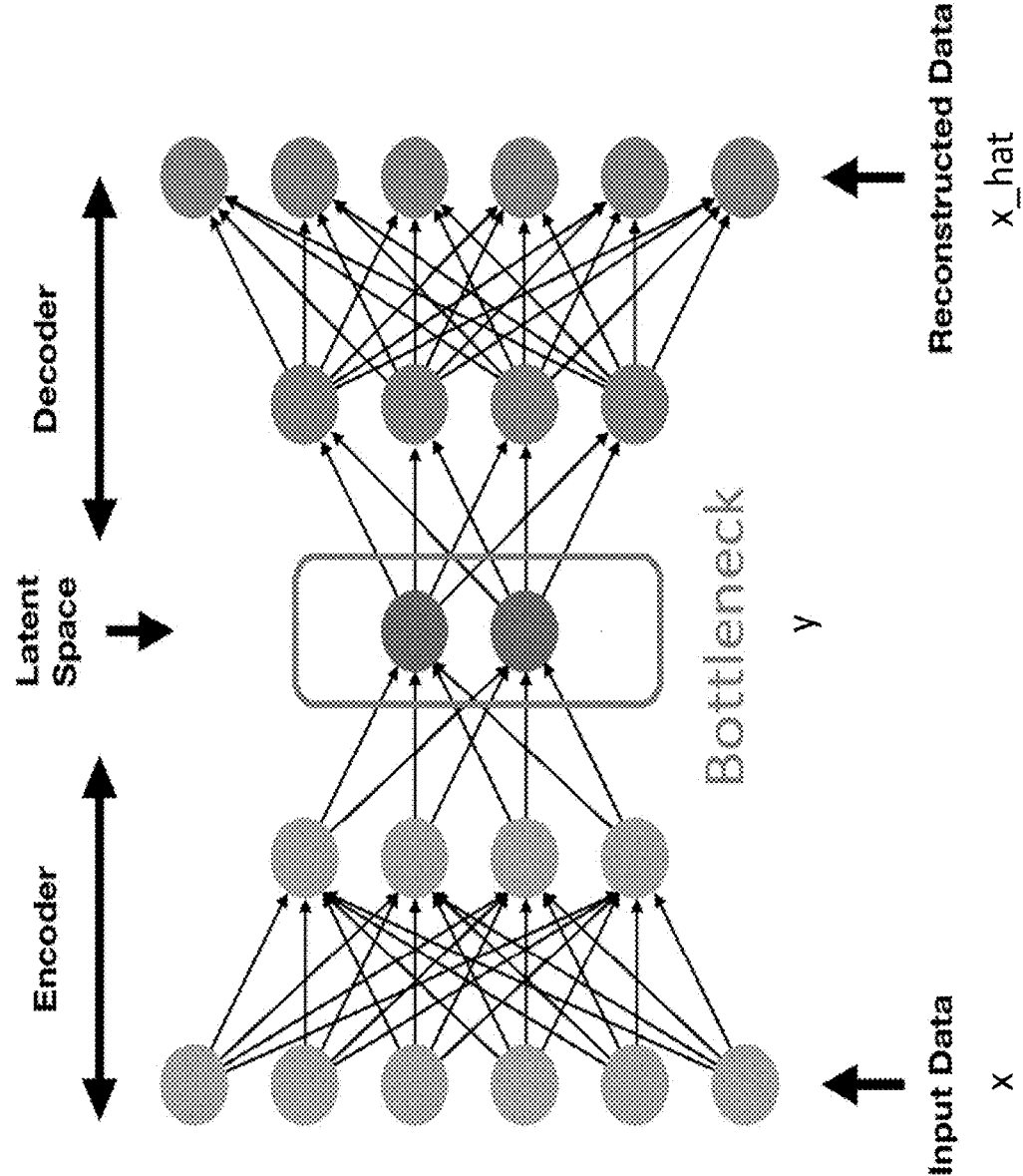
FIG. 4 is a schematic drawing illustrating a general scheme of an encoder and decoder based on a neural network.

A general principle of compression is exemplified in FIG. 4. The input image x corresponds to the input data, which is the input of the encoder. The transformed signal y corresponds to the latent space, which has a smaller dimensionality than the input signal and is thus also referred to as bottleneck. Typically, the dimensionality of the channels is smallest at this processing position within the encoder-decoder pipeline. Each column of circles in FIG. 4 represents a layer in the processing chain of the encoder or decoder. The number of circles in each layer indicate the size or the dimensionality of the signal at that layer. The latent space, which is the output of the encoder and input of the decoder, represents the compressed data y. At the decoder side, the latent space signal y (encoded image) is processed by the decoder neural network, leading to expanding the dimensions of the channels, until obtaining the reconstructed data x_hat which may have the same dimensions as the input data x, but differ from the input data x especially in case the lossy processing has been applied. The dimensions of the channels processed by the decoder layers is typically higher than the bottleneck data y dimensions. In other words, usually, the encoding operation corresponds to reduction in the size of the input signal, whereas the decoding operation corresponds to reconstruction of the original size of the image—thus the name bottleneck.

As mentioned above, reduction of the signal size may be achieved by down-sampling or rescaling. The reduction in the signal size usually happens step by step along the chain of processing layers, not all at once. For example if the input image x has dimensions of h and w (indicating the height and the width), and the latent space y has dimensions h/16 and w/16, the reduction of size might happen at 4 layers during the encoding, wherein each layer reduces the size of the signal by a factor of 2 in each dimension.

Figure 5:
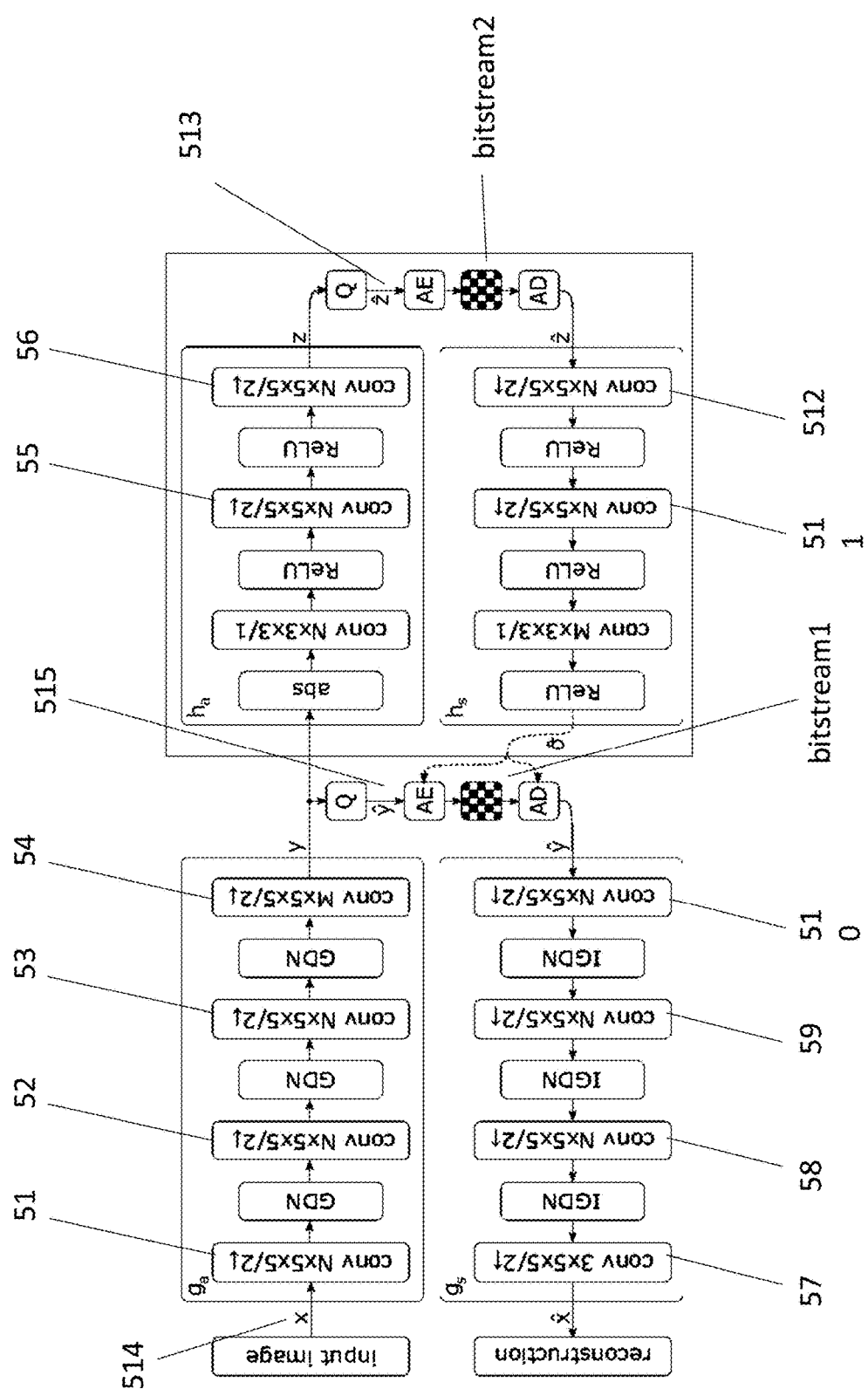
FIG. 5 is a block diagram illustrating an exemplary auto-variate encoder and decoder.

Known deep learning based video/image compression methods typically employ multiple downsampling layers. An exemplary VAE is shown in FIG. 5 and utilizes 6 downsampling layers that are marked with 51 to 56. The layers that include downsampling are indicated with the downward arrow in the layer description. The layer description "Conv Nx5x5/2↓" means that the layer is a convolution layer ("Conv"), with N channels and the convolution kernel is 5×5 samples in size. The "2↓" means that a downsampling with a factor of 2 is performed in this layer. Downsampling by a factor of 2 results in one of the dimensions of the input signal is reduced by half at the output. In FIG. 5, the 2↓ indicates that both width and height of the input image is reduced by a factor of 2. Since there are 6 downsampling layers halving the size in one dimension, if the width and height of the input image x (514) is given by w and h, the output signal z_hat (513) has width and height equal to w/64 and h/64 respectively.

In the first subnetwork, some convolutional layers are followed by generalized divisive normalization (GDN) at the encoder side and by the inverse GDN (IGDN) at the decoder side. In the second subnetwork, the activation function applied is rectified linear unit (ReLU). It is noted that the present disclosure is not limited to such implementation and in general, other activation functions may be used instead of GDN or ReLu.

The network architecture in FIG. 5 includes a hyper prior model. The left side ($g_a$, $g_s$) shows an image autoencoder architecture, the right side ($h_a$, $h_s$) corresponds to the auto-encoder implementing the hyper prior as described above with reference to FIG. 1 or 3. The model uses a similar architecture for the analysis and synthesis transforms $g_a$ and $g_s$. Q represents quantization, and AE, AD represent arithmetic encoder and arithmetic decoder, respectively, as also in the above described FIGS. 1 to 3. The encoder subjects the input image x to $g_a$, yielding the latent representation y with spatially varying standard deviations.

The results are fed into $h_a$, summarizing the distribution of standard deviations in z. z is then quantized, compressed, and transmitted as side information. The encoder uses the quantized vector z_hat 513 to estimate $\hat{\sigma}$, the spatial distribution of standard deviations which is used for obtaining probability values (or frequency values) for arithmetic coding (AE), and uses it to compress and transmit the quantized latent representation y_hat 515. The decoder first recovers z_hat from the compressed signal. It then uses $h_s$ to obtain y_hat, which provides it with the correct probability estimates to successfully recover y_hat as well. It then feeds y_hat into $g_s$ to obtain the reconstructed image.

The decoder comprises upsampling layers 57-59 and 510-512. A further layer 420 is provided between the upsampling layers 411 and 410 in the processing order of an input that is implemented as convolutional layer but does not provide an upsampling to the input received. A corresponding convolutional layer "conv Mx3x3/1" is also shown for the decoder. Such layers can be provided in NNs for performing operations on the input that do not alter the size of the input but change specific characteristics. However, it is not necessary that such a layer is provided.

When seen in the processing order of bitstream2 through the decoder, the upsampling layers are run through in reverse order, i.e. from upsampling layer 512 to upsampling layer 57. Each upsampling layer is shown here to provide an upsampling with an upsampling ratio of 2, which is indicated by the ↑. It is, of course, not necessarily the case that all upsampling layers have the same upsampling ratio and also other upsampling ratios like 3, 4, 8 or the like may be used. The layers 57 to 512 are implemented as convolutional layers (conv). Specifically, as they may be intended to provide an operation on the input that is reverse to that of the encoder, the upsampling layers may apply a deconvolution operation to the input received so that its size is increased by a factor corresponding to the upsampling ratio. However, the present disclosure is not generally limited to deconvolution and the upsampling may be performed in any other manner such as by bilinear interpolation between two neighboring samples, or by nearest neighbor sample copying, or the like.

Figure 6:
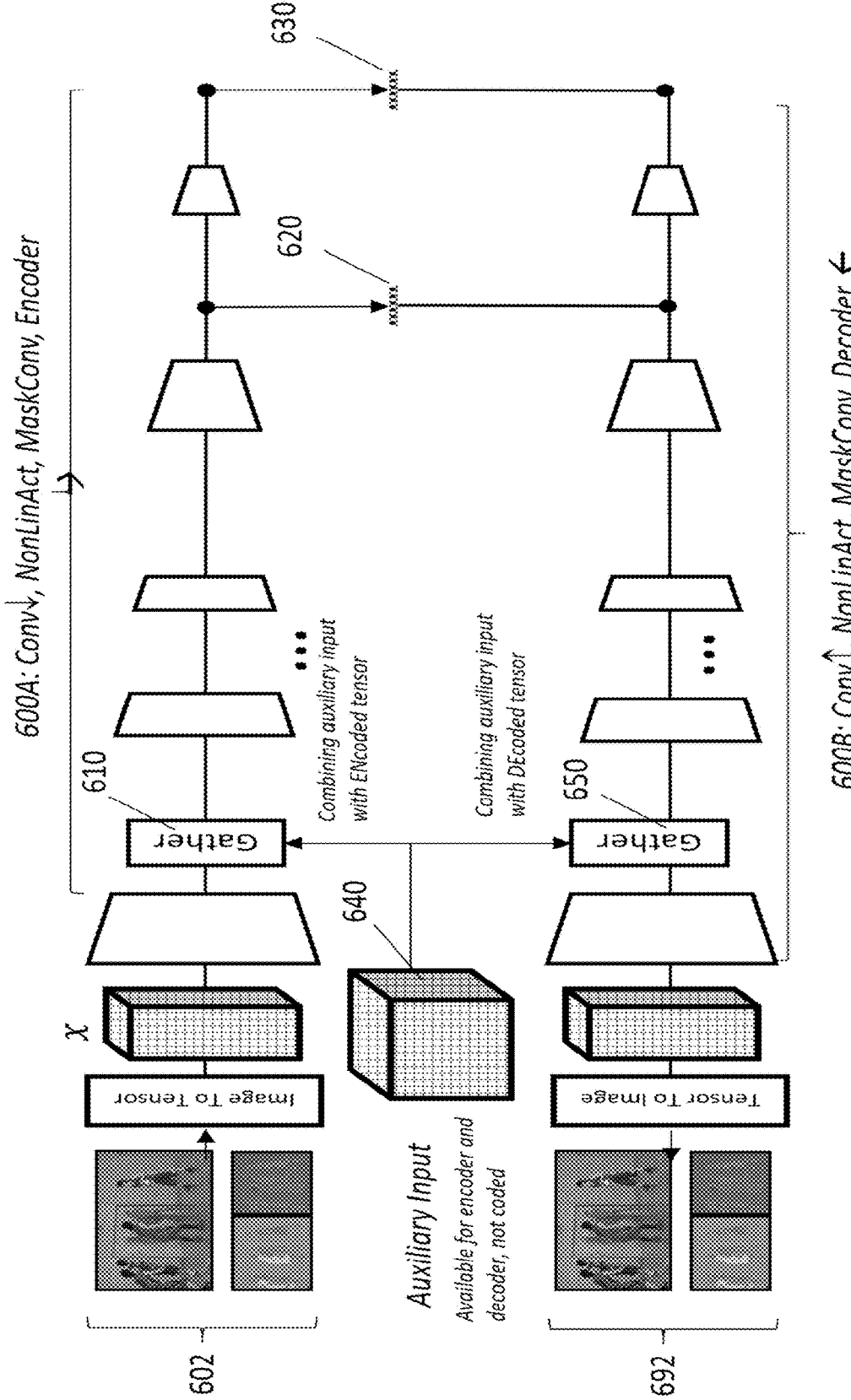
FIG. 6 is a general block diagram illustrating application of auxiliary information on a predefined stage of an encoding and a decoding neural network.

FIG. 6 illustrates a general diagram of a deep learning based picture (sill or video) codec, with auxiliary information applied after the first layer. The deep learning architecture may be any architecture including conditional autoencoders and hyper priors. Conditional VAE means that the network is conditioned by gathering an additional information referred to herein as auxiliary information. Such auxiliary information is processed by one or more layers of the NN together with the feature data. For example, an input 602 of the picture encoder is an image, which may be provided in a plurality of channels. The exemplary representation of FIG. 6 shows a three color channels with luminance and two subsampled chrominances (e.g. in YUV color space or the like), as is one of usual approached in picture coding. In general, there may be more channels (e.g. additional color such as white, or depth or other features, e.g. motion or the like) or less channels (e.g. only one gray-scale channel, black-white or color-palette or the like). The input picture channels 602 are arranged into an input tensor x and input to an encoder neural network 600A. The encoder neural network 600A may include a plurality of layers or layer stages which may include downsampling layers that may be implemented e.g. by convolution with or without some stride, nonlinear activation such as sigmoid, ReLU or GDN or the like, some masked convolutions which do not change the dimensions of the tensor, or the like. It is noted that the layers may include also entropy encoding or other processing layers.

The input signal X may be processed by one or more layers including convolution ("conv") and downsampling ("↓"), along with some nonlinear operations (NonLinAct) and masked convolution (MaskConv). The encoder comprises two or more layers and may write the compressed information in latent space into one or more bitstreams (" ⌇⌇⌇⌇ ") 620 and/or 630. For example, one of the bitstreams (e.g. bitstream 620) may correspond to bitstream1 and the other one (e.g. bitstream 630) may correspond to bitstream2 shown in FIGS. 1 to 3. In FIG. 6, the stages or layers are illustrated as downsizing (narrower in the processing direction). However, this is for illustration purposes and in general the network may include also layer(s) that do not modify the tensor size and/or even layer(s) that increase the tensor size. Following layer 1, gathering 610 or auxiliary information may be performed. The gatherer 610 may gather the auxiliary information and combine it with the output data of layer 1. The combined information is then entered to layer 2 for further processing.

Correspondingly, the decoder part 600B of the network parses the one or more bitstreams 620 and/or 630 and reconstructs the signals with the one or more layers such as (de)convolution, upsampling ("↑"), nonlinear operations and mask convolutions. This exemplary decoder network 600B is symmetric to the encoder network 600A (which is not necessary in general). A gatherer 650 gathers the auxiliary information and applies the combination of the gathers auxiliary information with the output of the last but one layer to the last decoding layer (symmetric to layer 1 of the encoder). After processing by the last layer, the output tensor is obtained, e.g. in this example the reconstructed picture 692.

Auxiliary Information within the Encoding/Decoding Pipeline

In a picture codec, auxiliary information may be used to facilitate the encoder and decoder. These auxiliary information, together with encoded or decoded tensors, may be applied at specific one or more positions in the coding (encoding and/or decoding) pipeline. In the example of FIG. 6, the auxiliary information is used to help encoding and decoding the processed signal after the first layer. The application of these auxiliary information is typically tied to a certain fixed position within the processing pipeline, as shown by the gather blocks 610 and 650 in FIG. 6, as the network architecture is mainly pre-defined and fixed for certain application (such as picture encoding and decoding). The parameters (e.g. weights) applied in the neural network are usually pre-trained (e.g. provided before the encoding and/or decoding). Therefore, the architecture of the neural network is pre-determined because the weights and the positions applying auxiliary information are pre-determined. This may limit the flexibility of the network and its adaption to different parameters and characteristics of the encoded or decoded contents.

A possible example for auxiliary information is an inter-predicted frame (prediction) applied in the domain of the input signal x. Inter-prediction exploits temporal redundancies between neighboring frames and a current frame within a video, as the content of adjacent frames usually does not change completely. Instead, the content would usually move a little bit across frames. Therefore, the inter-prediction requires two pieces of information, namely one or more adjacent frames as reference pictures and motion information (e.g. motion vector(s)). Inter-prediction takes these two as an input and applies motion compensation to generate a prediction for the current frame.

Another form of prediction is intra prediction within (inside) one frame (picture). Intra prediction exploits spatial redundancies inside a frame. Given an area inside a frame, usually the sample values of an area are correlated. Therefore, the intra prediction uses reconstructed neighboring samples of a frame to predict the value of a sample at the current position in the same frame.

Figure 7:
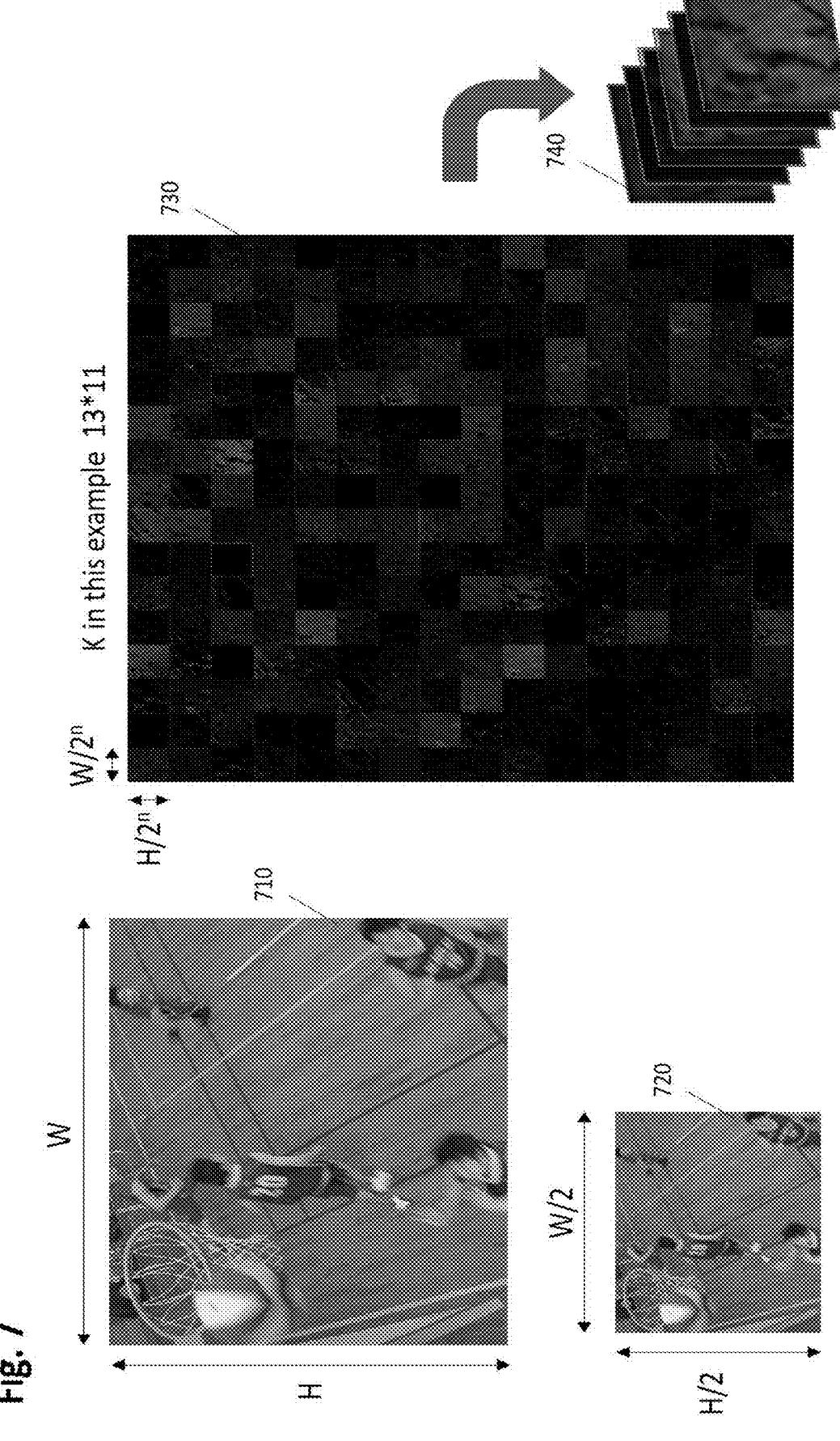
FIG. 7 is a visualization of a prediction signal in the signal domain, after processing with one processing layer including downsampling, and after N layers including downsampling.

In FIG. 7, visual examples of prediction as auxiliary information are provided. The top-left image is a prediction frame 710 from a common test sequence BasketballDrill.

The prediction is performed in the same domain as the input signal x, i.e. in the NN input picture domain in this example. The original width and height of the luminance frame are denoted as W and H, respectively. A smaller frame 720 located at the bottom-left corner is the same prediction frame, but after one convolution layer conv(1, ↓2) with one channel and a downsampling of 2. Therefore, both the width and height are half of the original resolution, namely W/2 and H/2. On the right hand side, an example 730 is shown of predictions in latent space domain after N convolution layers, with a downsampling of 2× for each convolution layer. Therefore, now the width and height of the prediction is $2^N$ smaller. The figure is a grid of downsampled frames, where the grid size is determined by the number K of channels 740. Here, there are total K=13*11=143 channels. In other words, the mosaic picture 730 shows auxiliary information (here prediction) in a latent space domain after n convolution layers with K channels N*conv(K, ↓2).

Figure 8:
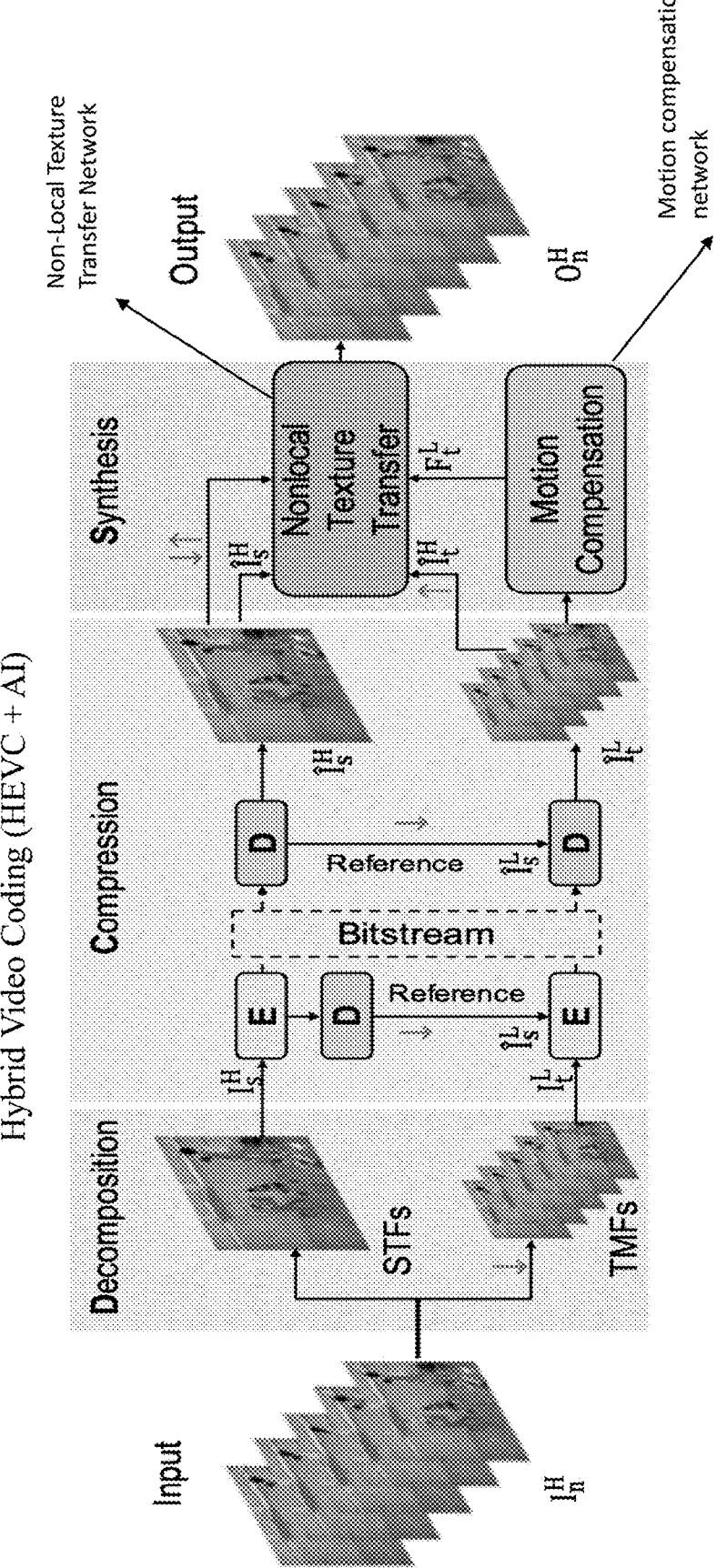
FIG. 8 is a block diagram illustrating an exemplary video coding pipeline with a conventional block-based codec in combination with deep learning based approach.

FIG. 8 shows a combined approach employing both the conventional block-based video codec (HEVC) and deep learning to capture the characteristic of various frames, following. Lu, Z. Ma, L. Xu, D. Wang, "Tests on Decomposition, Compression, Synthesis (DCS)-based Technology", JVET-U0096, Joint Video Experts Team (JVET) 21th Meeting by teleconference, 6-15 Jan. 2021. The auxiliary information such as prediction is employed at multiple positions in the coding pipeline. The coding pipeline in FIG. 8 can be divided into three stages: decomposition, compression, and synthesis. In the figure, ↓ stands for down-sampling, T stands for up-sampling, and E and D represent HEVC video encoder and decoder respectively. STF denotes Spatial Texture Frames which are intra-predicted frames in a group of pictures (GOP). TMF denotes Temporal Texture Frames which are inter-predicted frames in the GOP. Prediction and residual coding of HEVC encoder and decoder are located at a static (fixed) place in the HEVC video codec pipeline.

In FIG. 8, an input GOP is first classified into two categories STF and TMF at the decomposition stages. The motion information in TMFs can be captured in coarse granularity and therefore they are down-sampled before being encoded, denoted as the $I_t^L$ (i.e. low-resolution input for TMFs). By comparison, STFs are encoded at the original high resolution with notation $I_s^H$ (i.e. original High-resolution input for STFs). Both STFs and down-sampled TMFs are encoded using the conventional HEVC codec in the second compression stage, where the encoder and decoder of HEVC are represented by boxes labeled with E and D, respectively. When encoding a TMF, its reference picture is a down-sampled version of the reconstructed signal of the STFs, denoted as $\hat{\imath}_s^L$ (i.e. reconstructed down-sampled low-resolution signal for STFs). The encoded information of STFs and TMFs is written into bitstream(s). Afterwards, they are parsed and used to reconstruct the STFs and TMFs by the HEVC decoder. Again, when decoding a TMF, its reference frame is a down-sampled version of STFs $\hat{\imath}_s^L$. The output of the compression stage are reconstructed signals of STFs and TMFs, denoted as $\hat{\imath}_s^H$ and $\hat{\imath}_t^L$, respectively.

In the synthesis stage, the reconstructed STFs and TMFs are used to produce high-fidelity video at its native resolution. A motion compensation network (denoted as Motion Compensation) is first utilized to generate temporally smooth and spatially fine-grained motion representation ($F_t^L$) of current TMF by aggregating the information across neighboring TMFs. Then, temporal motion features generated by the motion compensation network, together with decoded and upsampled TMFs ($\hat{\imath}_t^H$), decoded STF, as well as its re-sampled version, are fed into a non-local texture transfer network to learn and transfer cross-resolution information for high-fidelity frame restoration with both spatial details and temporal smoothness. The hybrid coding pipeline uses auxiliary information in different positions in the codec, such as temporal motion features generated by motion compensation network, the prediction and residual information used in HEVC encoder and decoder (it is not shown in FIG. 8, but they are used in blocks E and D). However, the auxiliary information is applied at fixed positions in the coding pipeline.

Such implementations might not be able to effectively adapt the characteristic of image and video sequence, and hence result in suboptimal coding results.

The residual signal obtained by subtracting predicted signal from original signal (also referred to as prediction error signal or residual signal) may also be used as auxiliary information. In some embodiments of the present disclosure, the prediction and residual signal might occurs not only at a domain that is the same to the input signal x, but also in a domain after one or several layers in the processing order of the encoder part 600A, or, correspondingly in a domain one or several layers before in the processing order of the decoder part 600B. Conventionally, the position of utilizing these auxiliary information with the encoded and/or decoded tensor in the encoder and/or decoder is fixed.

However, depending on the content and in particular depending on the characteristic of the input picture the auxiliary information might not perform well at the pre-designed fixed positions in the coding pipeline. Therefore, utilizing the auxiliary information at fixed positions in the coding pipeline might lead to sub-optimal coding results. Thus, an adaptive solution that applies these auxiliary information conditionally at different positions based on the input characteristic may be desirable.

Selection of Auxiliary Information Input Position Based on a Gathering Condition According to an embodiment, a method is provided for processing picture feature data from a bitstream using a neural network. The neural network comprises a plurality (i.e. two or more) of neural network layers, referred to in the following also as layers. Such neural network 900B is exemplified in FIG. 9. The term picture feature data refers to any latent space data obtained by picture processing at the encoder side. In other words, the picture feature data may be an output of an encoding processing.

The method comprises obtaining the picture feature data based on the bitstream 940. For example, the picture feature data may be directly parsed or parsed and decoded from the bitstream. Moreover, the picture feature data may be obtained based on the decoded data by some processing. The method further comprises processing the picture feature data using the neural network 900B. For each of one or more preconfigured positions within the neural network, the processing comprises:

a) determining, based on a gathering condition 910_1, 910_2, 910_3, whether or not to gather 960_1, 960_2, 960_3 auxiliary data 950 for processing by one of the plurality of neural network layers at said preconfigured position (following the preconfigured position in the feature data processing direction), b) in case that it is determined that the auxiliary data 950 is to be gathered, the processing with the layer at said preconfigured position is based on the auxiliary data 950.

Figure 9:
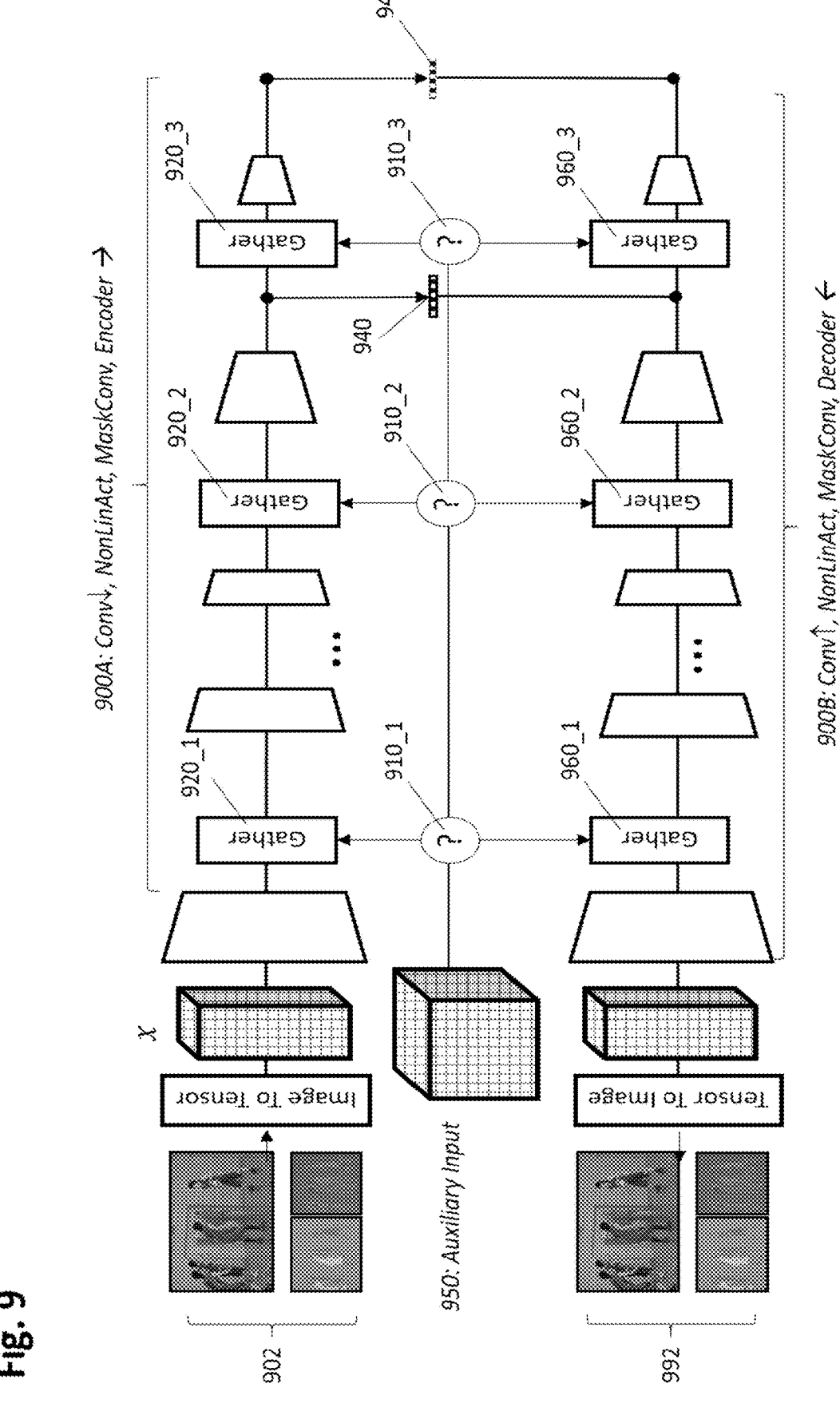
FIG. 9 is a block diagram illustrating an exemplary configurable conditional auto-encoder with multiple selectable positions for gathering the auxiliary information.

The preconfigured positions are positions within the neural network, at which gathering of the (same) auxiliary information is possible. There may be one such position or two or more (or even all) such positions. In FIG. 9, there are three preconfigured positions, namely those of the gathers 960_1, 960_2, 960_3. As mentioned above, a position within the network may be specified, e.g., by the number of NN modules (here layers) preceding the position in the order of the processing of the picture feature data. The preconfigured positions may be fixed as a part of the neural network architecture. Still, by enabling or prohibiting the auxiliary data to be input into one or more layers, the flexibility may be improved. Nevertheless, the present disclosure is not limited to fixed position. Alternatively, the preconfigured positions may be configurable by a side information also included into the bitstream directly or indirectly. Here, direct configuration may signal the actual position whereas indirect configuration may be performed based on the same rules known at the encoder and decoder, and based on values of e.g. encoding parameters (e.g. from the bitstream).

When it is determined that the auxiliary data is not to be gathered for processing by a certain layer, the processing with the certain layer is not based on the auxiliary data. In the exemplary architecture in FIG. 6, the position at which the auxiliary data is entered in the example of FIG. 6 is fixed, located after the first layer. By contrast, in FIG. 9 the said auxiliary information may be inserted to multiple potential positions in a neural network. This is indicated by the gather units 960_1, 960_2, and 960_3, controlled by a condition (labeled as a question mark circle) 910_1, 910_2, and 910_3 across the neural network.

A similar processing is performed at the encoder side. The encoding side method is provided for processing a picture 902 with a neural network 900A comprising a plurality of neural network layers to generate a bitstream 940. The method comprises processing the picture 902 using the neural network 900A. The processing comprises for each of one or more preconfigured positions within the neural network: determining, based on a gathering condition 910_1, 910_2, and 910_3, whether or not to gather (e.g. by the respective gatherers 920_1, 920_2, and 920_3) auxiliary data 950 for processing by a layer at said preconfigured position, and, in case that it is determined that the auxiliary data is to be gathered, the processing with the layer at said preconfigured position is based on the auxiliary data 950. The method further includes inserting into the bitstream 940 data obtained processing the picture by the neural network. As can be seen in FIG. 9, there may be an additional bitstream (or bitstream portion) 945 which may be provided in case the hyper prior sub-network for providing probability model parameters to a lossless encoding is applied.

In this way, the positions of applying auxiliary information can be dynamically changed depending on the content and/or characteristic of an image or a frame in video sequence. Thus, the present configurable neural network has a dynamic architecture, as applying auxiliary information and the corresponding gather parameters can occur at different positions.

The term gathering condition herein refers e.g. to a requirement which when fulfilled, it is determined for a gatherer whether or not it is to gather the auxiliary information 950. The requirements may differ for the respective gather units 960_1, 960_2, and 960_3 (and the respective encoder side gathering units 920_1, 920_2, and 920_3). Such determination has the same effect as selection of the position in which the auxiliary information is input. By design of the requirements, it may be that the auxiliary information is selected for only one out of the preconfigured positions. This may be achieved, for instance, by providing mutually exclusive requirements (gathering conditions) for the respective gatherers. In other words, as a result of applying a gathering condition in the determining step, the auxiliary data is to be gathered for a single one of the one or more preconfigured positions.

However, the above mentioned example is not to limit the present disclosure. As can be seen in FIG. 9, there is one piece or type of auxiliary information 950 which can be gathered at the preconfigured positions. In some exemplary implementations, as a result of applying the gathering condition in the determining step, the same auxiliary data is to be gathered for more than one of said preconfigured positions. The above described approaches regarding gathering the auxiliary information may be applied to more than one types of auxiliary information. Then, for each of the auxiliary information types, the gathering position(s) may be determined out of a set of the preconfigured positions. It is noted that the set of the preconfigured positions may differ for different types of auxiliary informations. However, the sets may overlap or even be the same for some types of the auxiliary information. For example, the auxiliary information may be prediction signal, prediction error signal, probability model, or the like. Some of them may be applicable to the same or overlapping stages at the corresponding positions—e.g. the prediction signal a prediction error signal may be used together. Some of the auxiliary information types may be applicable to different stages—e.g. the probability model for the entropy encoding the latent space signal.

When referring herein to a signal, what is meant is mostly a discrete signal such as input picture to the encoding network or input picture feature data to the decoding network, or latent space of any stage, or data representing the auxiliary information or the like.

As mentioned above, different layers of the neural network may process feature tensors with different size. In the picture processing, the feature tensors usually have three dimensions, as already discussed with reference to FIG. 7, namely width, height and a number of channels. The feature picture with a width and height may be considered as corresponding to a channel. Accordingly, in order to support (selectable) gathering of the same auxiliary information at multiple stages of the pipeline, some resizing or rescaling may be implemented. For instance, in an exemplary implementation, more than one of said preconfigured positions are preconfigured. The auxiliary data is scalable in size to match dimensions of an input channel processed by the layer at two or more of said preconfigured positions. Thus, in this exemplary implementation, as a result of applying the gathering condition in the determining step, the auxiliary information (data) may be (i) gathered or (ii) gathered and scaled for a single one of said preconfigured positions. This is equivalent to selecting among the preconfigured positions a single one at which the auxiliary information is gathered and to adapting (if necessary) the auxiliary information to the resolution processed by the layer to which it is to be input. However, the present disclosure is not limited to always apply the auxiliary information in at least one position. It is conceivable to design the gathering conditions so that, as a result of their applying, the auxiliary information is not gather at any of the preconfigured information for some pictures. In other words, a third possibility of (iii) not gathering the auxiliary information may be implemented.

The embodiment described herein focuses on selectable gathering of auxiliary information. However, apart from such selectable gathering, the neural network architecture may provide one or more gathering stages in which certain type of auxiliary information is always (without dependency on a prerequisite such as fulfilling the gathering condition) gathered as is the case in conventional conditional VAE framework.

This embodiment allows the position of applying auxiliary information to adaptively change according to the gathering condition.

It is noted that the present disclosure is not limited to a particular NN framework such as VAE. Moreover, the disclosure is not restricted to image or video compression, and can be applied to object detection, object recognition or classification systems as well—in general any picture processing system including human vision systems in which a picture is to be reconstructed for the human vision purposes or machine vision systems in which the picture is not necessarily reconstructed, but the picture features are processed which are suitable to derive the desirable output such as segmentation map, depth map, object classification, object detection or the like.

Figure 10:
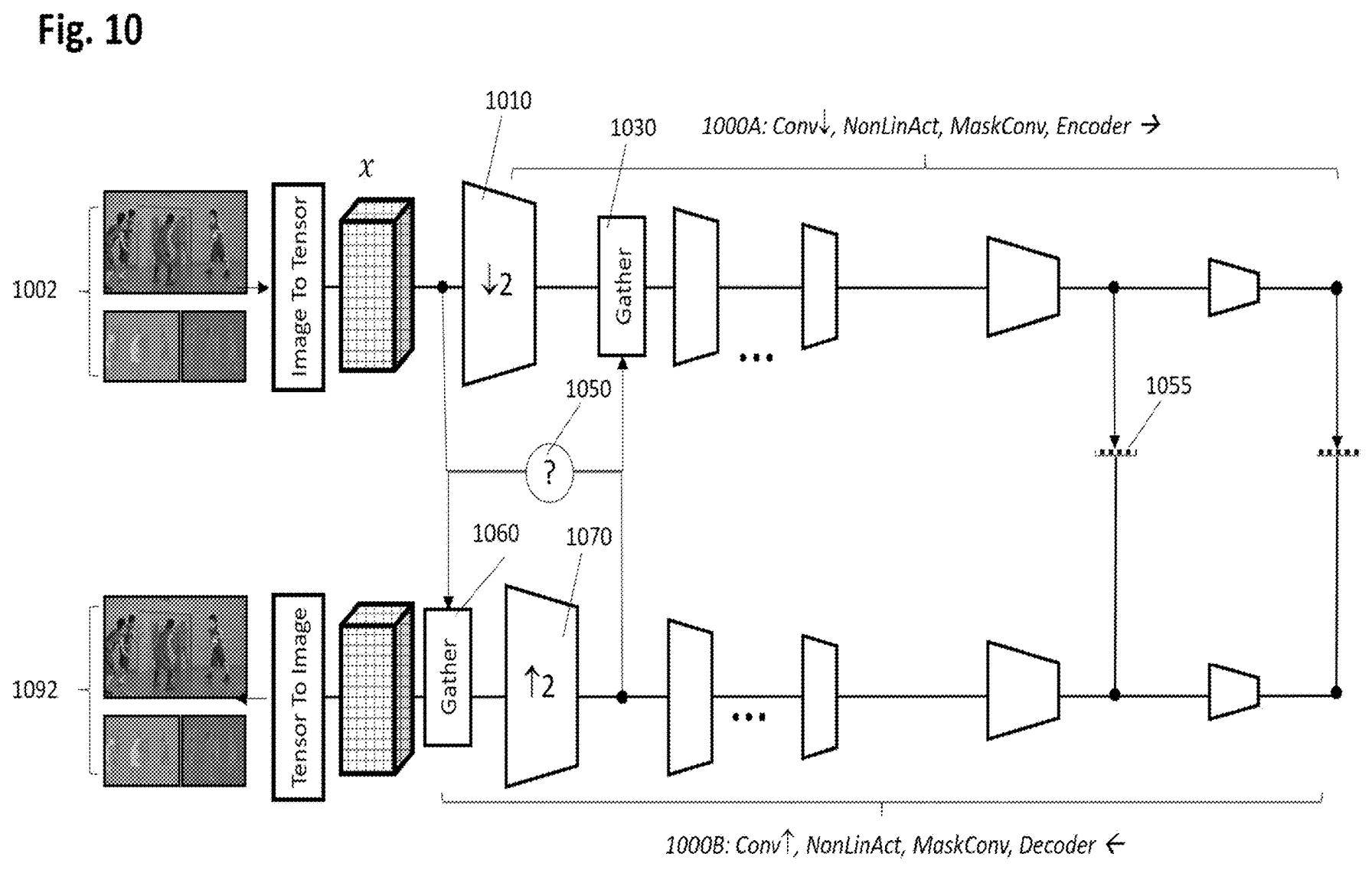

FIG. 10 shows an exemplary embodiment, in which the gathering condition is based on a picture characteristic or a picture feature data characteristic obtained from the bitstream. The neural network of FIG. 10 processes an input picture 1002 and outputs processed picture 1092.

For example, the picture characteristic or the picture feature data characteristic includes resolution. The gathering condition includes a comparison of the resolution with a preconfigured resolution threshold. For instance, if the picture resolution exceeds a preconfigured threshold, then the auxiliary data are to be gathered for a first position among the preconfigured positions. If, on the other hand, the picture resolution does not exceed the preconfigured threshold, then the auxiliary data are to be gathered for a second position among the preconfigured positions, different from the first position. The threshold may be empirically defined as a part of the design of the neural network architecture or trained and/or configurable by including the corresponding parameter into the bitstream.

In addition or alternatively to the condition based on the resolution, in an exemplary embodiment, the picture is a video picture and the picture characteristic includes picture type. The gathering condition includes determining whether the picture type is a temporally predicted picture type or spatially predicted picture type. A spatially predicted picture is predicted using samples within its own picture only. In this case, no samples from other picture are used. A temporally predicted picture must include some area temporally predicted based on samples on other pictures. However, it might also include some area that use spatially prediction, i.e. using samples in its own picture.

Both the picture type and picture resolution or other picture characteristics are known to both encoder and decoder, so that both sides can act in the same way without requiring any additional side information.

In FIG. 10, the first processing layer is downsampling layer 1010 in an encoder 1010A and upsampling layer 1070 in a decoder 110B. The down-sampling 1010 and the upsampling 1070 in this example is by a factor of 2, at both width and height of a frame. Auxiliary information such as prediction may be potentially applied at more than one positions: before and after the first layer 1010 of the encoder and the corresponding layer 1070 of the decoder.

At the encoder side, in this example, the gather unit 1030 is a weighted sum of two input signals: one in a full size of the original frame to be encoded and the other one in a quarter size of the original frame size (the full size), corresponding to downsampled version of the original frame.

For example, a weight pair of (1, 0) indicates encoding using auxiliary information at full size (indicated by weighting factor 1) but not quarter size (indicated by weighting factor 0), while a weight pair of (0, 1) represents encoding using auxiliary information at quarter size but not full size. In this way, the position of applying the auxiliary information may be made configurable in the neural network. A condition to control where the auxiliary information is used can be, for instance, the frame size (resolution) of the original frame, and/or the frame type.

For example, the condition can be whether the frame size is larger than or equal to a 4K resolution and whether the frame type is an inter frame. In an exemplary implementation, when the condition is true, the weight pair of (0, 1) is used, so these input frames are encoded at quarter sizes using the auxiliary information. Other frames are encoded at their original resolution using the auxiliary information. The position of applying the auxiliary information may be dynamically changed at frame level based on the frame type and/or the frame size.

In other words, in FIG. 10, an example is shown in which the gather unit 1030 (and correspondingly at the decoder 1060) is just a weighted sum. The weights can have the values (1, 0) or (0, 1) as described above. The weight (1, 0) means that a full size picture is encoded and the weight (0, 1) means that the coding is performed for signal of a quarter size, corresponding to signal downsampled by 2. The gathering condition 1050 in this example is whether or not the video has resolution of 4K or higher and, at the same time, the frame under consideration is a temporally predicted frame. However, as noted above, the present disclosure is not limited to such combined gathering condition. Rather, the thresholded resolution may be only whether or not the resolution exceeds a certain value or belong to certain set of resolutions. Alternatively, the frame type may be the only evaluated condition, without considering the resolution. Further examples are possible, involving other conditions to be used in isolation or in combination.

For instance, coding parameters such as prediction mode, motion information (to derive e.g. motion intensity or type) or the like, may be applied in the gathering condition. The configurability of the neural network in the above described exemplary embodiments is achieved by switching on/off auxiliary information at specific places based on a content adaptive condition. The content might comprise direct characteristic of an image such as frame size and frame type as shown in the example of FIG. 10. However, the characteristic could also be indirect characteristic of the content, such as a histogram of sample values in a given area. The granularity of the content may be also changeable. For example, the condition determining the position of auxiliary information can be updated at frame level, block level or at a level of a group of pictures or any amount of pictures. In other words, in some embodiments the neural network is trained to perform the processing of video pictures. The determining whether or not to gather auxiliary data for processing by a layer at said preconfigured position is performed every predetermined number of video pictures, wherein the predetermined number of video pictures is one or more.

The condition may have a different form as well. It might be determined from a parsed flag in decoder as is described below. At the encoder, the flag value may be determined based on some RDO calculations or based on other cost function. It is also possible that the condition is not explicitly signaled but determined by other information of the image/frame in a video sequence.

One of the benefits of flexible position to apply auxiliary information is that it can encode and decode pictures or frames adaptively, hence may result in better performance. The better performance may include lower rate of the resulting bitstream 1055 at the same quality or vice versa (higher quality at the same rate).

According to an embodiment, the method comprises at the decoder side a step of obtaining from a bitstream an indication specifying for the one or more preconfigured positions whether or not to gather the auxiliary data. The gathering condition for each of the one or more preconfigured positions is as follows:

if the indication specifies for said preconfigured position that the auxiliary data are to be gathered, then the determination is affirmative; and if the indication specifies for said preconfigured position that the auxiliary data are not to be gathered, then the determination is negative.

The indication may be a flag supported by the bitstream syntax and directly indicating whether or not to gather certain auxiliary information at a certain position. Alternatively, the indication may be directly included in the bitstream according to its syntax and specify a single one among the preconfigured positions at which the auxiliary information is to be gathered. The indicator may also be designed to take a value indicating that the auxiliary information is not to be gathered at any of the preconfigured positions. In this embodiment the gathering condition is based on evaluating the indicator.

The above mentioned embodiments were described with reference to auxiliary information. In general, the auxiliary information (or auxiliary data) provide some (supplementary) information about the picture feature data processed by the neural network to generate an output. In a particular example which is also shown in FIG. 11, the auxiliary data includes prediction data which is a prediction of the picture (e.g. in the input picture domain for encoder) or a prediction of picture feature data after processing by one or more of the layers of the neural network (e.g. in other than the input picture domain for encoder).

Figure 11:
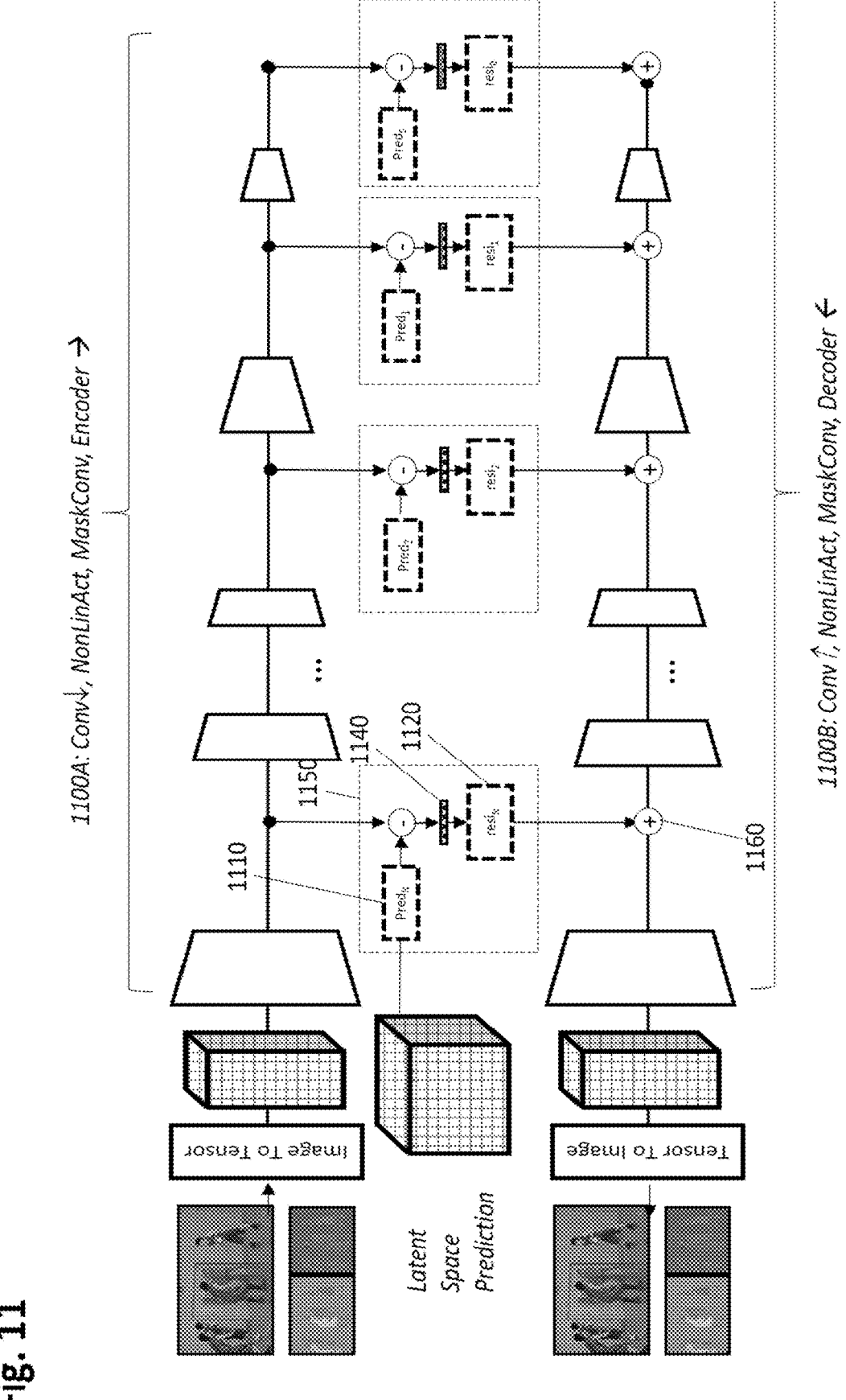
FIG. 11 is a block diagram illustrating an exemplary neural network processing including a plurality of gathering opportunities (positions) for gathering the prediction information as well as the residual information as auxiliary information.

As shown in FIG. 11, in some exemplary implementations, the auxiliary data are a coupled pair of the prediction data and supplementary data to be combined with the prediction data. The term "coupled" here refers to the fact that the prediction and the supplementary data are taken from the same pipeline position (stage). The supplementary data may be for instance prediction error data (data representing the prediction error) which may be in a specific case prediction residuals (difference between the predicted picture and the prediction of the picture). The prediction and residual signals may be obtained after zero, one or several layers in the neural network, as shown in FIG. 11. Applying an auxiliary information at the $i_{th}$ position means using the auxiliary information for a transformation at the $i_{th}$ position within the pipeline. The transformation here may be a general transformation performed by a layer or an actual frequency domain transformation performed as a processing step (layer) of the network, e.g. an orthogonal transformation such as Fourier transformation (e.g. a fast Fourier transformation (FFT) or Discrete Cosine Transformation (DCT) or their integer versions or the like). As mentioned above, in general, the auxiliary information is a tensor which may have the same size as encoder side input signal or as a latent space representation in coding pipeline, depending on the gathering position.

In general, the number of positions that could apply prediction and residual signals is N+1. This corresponds to position 0 at the decoder side representing the input signal (input to the NN) and at the encoder the output signal as well as N further positions 1 to N. It is noted that the preconfigured positions are not necessarily provided after each layer. FIG. 11 shows an example in which the auxiliary information are prediction and residual signals. They may be gathered at several positions, which is illustrated by providing the gather unit 1150 several times in the encoder part 1100A and the decoder part 1100B of the neural network.

In the example of FIG. 11, a single one of these positions is applying the prediction signal and the residual signal during the encoding and decoding. In other words, the position of applying auxiliary information is not duplicated but rather changed in the coding pipeline. The gathering stage 1150 comprises gathering a prediction signal ($\text{pred}_i$) 1110 as auxiliary information and calculating residuals ($\text{resi}_i$) 1120 by subtracting the prediction from picture feature data of the i-th position (calculated in the direction of decoder processing). The residuals are then encoded in a bitstream 1140. Accordingly, the residuals may be gathered at the decoder 1100B by adding the residuals 1160 to the prediction which is obtained by processing which may include, e.g. motion compensation processing or intra-prediction processing or the like.

At the encoder side, the method may further comprise a step of selecting for the one or more preconfigured positions whether or not to gather the auxiliary data based on an optimization of a cost function including at least one of rate, distortion, accuracy, latency, or complexity. In other words, the positions may be determined by an RDO or a similar approach. For example, on the encoder side the decision about the stage within the pipeline, where the auxiliary information is applied, can be performed by multi-pass encoding. In one example applying the auxiliary information is allowed only in one position as mentioned above. In this case encoder for i=0, 1, 2, . . . , N preconfigured positions tries to apply the auxiliary information at $i_{th}$ position of the pipeline and obtains distortion and rate for each variant. Then the best variant (position) for the defined rate/distortion ratio is selected.

In the another example, if applying auxiliary information is possible at any one or more positions within the pipeline, the encoder for each Boolean vector of length (N+1) tries to apply the auxiliary information at the positions corresponding to ones in this Boolean vector, so $2^{N+1}$ variants are tried. The search space may be reduced if some a-priori knowledge is considered. The Boolean vector indicates for each position i whether or not the auxiliary information is gathered at that positon.

However, the present disclosure is not limited to the prediction and prediction residuals as the auxiliary information. Rather, the auxiliary data is applied as a kind of guidance data enabling directivity in the decoding processing. In other words, auxiliary data condition the processing by some supplementary information. In general, the auxiliary data may be a label to help a generative network or other data.

It is noted that in the present disclosure, the meanings of prediction and residual signal are slightly generalized, i.e. unlike conventional codec such as HEVC where prediction and residual signal are generated in the same domain of the input signal x, the prediction and residual signal herein can indicate a signal after one or several layers in the neural network, as shown in FIG. 11. In the embodiment of FIG. 11, the prediction and residual signal are coupled, i.e. the co-located prediction signal $pred_i$ and residual signal $resi_i$ are enabled or disabled at the same when a gathering condition is met.

However, there are embodiments in which the prediction data and the supplementary data have dimensions of data processed by layers at mutually different positions in the network. In other words, they are gathered from different stages. The (selected) gathering position of the prediction and the (selected) gathering position of the residuals may differ. Some embodiments of such approach will be described below in Section "Combining data from different processing stages of the neural network" and may be combined with changing the gathering position as described herein.

Figure 12A:
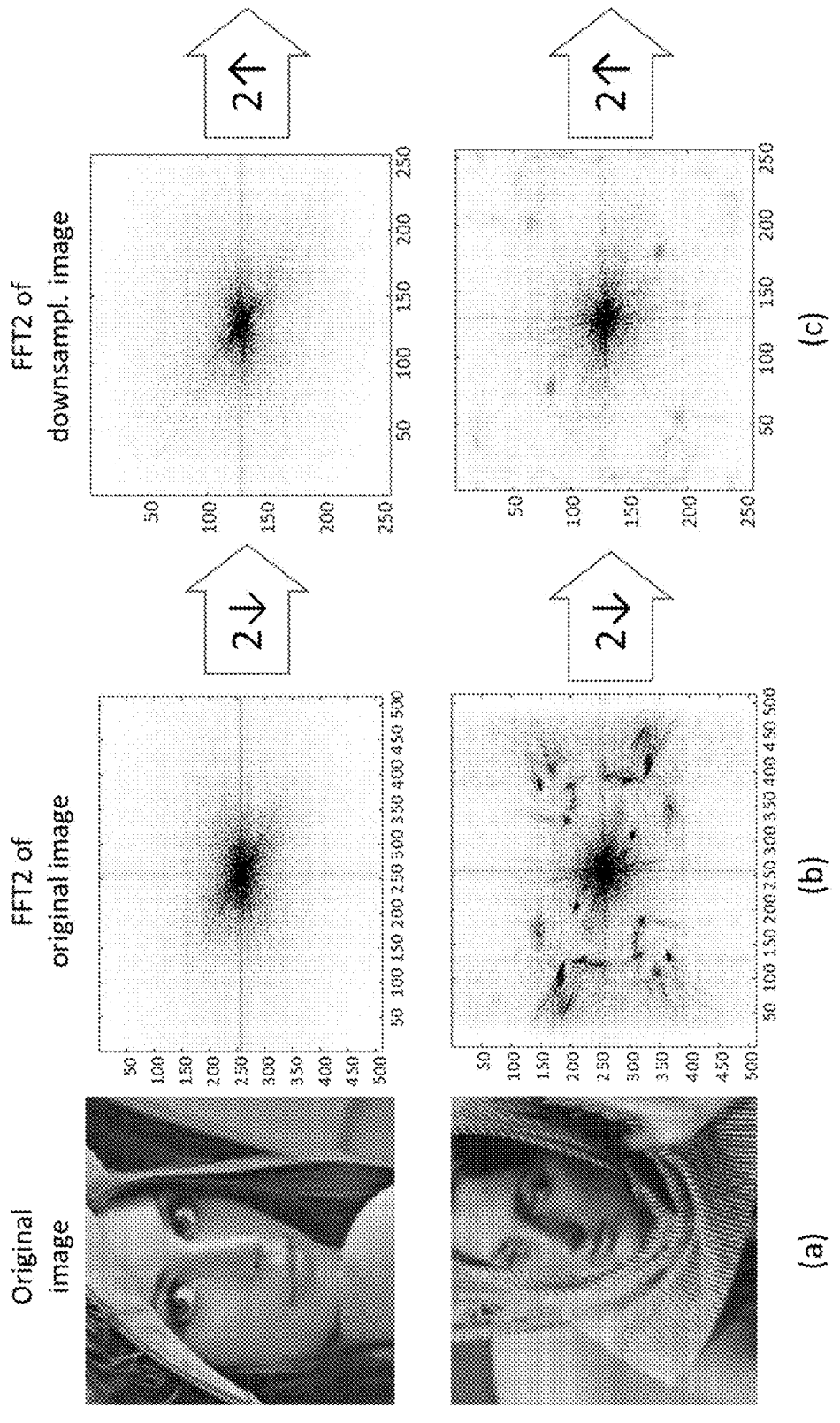
FIGS. 12A and 12B are schematic drawings illustrating comparison of performance for downsampling and reconstructing two exemplary pictures with different characteristics.
Figure 12B:
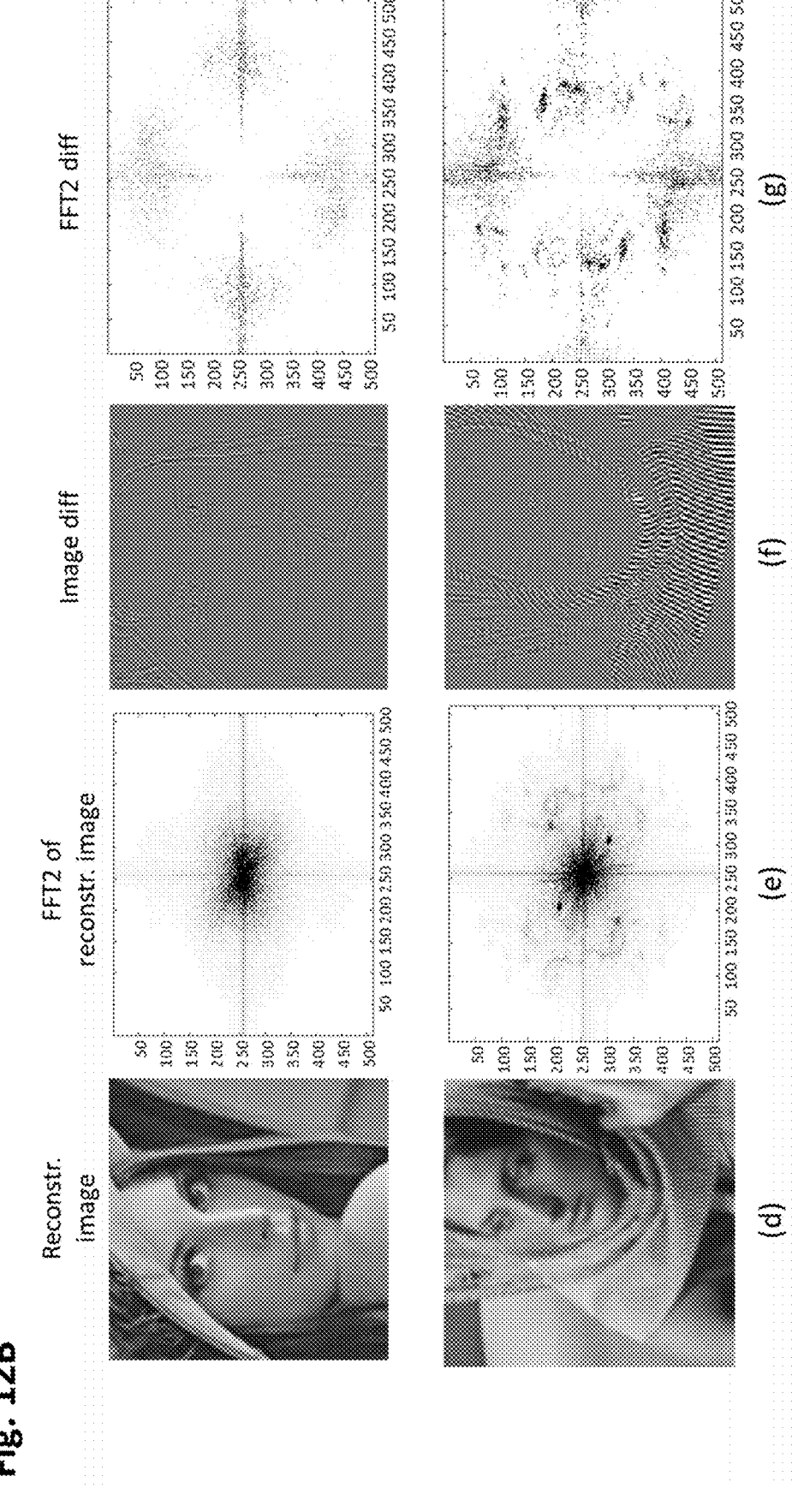

FIG. 12 shows some experimental data. In the experiment, the network configuration can be selected based on analysis of the input signal. This analysis is done in frequency domain. An example is given in FIG. 12 where a transformation FFT2 corresponding to a two-dimensional fast Fourier transformation (cf. https://www.mathworks-.com/help/matlab/ref/fft2.html) is used as the transform tool to perform spectral analysis. For a given image, one can predict (or measure) the spectral change introduced by the FFT2 transform before or after a network layer with downsampling of 2×. If the predominant signal energy is preserved, it is advantageous to apply auxiliary signal to the lower-resolution representation, as probably the error between the original picture and the reconstructed picture is negligible. FIG. 12 shows the following analysis stages. Stage (a) shows an input (original) picture. The experiment here was performed for two different pictures (see (a), top and bottom). Stage (b) shows an FFT2 result if the FFT2 is applied to the original images. Stage (c) shows the FFT2 result when the FFT2 is applied to the original picture after downsampling by 2. Stage (d) shows image reconstructed based on subsampled signal. Stage (e) shows the FFT2 applied to the reconstructed image. Stage (f) shows the difference between the reconstructed image and the original image. Stage (g) shows the FFT2 of the difference image. As can be seen, the image on the top in FIG. 12 has less high-frequency components. The reconstructed frame is obtained by firstly applying auxiliary signal at downsampled resolution and then performing upsampling. Such a resampling has little influence on the signal content. By contrast, loss of high-frequency energy is evident both in picture detail and frequency components for the image at the bottom where more high-frequency components are observed. This observation likely hold true for other transformations as well. Overall, the network is configured adaptively in such a way, so that the auxiliary signal is applied to the convolutional layer with an appropriate resolution, where the spectral energy of the input signal is sufficiently preserved. It is conceivable that the gathering condition is based on the FFT2 or another transformation which may provide some spectral information. For example, some statistic parameter of the spectrum distribution may be thresholded to define on which position auxiliary information is to be gathered.

It is noted that the present disclosure is not limited to providing the prediction signal and the residual signal as auxiliary information. Another exemplary possibility is application of auxiliary information in lossless compression.

Figure 13:
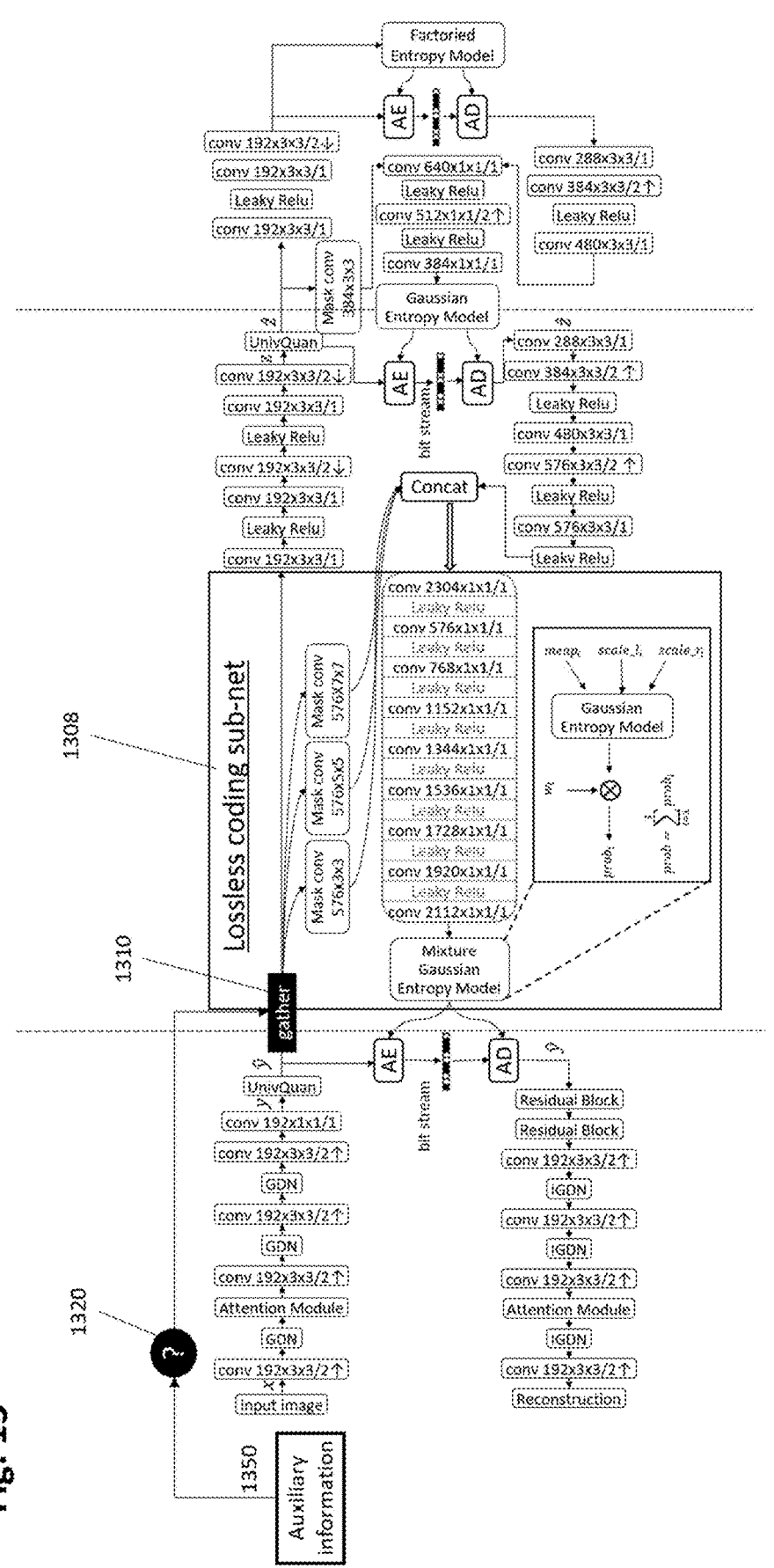
FIG. 13 is a block diagram illustrating application of a configurable gather unit for the purpose of inputting an indication of a probability model as auxiliary information.

Accordingly, the potential position that the auxiliary information could apply to includes a position where signal can be losslessly processed. As shown in FIG. 13, a neural network may include a sub-net in which signal y_hat can be losslessly recovered from decoder as has been described with reference to FIGS. 1 to 3 above. According to an embodiment, there is a gather unit 1310 after obtaining signal y-hat, where auxiliary information can be applied afterwards in the neural network.

In other words, in the embodiment the neural network includes a sub-network for lossless decoding with at least one layer and the auxiliary data is input into said sub-network for lossless decoding. The gathering condition 1320 may thus control whether or not the probability model for entropy coding (encoding and decoding as described above for the VAE framework) is provided as auxiliary information from the lossless coding sub-net. If the auxiliary information is not to be provided, the probability model may be determined, e.g. by a default probability distribution or by bitstream signaling or the like. The gathering condition may be based on an optimization based on a cost function or the like, considering the complexity and latency caused by the sub-net on one hand and the contribution of the sub-net to reducing the resulting bitstream size. Alternatively, the gathering condition may be based on statistics of previously coded data, e.g. their variance. In nearly stationary or slowly changing cases, the application of the auxiliary information from the sub-net may not be necessary.

In general, the neural network may be trained to perform at least one of still picture decoding, video picture decoding, still picture filtering, video picture filtering, and machine vision processing including object detection, object recognition or object classification.

The above mentioned encoding and/or decoding may be performed for each of a plurality of auxiliary data, including first auxiliary data and second auxiliary data, wherein the first auxiliary data is associated with a first set of one or more preconfigured positions and the second auxiliary data is associated with a second set of one or more preconfigured positions. In other words, the present disclosure may be applied to different types of auxiliary data in the same network. For instance, the first auxiliary data is prediction and residual signal and the second auxiliary data is probability model for the lossless coding. In some embodiments, the first set of one or more preconfigured positions and the second set of one or more preconfigured positions share at least one preconfigured position. However, this is only exemplary, in some cases, the sets do not necessarily share the any preconfigured position. This may be the case, for instance in the example of the prediction/residuals as the first data and the probability model as the second data.

As shown in FIG. 9, a configurable conditional auto-encoder neural network has been provided as an exemplary embodiment. Within this architecture, the position of applying auxiliary information such as prediction and/or residual can be adaptively determined based on a condition. Therefore, the architecture of the neural network can be dynamically changed according to the characteristic of an image or a frame in video sequence.

In general, embodiments of the present disclosure provide an approach of making a neural network based picture codec dynamically configurable, wherein the positions of applying auxiliary information in the coding pipeline depend on a condition. The auxiliary information may be a coupled pair of prediction and residual signals. The paired prediction and residual signals can either be located in the same domain to the input signal x, or in a domain after processing by one or more layers of the neural network. The position of applying auxiliary information is changeable, which may be achieved by using auxiliary information at one specific position exclusively among the potential positions in a neural network based on a gathering condition. Such gathering condition controls the position of applying the auxiliary information in a content adaptive manner, i.e. the condition may be determined based on one or more characteristic of the input signals (pictures). Furthermore, the conditions controlling the position of applying the auxiliary information might be updated on the fly, e.g. when encoding a video sequence, the condition might be updated at block (in a frame) level, or at frame level, or at a group-of-frame level. One of the potential positions applying the auxiliary information is a position where signal is coded losslessly, as shown in FIG. 13. The position change can be applied to two or more independent auxiliary signals. Given two independent auxiliary signal, $A_1$ and $A_2$, there should be two corresponding sets of potential positions of applying $A_1$ and $A_2$, respectively. Suppose these two sets of potential positions are $S_1$ and $S_2$, the positions in S1 and S2 is not restricted, i.e. they might be overlapped or might not. The same applies to more than two independent auxiliary signals.

The embodiments have been described mainly in terms of methods. However, the present disclosure is not limited thereto. Rather, the present invention also relates to an apparatus for processing picture feature data from a bitstream using a neural network comprising a plurality of neural network layers. The apparatus comprises processing circuitry configured to obtain the picture feature data from the bitstream; and process the picture feature data using the neural network, wherein for each of one or more preconfigured positions within the neural network the processing comprises: determining, based on a gathering condition, whether or not to gather auxiliary data for processing by one of the plurality of neural network layers at said preconfigured position, and, in case that it is determined that the auxiliary data is to be gathered, the processing with the layer at said preconfigured position is based on the auxiliary data. The processing circuitry may be one or more processors configured e.g. by the corresponding software as will be described in detail with reference to FIGS. 26 to 29.

Similarly, the present invention relates to an apparatus for processing a picture with a neural network comprising a plurality of neural network layers to generate a bitstream, the apparatus comprising. The processing circuitry is configured to: process the picture with the neural network, wherein the processing comprises for each of one or more preconfigured positions within the neural network: determining, based on a gathering condition, whether or not to gather auxiliary data for processing by a layer at said preconfigured position, and, in case that it is determined that the auxiliary data is to be gathered, the processing with the layer at said preconfigured position is based on the auxiliary data; and configured to insert into the bitstream data obtained processing the picture by the neural network. The processing circuitry may be one or more processors configured e.g. by the corresponding software as will be described in detail with reference to FIGS. 26 to 29.

Combining Data from Different Processing Stages of the Neural Network

Figure 14:
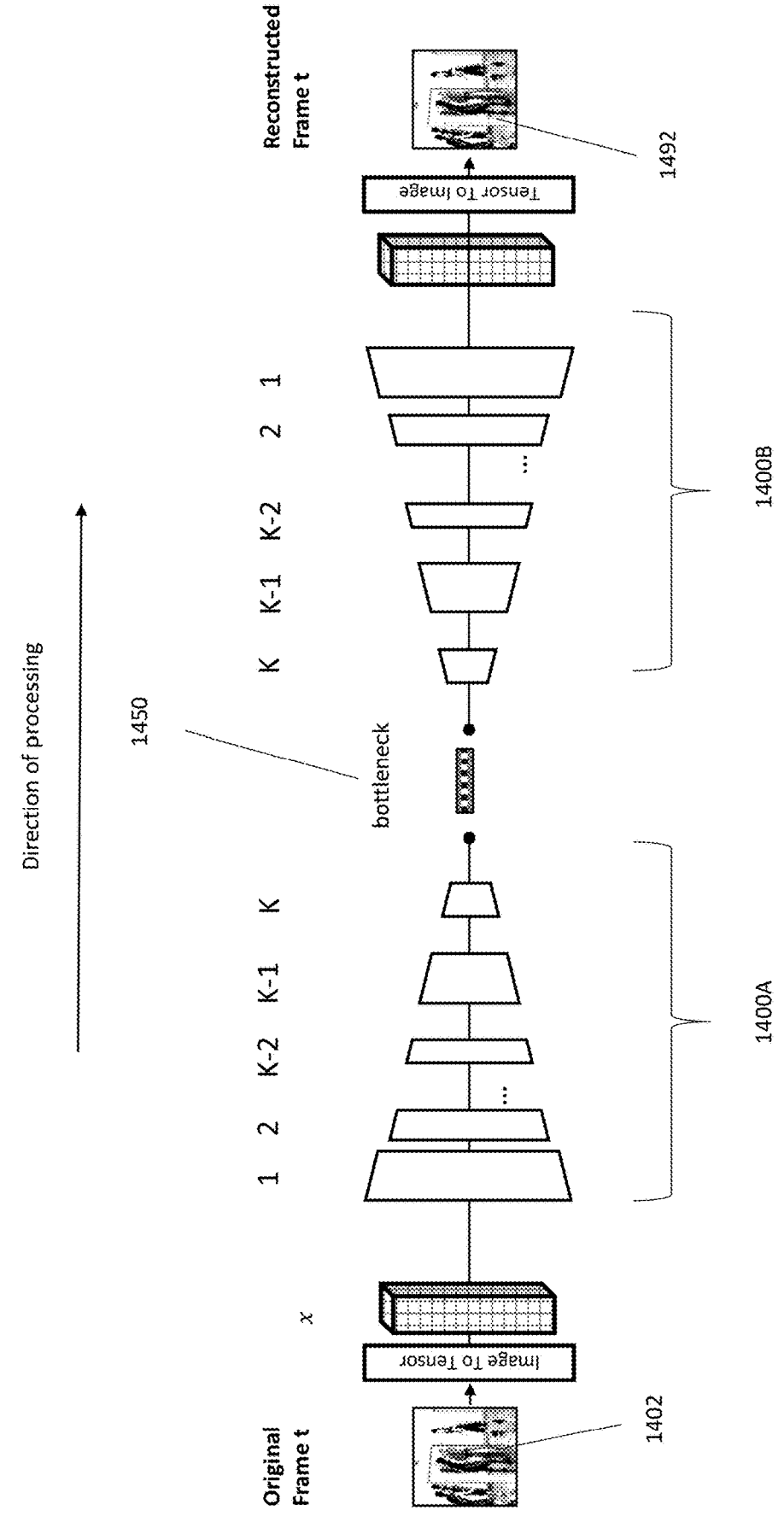
FIG. 14 is a block diagram illustrating encoding side and decoding side neural network with an exemplary numbering of processing stages (or layers).

FIG. 14 is a block diagram illustrating architecture of a neural network for processing of picture data and in particular the numbering of layers applied to encoder side and the decoder side. An input picture 1402 is stacked into an input data tensor and inputted into the neural network 1400A of the encoder side. As can be seen in the figure, the encoder-side network 1400A comprises a plurality of cascaded processing layers (or blocks of layers) which are numbered from 1 to K. Stages denotes here stages of processed feature tensors. The input data tensor corresponds to the $0^{th}$ stage, the feature tensor after processing the input data tensor with layer 1 corresponds to the $1^{st}$ stage, etc. until the last (K-th) stage which corresponds to the output of the neural network at the bottleneck. The output here corresponds to bottleneck feature tensor (also referred to as output or latent space tensor or output feature data) which may be encoded (e.g. by an arithmetic encoder as exemplified above) to form the bitstream 1450.

The decoding side network 1400B comprises a plurality of cascaded processing layers (or blocks of layers) which are numbered from K to 1. In this example, the processing layers (or blocks of layers) herein correspond to the respective processing layers (or blocks of layers) at the encoder side for the simplicity of explanation. In general, it is noted that the encoder side network and the decoder side network do not necessarily need to be strictly symmetrical, this means that they do not require having the same number of layers, but still can have the same number of layers. The particular architecture may depend on the task for which they are deployed. Even for the same task (e.g. video/image coding), the structures of NN can be different. Nevertheless, number of downsampling layers at the encoder side is equal to the number of upsampling layers at the decoder side in most cases.

The output of the decoding side network is in this example the reconstructed picture 1492. However, in general, the output of the decoding side does not need to be a reconstructed picture for human viewing. It may be feature data for or results of computer processing such as computer vision processing or the like.

Figure 15:
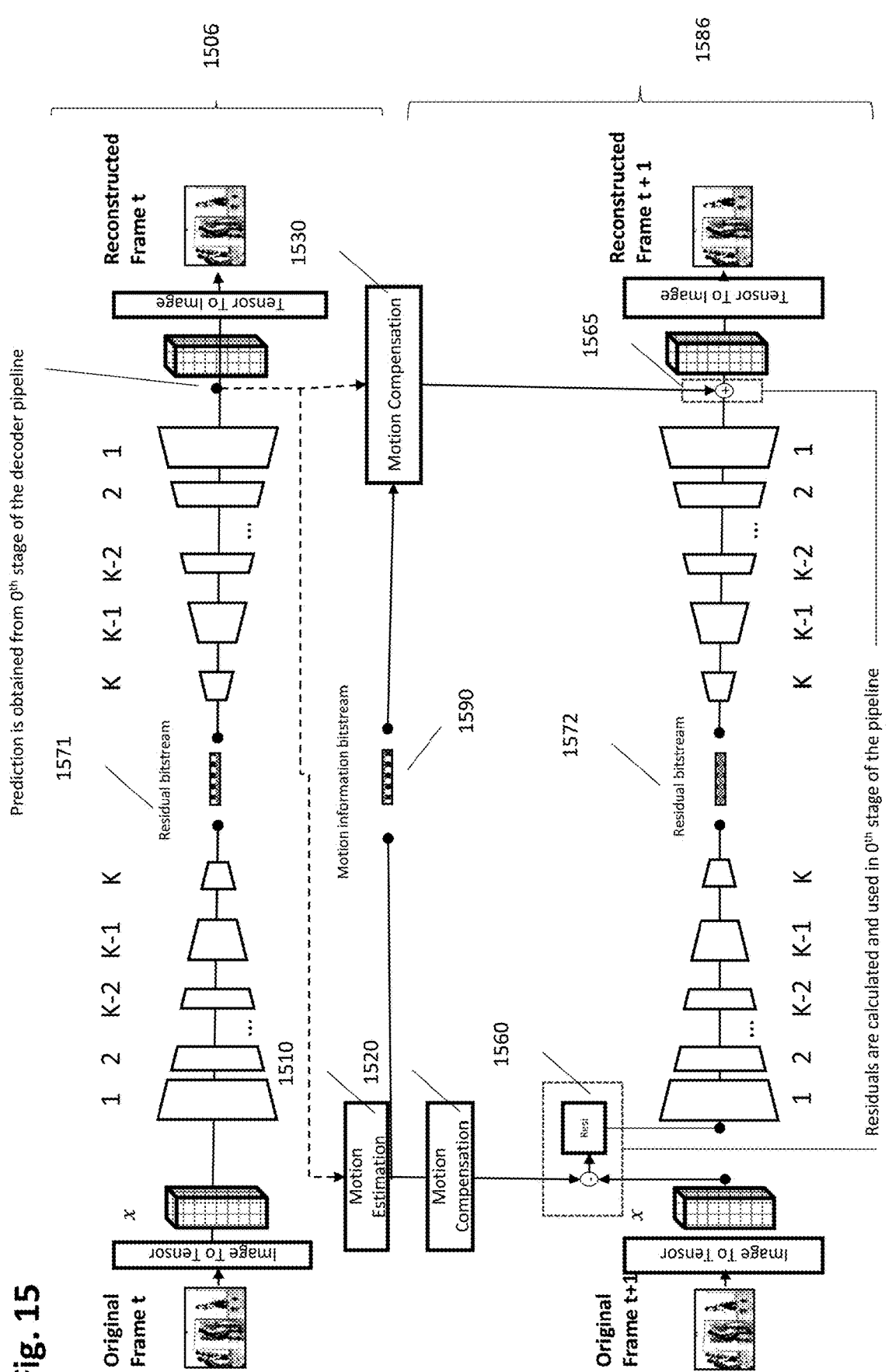
FIG. 15 is a block diagram illustrating encoding side and decoding side neural network with both prediction and residuals at $0^{th}$ position of the pipeline.

FIG. 15 shows in more detail processing and data flow in a neural network which makes use of prediction and prediction residuals for encoding and decoding of picture data at the same stage of the pipeline. In particular, these prediction and residuals are used at the same stage of the pipeline, namely the $0^{th}$ stage. This may be a fixed arrangement or a result of the above mentioned auxiliary information input position selection as described above. In this example, the network described with reference to FIG. 11 is shown in more detail. FIG. 15 shows on the bottom part an encoding and decoding network 1586 which processes the current picture, namely frame at the time instance t+1. The network 1586 basically corresponds to the networks 1400A and 1400B described with reference to FIG. 14. However, at stage 0 at the encoder side and at the decoder side, auxiliary information is gathered 1560, 1565 (similarly as shown in FIG. 11).

The gathered information at the encoder side is a prediction signal. The prediction signal is combined with the input picture data (input tensor) at the $0^{th}$ stage in the portion 1560 (corresponding to gatherer). Namely, element-wise difference between the input tensor and the prediction is calculated, and residuals are obtained which are further encoded, i.e. processed with the encoding side of the network 1586 and inserted into the bitstream 1572. It is noted that the element-wise differences are only one exemplary possibility of implementing the common use or combination of the data. In general, the combination may be performed in a different way. For example, in case the two combined kinds of data have different resolution or dimensions, the combination may further involve rescaling. Depending on the neural network architecture and the tainting of the network, in general, other kinds of combinations may be used, such as concatenation or the like. Accordingly, even though some examples are provided in figures which indicate addition or subtraction, the present disclosure is not limited to such operations. Rather, they may indicate a general combination of the data as is further explained with reference to FIGS. 21 and 22.

The decoder side processes the latent space data from the bitstream 1572 with the layers K to 1. The resulting data in the $0^{th}$ stage (output of the $1^{st}$ layer or layer block at the decoder side) are the decoded residuals. They are combined with the prediction gathered in a unit denoted as 1565. The gathering here includes combination of the prediction and the decoded residual. The combination here is an element-wise sum of the decoded residual tensor and the prediction. It is noted that the prediction here has the same size (dimensions) as the residual signal in order to perform the element-wise processing in gathering units 1560 an 1565. As mentioned above, the element-wise sum shown herein is only an exemplary combination of the two signals (kinds of data). In general, the combination may be performed differently and may mean concatenation or stacking the tensors together and/or rescaling or the like.

The upper part 1506 of FIG. 15 shows how the prediction, which is gathered for the processing of the current picture, is obtained. In particular, the prediction is obtained based on a reference frame (reference data) generated by the same network for a previous picture (at time instant t) and possibly based on further data such as motion information which may be provided in the bitstream 1590 of the current picture (at time instant t+1). The neural network processing of the t-th (preceding) picture by the encoding part of the network 1506 includes similar processing as described above for the current picture. In case where t=0, there is usually no previously coded frame. Thus, only decoded samples of the current (t=0) frame can be used as a prediction. For example, an intra prediction may be applied. Alternatively, such frames may be encoded in a different manner, e.g. only by lossless coding or the like.

The neural network processing of the t-th (preceding) picture by the encoding part of the network 1506 includes provision of reference frame (generated at the $0^{th}$ stage by adding decoded residuals to a previously obtained reference frame) for further processing, namely motion estimation 1510 at the encoder side and motion compensation at the decoder side 1530.

In the motion estimation 1510, the motion between the reference picture (decoded in time instant t) and the current picture (in t+1) is estimated. The motion is then represented by motion information and inserted into the bitstream 1590. Moreover, the estimated motion is used in motion compensation 1520. The motion compensation is performed according to any well know approach. The motion information may include the entire optical flow or subsampled (and possibly further encoded by a lossless or lossy coding) optical flow for certain portions of the picture. In general, the motion information enables to generate prediction from the reference picture. Motion information specifies which sample values from the reference picture contribute (and how) to each sample value or the prediction picture. The motion compensation 1520 generates the prediction picture which is then gathered in the gathering unit 1560 to produce residual signal (prediction error).

At the decoder side, the motion information is decoded from the bitstream 1590. During the decoding of the current picture, motion compensation 1530 generates the prediction picture based on the reference picture from the $0^{th}$ stage of the decoding of the previous picture and based on the motion information, in the same way as described for motion compensation 1520 at the encoder side.

It is noted that FIG. 15 shows primarily the signal flow. In practice, buffering may be performed at some stages, for example, the reference picture may be stored at the encoder and the decoder side in a reference picture buffer. The prediction picture may be generated using one reference picture as described above. However, the present disclosure is not limited to such processing and the prediction picture may be generated using more than one prediction picture. State of the art provides various approaches using two reference pictures (bi-prediction), e.g. a picture preceding the current picture in display order and a picture following the current picture in the display order (bi-directional prediction). It is further noted that the time instances t and t+1 are measured in units of processed pictures. However, they are also only exemplary. The present disclosure is not limited to using immediately preceding picture as a reference. In particular, for temporal scalability, reference pictures which are preceding or following the current picture in the displaying order (but preceding the current picture in the encoding and decoding order) may be used. The bitstreams 1590 an 1572 may be multiplexed into one bitstream.

Figure 16:
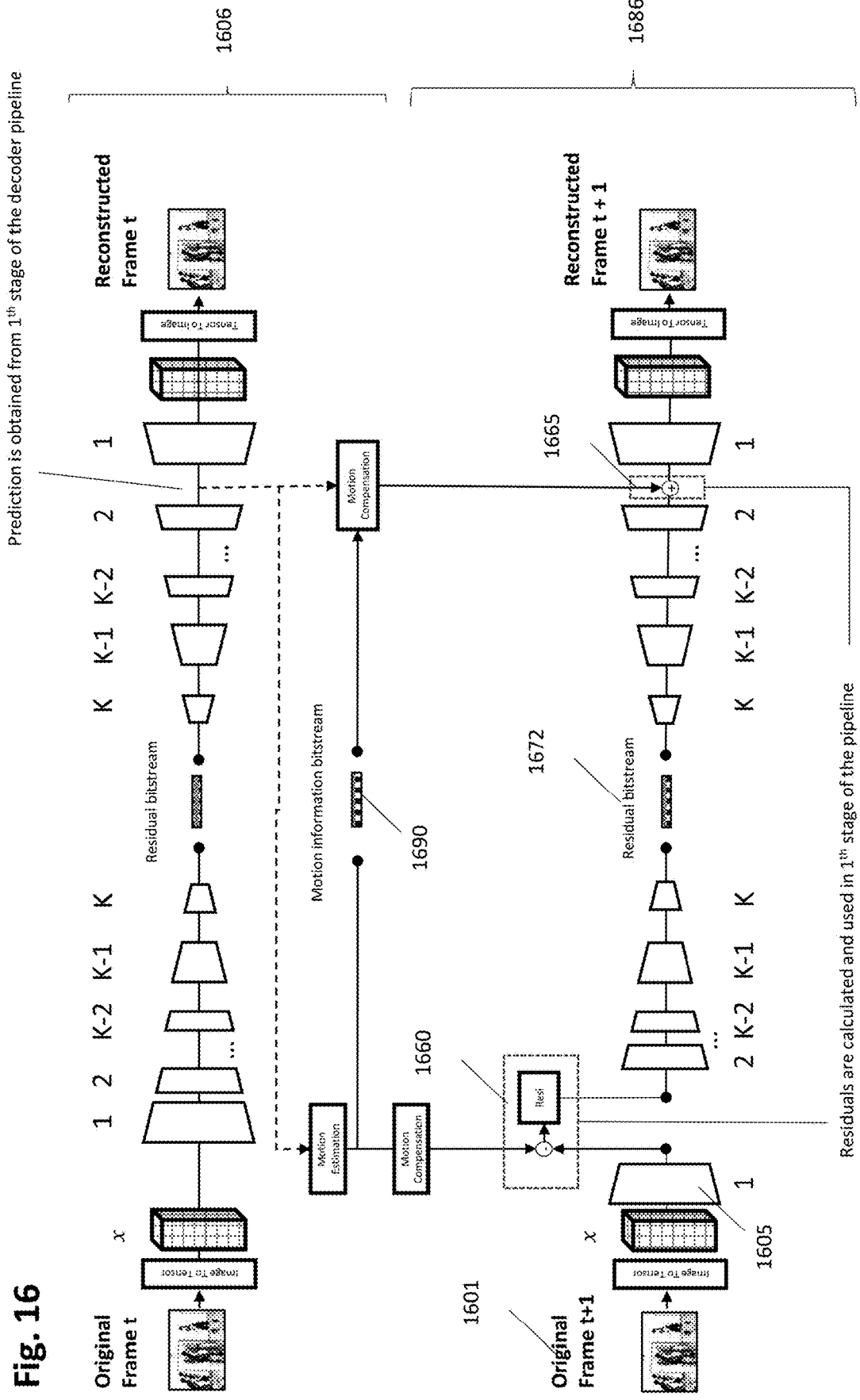
FIG. 16 is a block diagram illustrating encoding side and decoding side neural network with both prediction and residuals at $1^{st}$ position of the pipeline.

FIG. 16 is similar to FIG. 15, as it illustrates gathering of the prediction in the same stage as the residuals, but the gathering of the prediction and the residuals is performed in the stage 1. Accordingly, the prediction does not have to be performed in the input signal domain. In this case, it is performed in the latent space domain of the $1^{st}$ stage. The $1^{st}$ stage here is the stage after processing the current input picture (in time instant t+1) 1601 with a first layer or a block or layers 1605. In particular the $1^{st}$ layer 1605 may include downsampling in which case handling of prediction in the latent space may provide for increased efficiency, e.g. in terms of complexity and latency. As can be seen in the FIG. 16, the residuals are obtained in the gatherer unit 1660 by, e.g., subtracting (in general combining) the prediction tensor from the output of the $1^{st}$ layer 1605. The output of the $1^{st}$ layer 1605 in this case may be a subsampled (and possibly further processed, e.g. filtered) input picture tensor of the same size as the prediction tensor; the prediction tensor is obtained based on a reference frame obtained from the $1^{st}$ stage of the decoder pipeline of the previous picture (network 1606). The corresponding motion information may then also result in less data to be conveyed in the bitstream 1690 which may be multiplexed with the residual bitstream 1672. At the decoder side, the gathering 1665 is also performs at the corresponding stage (here the $1^{st}$ stage, e.g. stage preceding the processing by the first layer or block of layers in the decoding processing order). The gathering includes, as also in FIG. 15, combination (element-wise sum in this case) of the prediction signal and the decoded residuals in the latent space of the $1^{st}$ stage.

As is clear to those skilled in the art, following FIGS. 15 and 16, the prediction signal gathering may be performed in any of the stages among 2 to K. The higher the stage, the less precise may the prediction become, especially if the layers (or blocks of layers) include subsampling. On the other hand, with the increasing stage, the rate of the generated bitstream may decrease, as well as the complexity and latency. So, for low bitrate/quality coding, it can be beneficial to have the above mentioned stage later (corresponding to greater stage index), while for high bitrate/quality it can be beneficial to have the above mentioned stage earlier (corresponding to a smaller stage index). With the possibility of selecting the stages of prediction/residual gathering independently, the network operation can be improved. Also stage selection can be performed adaptively, depending on content characteristics (e.g. spectrum), as described in the above embodiments and examples described with reference to FIGS. 1 to 13.

FIGS. 15 and 16 illustrate an example in which the prediction and the residuals are obtained from the same stage of processing ($0^{th}$ or $1^{st}$ in these examples). However, according to an embodiment of the present disclosure, this is not necessarily the case. It may be advantageous to obtain the prediction and the residuals from different stages.

Figure 17:
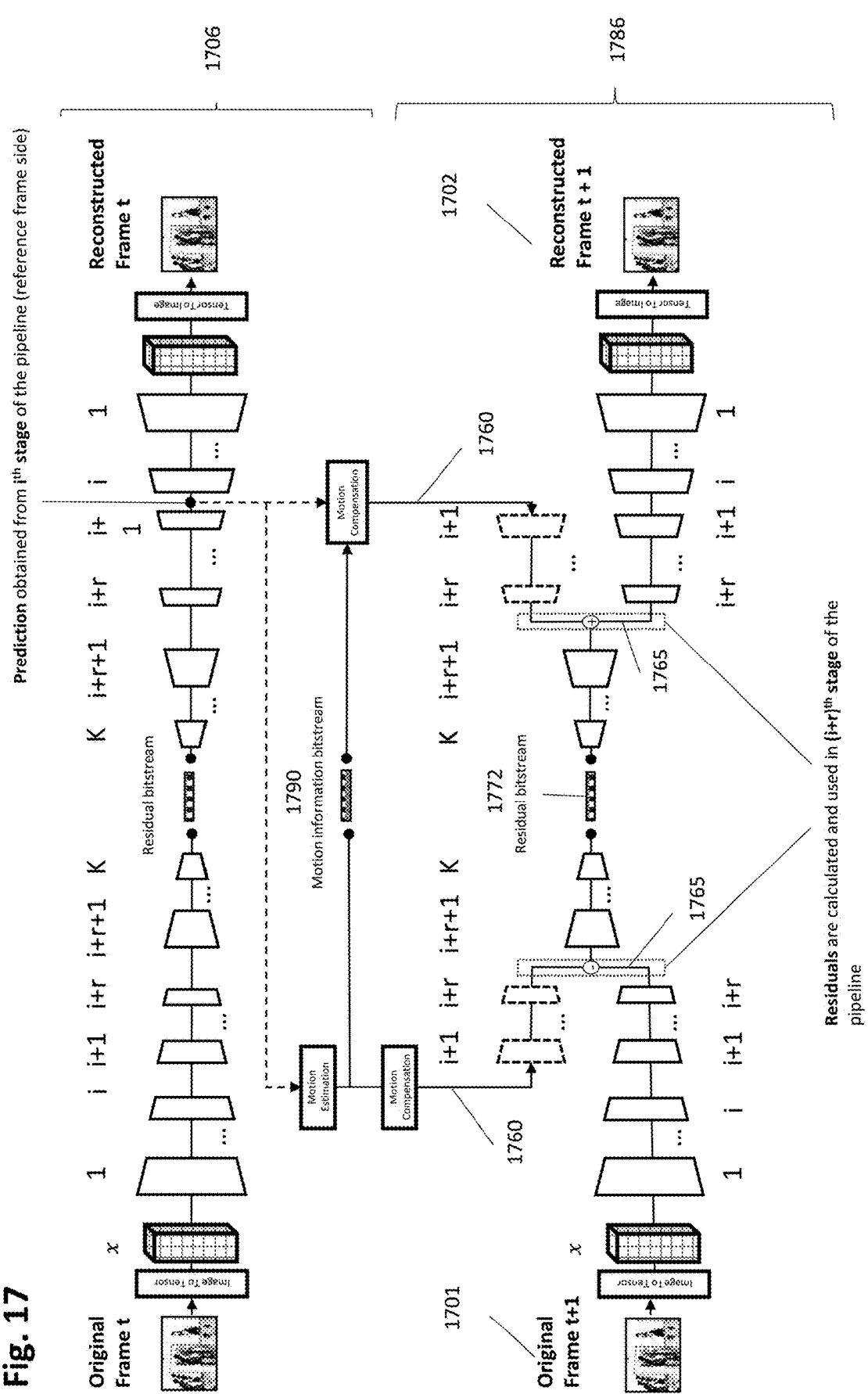
FIG. 17 is a block diagram illustrating encoding side and decoding side neural network with prediction at $i^{th}$ stage and residuals at $(i+r)^{th}$ stage of the pipeline.

FIG. 17 shows an exemplary embodiment in which the prediction is obtained within an i-th stage and the residual coding is performed at (i+r)-th stage of the NN pipeline.

According to such embodiment, a method is provided for processing feature data of one or more pictures from a bitstream 1772 (possibly also 1790) using a neural network. The neural network 1786 comprises two or more stages (K to 1) including a first stage and a second stage. Said "first" stage and said "second" stage here are any of the stages K to 1, the terms "first" and "second" are employed as a placeholder for the stage number.

The method comprises obtaining first data 1760 based on the bitstream and processing the first data using the neural network. For example, the first data in FIG. 17 are residuals which are decoded from the bitstream 1772, possibly also processed by one or more layer(s). In FIG. 17, the first data are the residuals decoded from the bitstream 1772 and processed by the layers K to i+r+1. In other words, the residuals are used in the (i+r)-th stage of the decoding pipeline.

It is noted that in general, the first data is not necessarily processed by one or more layers, it may be entropy coded feature data directly from the bitstream. As will be discussed later, the present disclosure may be also applied to entropy encoding/decoding.

The processing using the neural network includes:
obtaining second data 1765, which is based on data processed previously by the neural network, from the second stage of the neural network 1706; and
using the first data together with the second data to generate input to the first stage of the neural network, wherein the first stage precedes the second stage in the feature data processing of the neural network (order of the processing in the decoding part of the network in the example of FIG. 17, i.e. order from stage K to stage 0);

The term "previously" here means previous frame or previous blocks (intra), or the like. The method further includes outputting the result of the processing 1702 (e.g. a reconstructed picture or picture feature data). In general, the present embodiment is applicable whenever said first stage and said second stage are different. As shown with reference to embodiments described with reference to FIGS. 1 to 16, however, said first and said second stage may also be the same stage.

The second data in this example may be the prediction frame. Obtaining the second data may include obtaining the reference frame and motion information. However, in general, the reference frame or in general reference data may be obtained directly as prediction (e.g. if motion is not signaled or if intra prediction or another type of prediction is used). It is noted that FIG. 17 shows processing on picture (frame) level. However, the present disclosure is not limited thereto and, in general, picture portions may be encoded/decoded.

In the example of FIG. 17, the first stage is the (i+r)-th stage of the decoding pipeline and the second stage is the i-th stage of the decoding pipeline.

In an exemplary implementation, said first data (e.g. the residuals) is obtained in a third stage of the neural network preceding said first stage and said second stage or equal to said first stage in the feature data processing of the neural network. In other words, the first data may be obtained in a stage different from the stage in which it is combined with the second data. This may be beneficial for some neural network architectures and may correspond to a kind of skip connection. The layers from $K_{th}$ to $(i+r+1)_{th}$ can be used to preprocess decoded residual signal and transform it to the same feature space as the second data processed with layers from (i+1) to (i+r). Basically, layers (i+1) to (i+r) and K to (i+r+1) are used to transform the first data and the second data to the same feature space (same domain) in an exemplary implementation shown in FIG. 17. As soon as the processed first data and processed second data are in the same domain, they can be combined as depicted in FIGS. 21-22.

In FIG. 17, the first data represents a prediction error (prediction residuals) and the second data represents a prediction. In particular, the prediction is obtained by:
obtaining reference feature data which is feature data outputted by the neural network at said second stage. Since in the general case of i-th stage, the reference data is not in picture domain but in a latent space domain, it is referred here to generally as "reference feature data". The reference feature of the $0^{th}$ stage is reference picture, as discussed already with reference to FIG. 15.
obtaining, based on the bitstream, prediction information including motion information or spatial information related to the reference feature data (on same stage or different stage). The relation herein is given by the fact that the prediction information was determined relative to the reference feature data in the encoding part of the network. In FIG. 17, the motion information included into the bitstream 1790 is obtained by performing motion estimation for motion between the reference feature data and the feature data processed by layers 1 to i at the encoder side. Other exemplary implementations are possible, e.g. using the input picture data 1701 stacked into the tensor to produce the motion information and then downsampling it, or the like. As is clear to those skilled in the art, rescaling or re-sizing may be applied where necessary.
generating the prediction based on the reference feature data and the prediction information. In FIG. 17, the generating of the prediction is performed by motion compensation as described above with reference to FIG. 15. Thus, the second data is the prediction 1765 corresponding to the output of the motion compensation.

In FIG. 17, the prediction error is obtained by processing a current picture with the neural network. The prediction information is motion information and the reference feature data is generated by the neural network processing of picture data representing picture preceding the current picture in decoding order and possibly by further applying motion estimation. As also mentioned above, the decoding order is not necessarily displaying order; the prediction may be based on more than one references.

The above-mentioned using the first data 1760 together with the second data 1765 includes element-wise addition of the prediction or re-scaled prediction with the prediction error or re-scaled prediction error. Such re-scaling of the prediction data is shown in FIG. 17, included e.g. in the processing by the layers i+1 to i+r (which can be for example the convolutional layers). As mentioned above, the element-wise addition may be replaced by different kind of combination such as concatenation or other operation or a series of operations.

It is noted that the present disclosure is not limited to auxiliary data being the prediction. As will be described below, in some embodiments, the auxiliary (second) data may be obtained from a different (sub-)network as hyper prior and used together with the encoded data on the $0^{th}$ stage to produce latent space feature data at the input of the decoding side of the neural network. In such case, the using together refers to applying the probability model information e.g. to the arithmetic decoding of the picture feature data.

In FIG. 17 the motion information includes motion vectors. However, the present disclosure is not limited to any particular way of motion estimation and compensation. Thus, in general, the motion information is not limited to motion vectors. Rather, it may include affine transformation parameters. In addition to motion vectors, the motion information may include positions for the motion vectors signaled (in case of non-regular motion field sampling).

Figure 18:
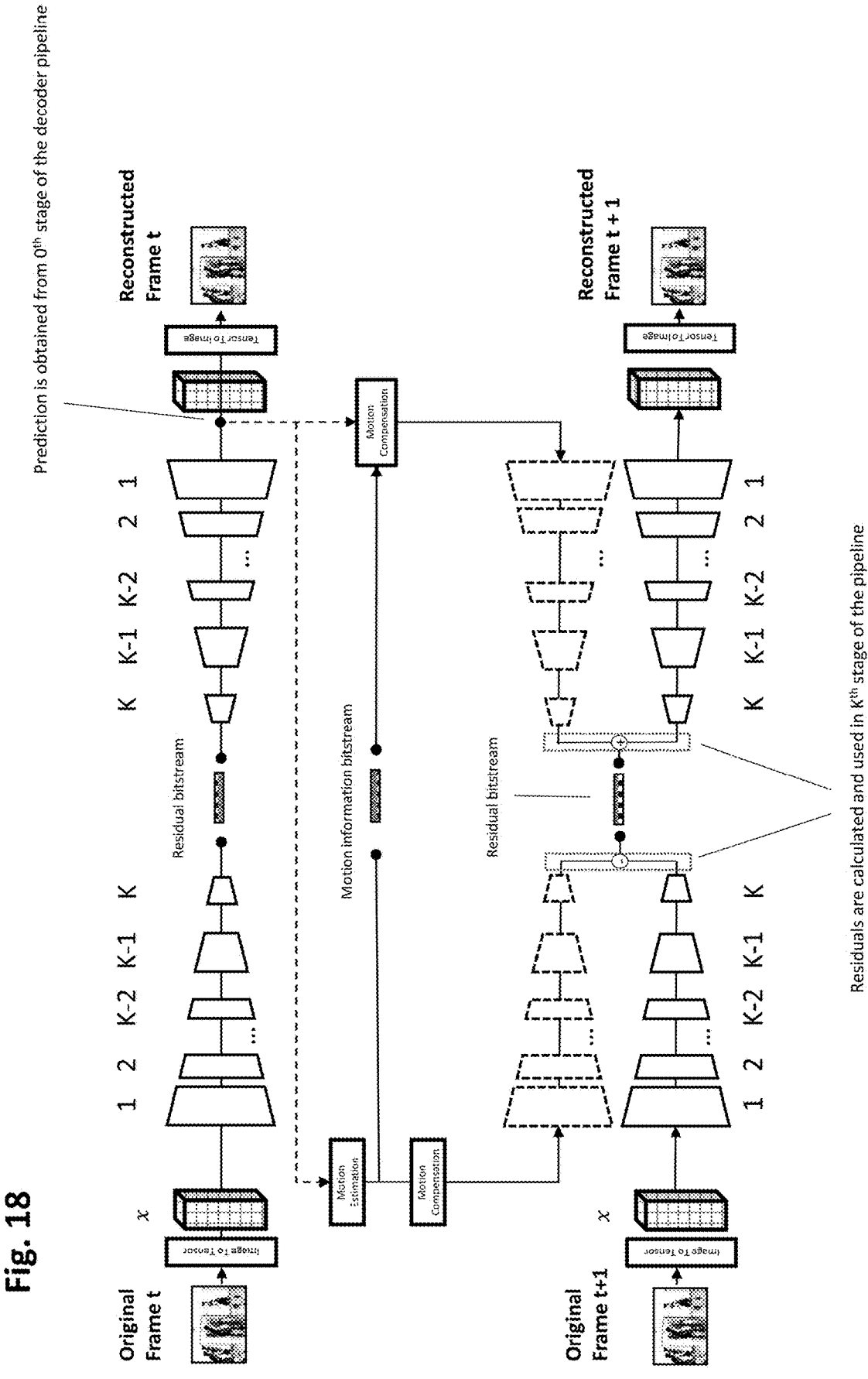
FIG. 18 is a block diagram illustrating encoding side and decoding side neural network with prediction at $0^{th}$ stage and residuals at $K^{th}$ stage of the pipeline.

FIG. 18 is a specific case of the more general embodiment of FIG. 17. In particular, in FIG. 18, said second stage is the output of the (decoder) neural network, i.e. the $0^{th}$ stage. In other words, the reference frame is taken from the $0^{th}$ stage of the decoding processing as also already shown in FIG. 15. It is noted that the $0^{th}$ stage in this case is stage of processing of the previous picture (time instant t). However, in this example, it is assumed that the network architecture does not change for the processing of the current picture or picture feature data (time instant t+1) and for the previous picture or picture feature data (time instant t).

In FIG. 18, said first stage (equal to the above mentioned third stage) is K, i.e. the residuals are calculated (at the encoder) and used (at the decoder) in the K-th stage of the pipeline. However, the present disclosure is not limited thereto and said first stage may be the input of the neural network at the decoder side, especially in case of the embodiment relating to lossless coding as will be described below in more detail.

Figure 19:
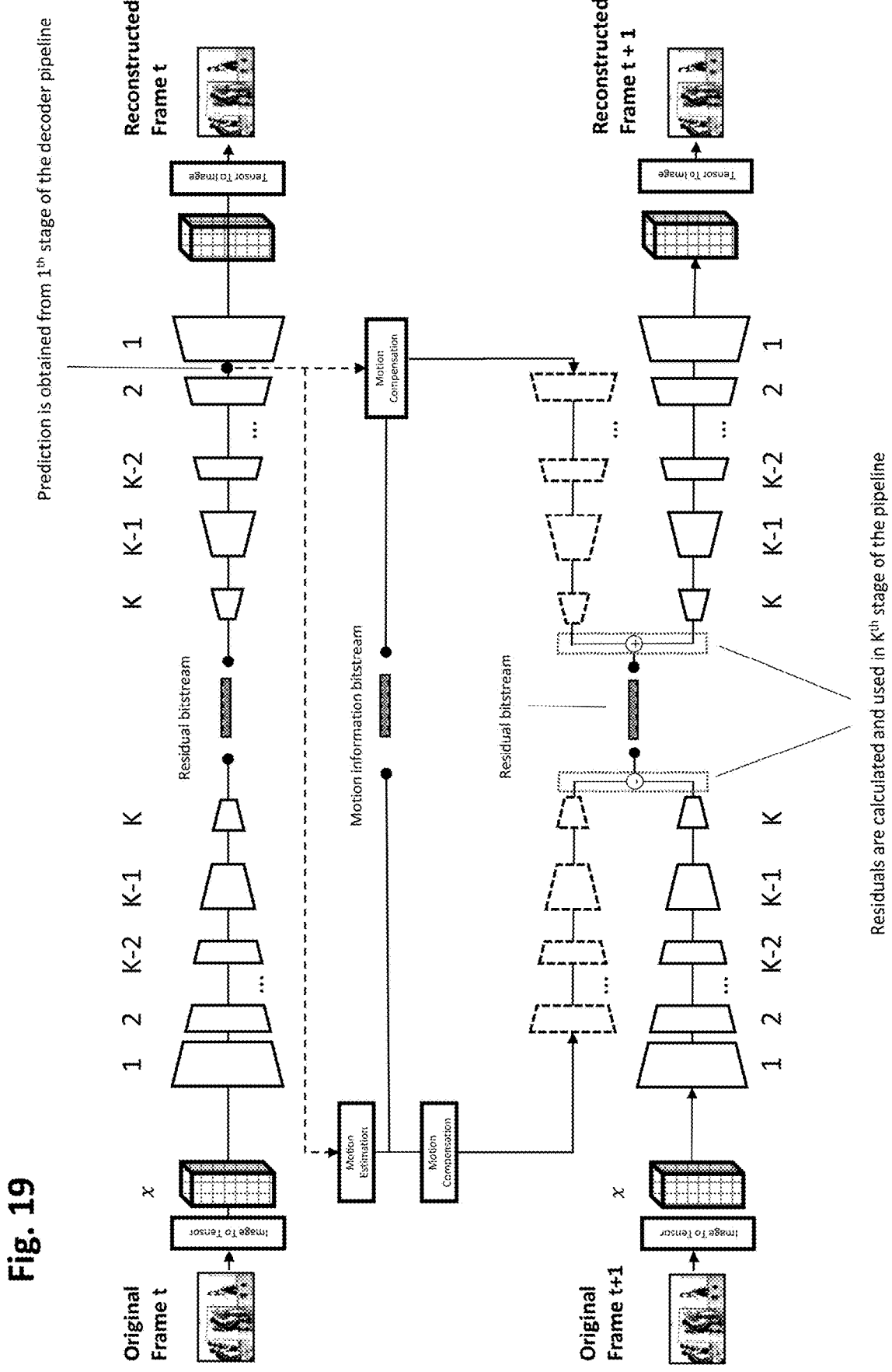
FIG. 19 is a block diagram illustrating encoding side and decoding side neural network with prediction at $1^{th}$ stage and residuals at $K^{th}$ stage of the pipeline.

FIG. 19 shows another example in which the reference picture (and thus also the prediction) is obtained in stage 1 of the pipeline, i.e. said second stage is stage 1 of the decoding pipeline. This corresponds to FIG. 16. Said first stage for calculating and using the residuals remain stage K of the encoding and decoding pipeline as in the above described FIG. 18.

Figure 20:
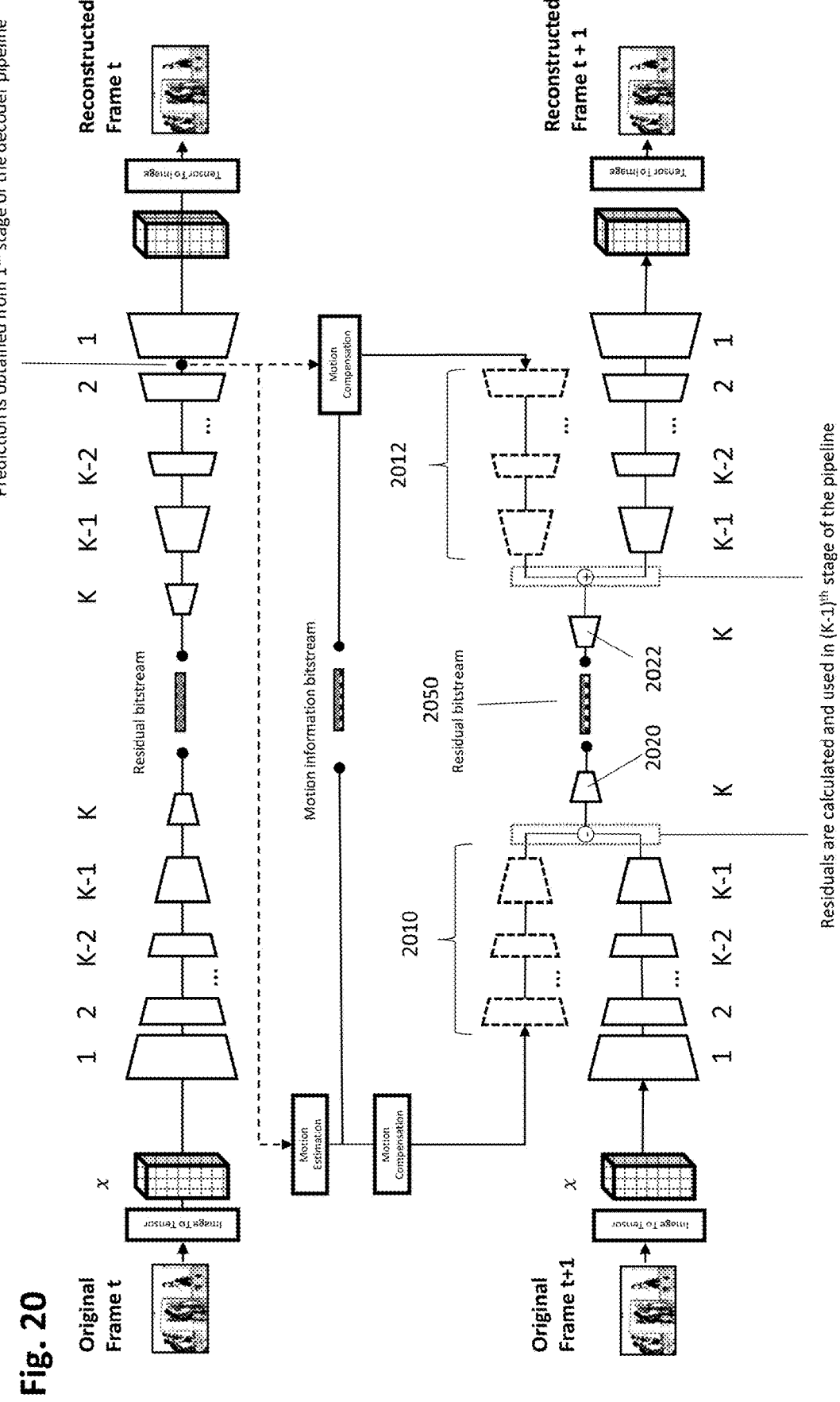
FIG. 20 is a block diagram illustrating encoding side and decoding side neural network with prediction at $1^{th}$ stage and residuals at $(K-1)^{th}$ stage of the pipeline.

Another example is shown in FIG. 20. In FIG. 20, said second stage for obtaining reference frame is stage 1 as in FIGS. 16 and 19. However, said first stage for calculating and using the residuals is stage (K−1) of the encoding as well as decoding pipeline. In other words, at the encoding side, after obtaining the residuals (after combining the first data and the second data), the combined data may be processed by one or more layers 2020 of the neural network before inserting the processed data into the bitstream 2050. In this exemplary processing pipeline as well as in the examples of FIGS. 17 to 19, the prediction (corresponding to the second data) may also be processed by one or more layers 2010 of the neural network at the encoding side. Correspondingly, at the decoding side, before combining the further processed prediction in stage K−1, the data from the bitstream may be processed by one (in FIG. 20 layer K) or more layers 2022. Also, the prediction may be processed by one or more layers 2012 of the neural network at the decoding side. As mentioned above, the processing of the first data and the second data before their combination may include but is not limited to their adaption to a common size (resolution).

The above examples show a symmetric encoding and decoding pipeline and symmetric gathering of prediction at the corresponding stages in the encoding and the decoding pipeline. It is noted that this is not necessarily the case. With the possibility of rescaling and resizing, asymmetrical solutions are conceivable.

FIGS. 15 to 20 described a particular exemplary embodiment in which the prediction is applied to obtain the residuals or to obtain picture (feature) data. Exemplarily, at the encoding side the prediction data (second data) was subtracted from the picture (feature) data input (and possibly processed by some layers) to the neural network to obtain residuals. The subtraction was element-wise. Similarly, at the decoding side, the residues were element-wise combined with the prediction. Such approach is illustrated in FIG. 21. In FIG. 21, a difference is determined element-wise between the predicted block and the original block and included into the bitstream. The differences (which are also denoted as residuals or as prediction error in the present disclosure) are then obtained from the bitstream at the decoder side and added to the prediction block to obtain reconstructed block. This example is merely schematical and block may represent directly the picture data or the picture feature data.

However, in some embodiments, direct combination of the original block and the prediction block and/or the combination of the residual block and the prediction block strips not always possible block-wisely. For example, as discussed above, the prediction, the input (original) data and the residuals may have different sizes (resolutions). Accordingly, FIG. 22 shows a generalized combination at the encoder and the decoder. For example, at the encoder, the obtaining of the residuals may include upsampling or downsampling of at least one of the original data and the prediction data. Similarly, at the decoding side, the application of the residues to the prediction may include rescaling/resizing of the residuals and/or the prediction or the like. In one example the input (original) data is stacked with the prediction data, so number of channels became a sum of number of original data channels and prediction data channels; such combined data is further processed by one or more convolutional layers (possibly with downsampling or strided convolutions) and the result is the residuals. At the decoder side applying of the residuals is performed in a following way: residuals are stacked with the prediction data, then processed by one or more convolutional layers (possibly with downsampling or strided convolutions) and the result of such processing is reconstructed data (can have more than one channel as it is a latent space). If at the encoder side the original and the prediction data have the different size (resolution), rescaling/resizing can be applied before stacking the channels. If at the decoder side the residual and the prediction data have the different size (resolution), rescaling/resizing can be applied before stacking the channels. Also, a few convolution layers can be used for preprocessing prediction and/or prediction error before the combining. In general, such king of preprocessing can be different for prediction and prediction error.

In the following an embodiment regarding application in lossless encoding and decoding is provided. In general, the first data can be obtained after encoding part of autoencoder and be further quantizated before the arithmetic coding. In this case such embodiment with second data as an entropy model can still work for lossy coding which precedes the lossless coding.

Accordingly, said first stage is input of the neural network. The first data is entropy encoded data. The second data is probability model data related to the feature data of the second stage. For example, said second data is probability model data for the entropy decoding of the first data.

In this exemplary implementation, the second data is used to make a prediction of the probabilities of symbols in the first data, which may improve the arithmetic coding substantially. The technical effect is comparable with subtracting the prediction from the signal and encoding the difference (residuals) e.g. close to zero. If the symbols, which are encoded by arithmetic coding, are quantized output of encoding part of autoencoder (which is one of advantageous practical embodiments), a lossy coding is implemented. If the symbols are raw image samples (which are already integer numbers and can be encoded by arithmetic coding), a lossless coding is implemented.

This embodiment is an extension of the embodiment described with reference to FIG. 14. In FIG. 14, the probability model is determined based on the feature data at the $0^{th}$ stage and applied at the $0^{th}$ stage of the encoding and the decoding (for arithmetic encoding and arithmetic decoding). However, this does not have to be the case in general. Rather, the second data which corresponds to the probability model information may be obtained e.g. by applying the hyper prior sub network based on picture feature data of a latent space, e.g. from stages larger than 0.

In general, in any of the preceding examples or embodiments, position of said first stage and/or the second stage may be configurable. For example, the position of the first stage and/or the second stage are configurable within the neural network, and the processing method at the encoding side and/or the decoding side comprises configuring the position of the first stage and/or the second stage according to a gathering condition based on one or more picture coding parameters. In other words, the approaches for selecting the gathering position based on the gathering condition may be applied to said first and/or second stages. The gathering condition may be based on parameters (information) available to both encoder and decoder.

Alternatively or in addition, the gathering condition may depend on a selection performed at the encoder and signaled to the decoder. For example, the decoding method may include parsing from the bitstream a stage selection indicator specifying said first stage and/or said second stage. The position of the first stage and the second stage within the neural network is configured according to the parsed stage selection indicator. At the encoding side, the stage selection indication is generated and inserted into the bitstream. As described above, the encoder may decide to select certain stage based on some optimization based on a cost function including rate, distortion, complexity, latency, accuracy or the like. Alternatively, other approaches such as amount of information lost (e.g. the FFT2 analysis described above) may be applied.

In summary, the present disclosure provides some embodiments which may make a neural network based image/video codec or general picture processing dynamically configurable, wherein the positions of applying an auxiliary information in the coding pipeline may depend on a condition. A further or alternative improvement may result from the architecture in which auxiliary information, obtained at some pipeline stage at the reference frame, can be used at the other pipeline stage for the current frame. An example of such scheme for prediction and residual auxiliary information has been discussed with reference to FIG. 17. For example, a prediction obtained from the $i_{th}$ stage of the pipeline at the reference frame side can be further processed by the subsequent r NN modules and used within $(i+r)_{th}$ stage of the pipeline for the current frame, for calculation residuals. In this case residuals are calculated between the prediction, processed by NN modules i+1, i+2, ... i+r and the current frame, processed by NN modules 1, ..., i+r. Then the residuals are further processed by NN modules (i+r+1), ..., K. The output of the Kth NN module (at the encoder side) is a bottleneck and is signalled in the bitstream. At the decoder side the same scheme is applied: prediction is processed by NN modules i+1, i+2, ... i+r; residuals, obtained from the bitstream, are processed by modules K, ..., (i+r+1). Then the combined signal, obtained from the prediction and residuals is processed by modules (i+r), ..., 1.

As described above for the one stage selection, on the encoder-side the decision about the stages within the pipeline, where the auxiliary information is applied, can be performed by multi-pass encoding. In one example applying the auxiliary information is allowed only in one position. In this case encoder for k=0, 1, 2, ..., K tries to apply the auxiliary information at kth position of the pipeline and obtains distortion and rate for each variant. Then the best variant for the defined rate/distortion ratio is selected. In another example, if applying auxiliary information is possible at the every position within the pipeline, the encoder for each boolean vector of length (K+1) try to apply the auxiliary information at the positions corresponding to ones in this boolean vector, so $2^{K+1}$ variants is tried.

Within the context of possibility of two or more stages being selected, all combinations of i and r can be tried. The following conditions should be met: $0 \leq i \leq i+r \leq K$. To avoid trying of all possible positions for auxiliary information applying and thus reduce the encoder complexity, heuristic methods can be used instead of exhaustive search. For example, the spectrum (e.g. using FFT2) analysis described above can be used.

Within the exemplary implementations depicted at FIG. 15-20, the prediction is calculated only once and the residuals are applied only once. In general the coding (encoding and/or decoding) scheme can comprise more than one prediction obtaining/residual applying blocks at the different stages (e.g. for processing by different NN layers). In summary, in the above mentioned embodiments the auxiliary information may comprise a prediction signal and/or a residual signal. The prediction signal is obtained from ith pipeline position of a previously coded frame and the residual signal is applied at kth pipeline position during the current frame processing. In some embodiments, i and k differ from each other. The values i and k may be predetermined, e.g. fixed within the neural network architecture or configurable within the neural network architecture. For example, the values i and k depend on a condition derived on the encoder and decoder side. Alternatively or in addition, the values i and k are determined based on the syntax element, parsed from the bitstream.

In some embodiments, k is equal to i+r, wherein r is greater than or equal to zero. Such example is shown in the general scheme in FIG. 17. FIG. 20 exemplifies a scheme for i=1, i+r=K−1, where K is number of NN modules within the encoder pipeline. Modules may be denoted as blocks and include one or more layers. In a possible implementation, i is equal to 0, i.e. the prediction is performed in signal domain (0th position within the pipeline). In some other possible implementations, i+r is equal to K, wherein K is number of NN modules within the encoder pipeline. The residual coding is performed in the bottleneck, i.e. in the K-th position within the pipeline). FIG. 18 shows a scheme for i=0, i+r=K. FIG. 19 shows a scheme for i=1, and i+r=K.

In any of the above examples, the prediction signal may be calculated based on the information from p-th pipeline position of the previously coded frame(s) and an additionally signalled information. For example, the additionally signalled information comprises motion information. For instance, the residual signal is calculated by a module with two inputs: prediction signal and the output of kth NN module within the pipeline. In some embodiments, the residual signal is calculated as a difference between the prediction signal and the output of kth NN module within the pipeline. Moreover, the applying of the residual signal is performed by a module with two inputs: residual signal and prediction signal. Finally, the applying of the residual signal is performed by adding residual signal to the prediction signal.

FIGS. 23 to 25 summarize some possible architectures of the processing pipeline.

FIG. 23 shows an example in which original picture, prediction, and residuals are in the signal domain, i.e. in $0^{th}$ stage of the processing by an encoding neural network. The original picture and the prediction is combined to obtained residuals. The residuals are encoded with a VAE including a hyper prior. The result is a bitstream including the coded residuals and possibly some side information. The decoder side is input the bitstream. The decoder is here a VAE with hyper prior which outputs reconstructed residuals. The reconstructed residuals may be combine with the prediction signal to obtain the reconstructed picture. The reconstructed picture may be further compared with the original picture, e.g. by applying a distance measure, e.g. an objective or perceptual quality metric.

FIG. 24 shows an example in which original picture, prediction, and residuals are in the latent space domain, i.e. in $1^{st}$ stage of the processing by an encoding neural network. In this case, the original picture and the prediction are first processed by one or more layers of the VAE encoder and then combined to obtain residuals in the latent space domain. These are encoded by hyper prior encoder and a bitstream is generated thereby. The bitstream may be decoded by the hyper prior decoder to obtain reconstructed latent space residuals. The reconstructed latent space residuals are combined in the latent space domain with the prediction (also in the latent space domain) thus obtaining a reconstructed picture feature tensor that is entered to a VAE decoder to obtain the reconstructed picture. The reconstructed picture may be further compared with the original picture, e.g. by applying a distance measure, e.g. an objective or perceptual quality metric.

FIG. 25 shows an example original picture is encoded by a VAE encoder and then residuals are obtained in the latent space by subtracting (or combining) the encoded picture with a prediction obtained from the latent space of a previous frame. The residuals are encoded with a hyper prior encoder into a bitstream. The bitstream may be decoded by a hyperprior decoder thus obtaining reconstructed residuals in the latent space. These are combined with the prediction obtained from the latent space of a previous frame and in this way, the reconstructed picture feature tensor in latent space is obtained. By transforming the obtained reconstructed picture feature tensor with a VAE decoder, the reconstructed picture is obtained. The reconstructed picture may be further compared with the original picture, e.g. by applying a distance measure, e.g. an objective or perceptual quality metric.

Any of these three architectures may be basis to employ the embodiments and exemplary implementations as described above. These architectures included a VAE encoder and decoder. However, in general the disclosure is not limited to VAE with hyper prior. Other approaches of symbol probabilities estimation for arithmetic coding may be applied as well. For example the context based approach can be used. In this case the information about the previously decoded samples is additionally used by symbol probability estimation NN. The example of probability estimation NN with the context approach is depicted in FIG. 13.

SUMMARY OF SOME EMBODIMENTS

This application provides methods and apparatuses for processing of picture data or picture feature data using a neural network with two or more layers. The present disclosure may be applied in the field of artificial intelligence (AI)-based video or picture compression technologies, and in particular, to the field of neural network-based video compression technologies. According to some embodiments, position within the neural network, at which auxiliary information may be entered for processing is selectable based on a gathering condition. The gathering condition may assess whether some prerequisite is fulfilled. Some of the advantages may include better performance in terms of rate and/or disclosure due to the effect of increased flexibility in neural network configurability.

According to a first aspect, According to a first aspect, the present disclosure relates to a method for processing picture feature data from a bitstream using a neural network comprising a plurality of neural network layers. The method comprises: obtaining the picture feature data from the bitstream; and processing the picture feature data using the neural network, wherein for each of one or more preconfigured positions within the neural network the processing comprises: determining, based on a gathering condition, whether or not to gather auxiliary data for processing by one of the plurality of neural network layers at said preconfigured position, and in case that it is determined that the auxiliary data is to be gathered, the processing with the layer at said preconfigured position is based on the auxiliary data.

The preconfigured positions are positions within the neural network at which the auxiliary information can be gathered. Whether or not the auxiliary information is actually gathered in a particular preconfigured position is determined in the above mentioned determination step. The term "position" refers to nodes within the neural network. Nodes correspond to feature tensors which are input to and/or output from layers (or blocks of layers or modules, depending on the architecture of the neural network). In particular, it may be specified by the number of neural network layers preceding the position in the processing direction.

The auxiliary information is any information related to the picture data or picture feature data added to the neural network. Such information may be input to the neural network to further improve the processing. Some particular examples of the auxiliary information are provided in the exemplary implementations below.

The gathering condition is a condition or prerequisite to be fulfilled in order for the auxiliary data to be input to a particular preconfigured position. The gathering condition may include a comparison with some picture characteristics or picture feature characteristics with a threshold to determine whether or not to gather the auxiliary information for a certain position. The picture characteristics or picture feature characteristics may be known to the encoder and the decoder so that no additional signaling is required. Alternatively or in addition, the gathering condition may be configured by an encoding side by means of setting an indicator of whether or not the auxiliary information is to be gathered for a preconfigures position. The indicator may be provided within a bitstream which is available at the decoder.

Configuring the position of inputting auxiliary information to a neural network has the effect of higher flexibility and enables dynamic neural network architecture change. Such flexibility may result to better adaption based on the gathering condition and lead to a more efficient encoding and/or decoding.

In a possible implementation, as a result of applying the gathering condition in the determining, said auxiliary data is to be gathered for a single one of the one or more preconfigured positions.

Such implementation provides similar effects as selecting, for a particular auxiliary information, the position in the neural network, at which the auxiliary information is to be gathered. This enables providing the auxiliary to that position which may be most suitable according some criteria, such as coding efficiency which may include processing time or complexity and/or rate or distortion.

In a possible alternative implementation, as a result of applying the gathering condition in the determining, said auxiliary data is to be gathered for more than one of said preconfigured positions.

Such implementation alternative to the foregoing implementation may ensure that the auxiliary information is available on any layer which may profit from it. It may further increase the configurability and thus flexibility of the network.

In a possible implementation, there are more than one of said preconfigured positions (said processing is performed for two or more preconfigured positions); the auxiliary data is scalable in size to match dimensions of an input channel processed by the layer at two or more of said preconfigured positions; and as a result of applying the gathering condition in the determining, said auxiliary data is i) gathered or ii) gathered and scaled for a single one of said preconfigured positions.

Accordingly, the auxiliary data may be properly scaled to enable its combination with the feature data. Such scaling enables provision of a great variety of auxiliary information which may come from different stages or sources.

In a possible implementation, the gathering condition is based on a picture characteristic or a picture feature data characteristic obtained from the bitstream.

This implementation enables content adaption of the neural network and may improve the performance of the encoding or decoding or other processing performed by the neural network.

In a possible implementation, the picture characteristic or the picture feature data characteristic includes resolution; and the gathering condition includes a comparison of the resolution with a preconfigured resolution threshold.

A resolution is a suitable decision basis, because it impacts the level of detailed features which, when further downsampled or otherwise lossy processed, may cause the quality to deteriorate.

In a possible implementation, the picture is a video picture and the picture characteristic includes picture type; and the gathering condition includes determining whether the picture type is a temporally predicted picture type or spatially predicted picture type.

A picture type is a suitable decision basis, because it impacts the quality of prediction. Moreover, it may be desirable to encode the intra picture with a higher quality, as it may also impact the inter pictures which typically make use of the intra-coded picture as a reference to temporal prediction.

According to an exemplary implementation, the method further comprises obtaining from the bitstream an indication specifying for the one or more preconfigured positions whether or not to gather the auxiliary data, and the gathering condition for each of the one or more preconfigured positions is as follows: if the indication specifies for said preconfigured position that the auxiliary data are to be gathered, then the determination is affirmative; and if the indication specifies for said preconfigured position that the auxiliary data are not to be gathered, then the determination is negative.

Explicit signaling of the gathering position(s) further increases the configurability and enables a closer adaption to the content of the picture, even if the predefined gathering condition(s) may not catch it.

In a possible implementation, the auxiliary data provides information about the picture feature data processed by the neural network to generate an output.

Provision of additional information about the picture feature data may improve the reconstruction processing and/or other kind of processing. Based on the processing type, different auxiliary information may be relevant and applied.

In a possible implementation, the auxiliary data includes prediction data which is a prediction of the picture or a prediction of picture feature data after processing by one or more of the layers of the neural network.

Moving picture (video) coding efficiency may highly depend on removing the temporal correlation from the adjacent pictures. Thus, provision or prediction data or prediction error data may improve the neural network processing.

In a possible implementation, the auxiliary data are a coupled pair of the prediction data and supplementary data to be combined with the prediction data.

Gathering the prediction and the prediction error in the same domain may provide a relatively simple and effective manner of gathering stage selection.

In a possible implementation, the prediction data and the supplementary data have dimensions of data processed by layers at mutually different positions in the neural network.

In other words, prediction may be provided in a stage different from the stage in which the prediction residuals or other supplementary information is provided. Thus, efficiency by better adapting to the content may be achieved.

In a possible implementation, the neural network includes a sub-network for lossless decoding with at least one layer; and the auxiliary data is input into said sub-network for lossless decoding.

Variable auto-encoders with hyper prior have been employed recently and may efficiently supported by the conditional gathering (based on the gathering condition) of the hyper prior. In some cases, it may be beneficial (lead to compacter bitstream) if the sub-network is used to derive the probability model parameters. In other cases, it may be computationally too expensive, in case the default or context based probability model already works well.

In a possible implementation, the neural network is trained to perform at least one of still picture decoding, video picture decoding, still picture filtering, video picture filtering, and machine vision processing including object detection, object recognition or object classification.

This implementation enables deployment of the methods described herein for many important applications which may profit from flexible auxiliary information position (and possibly also resolution).

In an embodiment, the method is performed for each of a plurality of auxiliary data, including first auxiliary data and second auxiliary data, wherein the first auxiliary data is associated with a first set of one or more preconfigured positions and the second auxiliary data is associated with a second set of one or more preconfigured positions.

This enables the neural network to gather more than one types of auxiliary information efficiently even if they are rather different, such as, e.g. prediction related auxiliary information and lossless coding relates auxiliary information which would be naturally employed in different positions.

In a possible implementation, the first set of one or more preconfigured positions and the second set of one or more preconfigured positions share at least one preconfigured position.

This is an exemplary implementation which may be suitable for some applications. For instance in case of prediction and prediction errors, all preconfigured positions may be shared.

In a possible implementation, the neural network is trained to perform the processing of video pictures; and the determining whether or not to gather auxiliary data for processing by a layer at said preconfigured position is performed every predetermined number of video pictures, wherein the predetermined number of video pictures is one or more.

Setting some granularity for the gathering position adaption may contribute to efficiency as it may involve less complexity and in some embodiments less signaling overhead.

According to a second aspect, the present invention relates to a method for processing a picture with a neural network comprising a plurality of neural network layers to generate a bitstream. The method comprises processing the picture with the neural network. The processing comprises for each of one or more preconfigured positions within the neural network: determining, based on a gathering condition, whether or not to gather auxiliary data for processing by a layer at said preconfigured position, and, in case that it is determined that the auxiliary data is to be gathered, the processing with the layer at said preconfigured position is based on the auxiliary data. The method further includes inserting into the bitstream data obtained processing the picture by the neural network.

The encoding part of the present disclosure may provide the same advantages as mentioned above for the decoding part. The encoder prepares the bitstream and provides it to the decoder so that the decoder may decode or reconstruct the data with the desired quality and application in mind.

In order to avoid redundancy, the advantages provided for the corresponding decoding processing claims apply for the encoding in a similar manner.

In a possible implementation, as a result of applying the gathering condition in the determining, said auxiliary data is to be gathered for a single one of the one or more preconfigured positions.

In a possible implementation, as a result of applying the gathering condition in the determining, said auxiliary data is to be gathered for more than one of said preconfigured positions.

In a possible implementation, there are more than one of said preconfigured positions (said processing is performed for two or more preconfigured positions); the auxiliary data is scalable in size to match dimensions of an input channel processed by the layer at two or more of said preconfigured positions; and as a result of applying the gathering condition in the determining, said auxiliary data is i) gathered or ii) gathered and scaled for a single one of said preconfigured positions.

In a possible implementation, the gathering condition is based on a picture characteristic or a picture feature data characteristic which is included into the bitstream.

In a possible implementation, the picture characteristic or the picture feature data characteristic includes resolution; and the gathering condition includes a comparison of the resolution with a preconfigured resolution threshold.

In a possible implementation, the picture is a video picture and the picture characteristic includes picture type; and the gathering condition includes determining whether the picture type is a temporally predicted picture type or spatially predicted picture type.

In some embodiments, the method further comprises generating the indication specifying for the one or more preconfigured positions whether or not to gather the auxiliary data, and including into the bitstream the indication.

According to an exemplary implementation, the method further comprises a step of selecting for the one or more preconfigured positions whether or not to gather the auxiliary data based on an optimization of a cost function including at least one of rate, distortion, accuracy, speed, or complexity.

Determination of the positions for gathering based on a cost function may improve the adaption of the neural network and the result to the desired requirements. Thus, such optimization may improve the performance. In combination with indicating the so obtained gathering position, the flexibility is further improved.

In a possible implementation, the auxiliary data provides information about the picture feature data processed by the neural network to generate an output.

In a possible implementation, the auxiliary data includes prediction data which is a prediction of the picture or a prediction of picture feature data after processing by one or more of the layers of the neural network.

In a possible implementation, the auxiliary data are a coupled pair of the prediction data and supplementary data to be combined with the prediction data.

In a possible implementation, the prediction data and the supplementary data have dimensions of data processed by layers at mutually different positions in the neural network.

In a possible implementation, the neural network includes a sub-network for lossless decoding with at least one layer; and the auxiliary data is input into said sub-network for lossless decoding.

In a possible implementation, the neural network is trained to perform at least one of still picture encoding, video picture encoding, still picture filtering, video picture filtering, and machine vision processing including object detection, object recognition or object classification.

According to an exemplary implementation, the method is performed for each of a plurality of auxiliary data, including first auxiliary data and second auxiliary data, wherein the first auxiliary data is associated with a first set of one or more preconfigured positions and the second auxiliary data is associated with a second set of one or more preconfigured positions.

In a possible implementation, the first set of one or more preconfigured positions and the second set of one or more preconfigured positions share at least one preconfigured position.

In a possible implementation, the neural network is trained to perform the processing of video pictures; and the determining whether or not to gather auxiliary data for processing by a layer at said preconfigured position is performed every predetermined number of video pictures, wherein the predetermined number of video pictures is one or more.

According to a third aspect, the present invention relates to an apparatus for processing picture feature data from a bitstream using a neural network comprising a plurality of neural network layers. The apparatus comprises processing circuitry configured to obtain the picture feature data from the bitstream; and process the picture feature data using the neural network, wherein for each of one or more preconfigured positions within the neural network. The processing comprises: determining, based on a gathering condition, whether or not to gather auxiliary data for processing by one of the plurality of neural network layers at said preconfigured position, and, in case that it is determined that the auxiliary data is to be gathered, the processing with the layer at said preconfigured position is based on the auxiliary data.

For advantageous effect of the present disclosure, refer to the descriptions of the first aspect. Details are not described herein again. The decoding apparatus has a function of implementing an action in the method example in the first aspect. The function may be implemented by hardware, or may be implemented by hardware executing corresponding software. The hardware or the software includes one or more modules corresponding to the foregoing function. In a possible implementation, the decoding apparatus includes: a feature data input module, configured to obtain the picture feature data from the bitstream; and a neural network module, configured to perform the above mentioned processing. These modules may perform corresponding functions in the method example in the first aspect. For details, refer to the detailed descriptions in the method example. Details are not described herein again.

According to a fourth aspect, the present invention relates to an apparatus for processing a picture with a neural network comprising a plurality of neural network layers to generate a bitstream. The apparatus comprising: processing circuitry configured to: process the picture with the neural network, wherein the processing comprises for each of one or more preconfigured positions within the neural network: determining, based on a gathering condition, whether or not to gather auxiliary data for processing by a layer at said preconfigured position, and, in case that it is determined that the auxiliary data is to be gathered, the processing with the layer at said preconfigured position is based on the auxiliary data; and insert into the bitstream data obtained processing the picture by the neural network.

For advantageous effect of the present invention, refer to the descriptions of the second aspect. Details are not described herein again. The encoding apparatus has a function of implementing an action in the method example in the second aspect. The function may be implemented by hardware, or may be implemented by hardware executing corresponding software. The hardware or the software includes one or more modules corresponding to the foregoing function. In a possible implementation, the encoding apparatus includes: a neural network module, configured to perform the above mentioned processing; and a bitstream output module, configured to insert into the bitstream data obtained processing the picture by the neural network and output the bitstream. These modules may perform corresponding functions in the method example in the second aspect. For details, refer to the detailed descriptions in the method example. Details are not described herein again.

The method according to the first aspect of the present invention may be performed by the apparatus according to the third aspect of the present invention. Other features and implementations of the method according to the first aspect of the present invention directly depend on functionalities and implementations of the apparatus according to the third aspect of the present invention.

The method according to the second aspect of the present invention may be performed by the apparatus according to the fourth aspect of the present invention. Other features and implementations of the method according to the second aspect of the present invention directly depend on functionalities and implementations of the apparatus according to the fourth aspect of the present invention.

According to a fifth aspect, the present invention relates to a video stream decoding apparatus, including a processor and a memory. The memory stores instructions that cause the processor to perform the method according to the first aspect.

According to a sixth aspect, the present invention relates to a video stream encoding apparatus, including a processor and a memory. The memory stores instructions that cause the processor to perform the method according to the second aspect.

According to a seventh aspect, a computer-readable storage medium having stored thereon instructions that when executed cause one or more processors to encode video data is proposed. The instructions cause the one or more processors to perform the method according to the first or second aspect or any possible embodiment of the first or second aspect.

According to an eighth aspect, the present invention relates to a computer program product including program code for performing the method according to the first or second aspect or any possible embodiment of the first or second aspect when executed on a computer.

Implementations in Software and Hardware

In the following embodiments of a video coding system 10, a video encoder 20 and a video decoder 30 are described based on FIG. 26 and FIG. 27.

Figure 26:
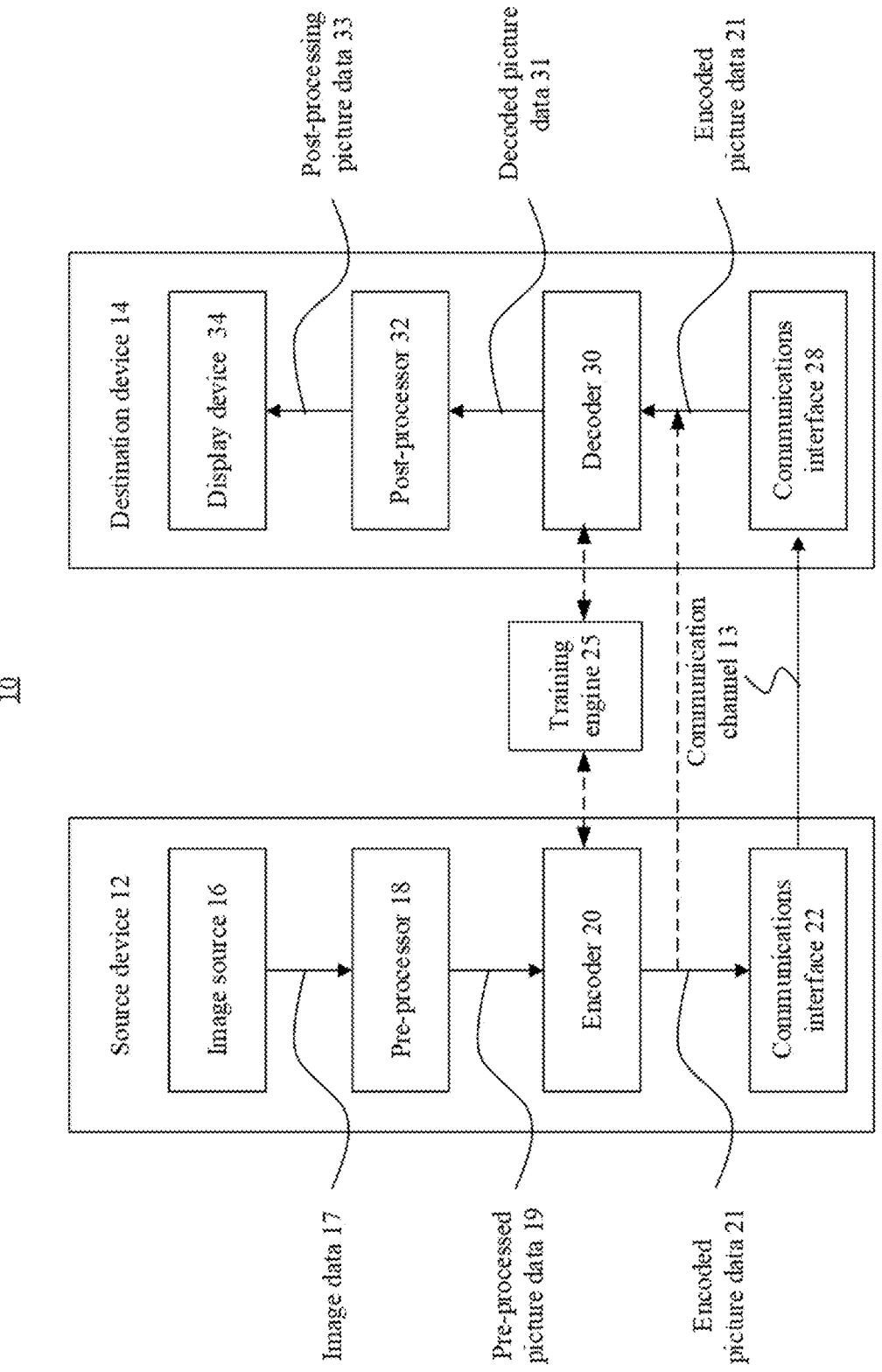
FIG. 26 is a block diagram showing an example of a video coding system configured to implement embodiments of the present invention, where the system uses a neural network to encode or decode a video picture.

FIG. 26 is a schematic block diagram illustrating an example coding system 10, for example, a video coding system 10 (or a coding system 10 for short) that may utilize techniques of this application. The video encoder 20 (or the encoder 20 for short) and the video decoder 30 (or the decoder 30 for short) of the video coding system 10 represent examples of devices that may be configured to perform techniques in accordance with various examples described in this application. The video encoder 20 and the video decoder 30 may be implemented using (including or being) a neural network as described in the above embodiments and examples. The remaining parts of the system 10 may be, but do not have to be implemented by the neural network.

As shown in FIG. 26, the coding system 10 includes a source device 12 configured to provide encoded picture data 21 for example, to a destination device 14 for decoding the encoded picture data 13.

The source device 12 includes an encoder 20, and may additionally, that is, optionally, include a picture source 16, a pre-processor (or pre-processing unit) 18, for example, a picture pre-processor 18, and a communications interface or communications unit 22.

The picture source 16 may include or be any type of picture capturing device, for example a camera for capturing a real-world picture, and/or any type of a picture generating device, for example a computer-graphics processor for generating a computer animated picture, or any type of other device for obtaining and/or providing a real-world picture, a computer generated picture (for example, a screen content, a virtual reality (VR) picture) and/or any combination thereof (for example, an augmented reality (AR) picture). The picture source may be any type of memory or storage storing any of the aforementioned pictures.

In distinction to the pre-processor 18 and the processing performed by the pre-processing unit 18, the picture or picture data 17 may also be referred to as raw picture or raw picture data 17.

The pre-processor 18 is configured to receive the (raw) picture data 17 and to perform pre-processing on the picture data 17 to obtain a pre-processed picture 19 or pre-processed picture data 19. Pre-processing performed by the pre-processor 18 may, for example, include trimming, color format conversion (for example, from RGB to YCbCr), color correction, or de-noising. It can be understood that the pre-processing unit 18 may be optional component. It may be understood that the pre-processing unit 18 may be an optional component.

The video encoder 20 is configured to receive the pre-processed picture data 19 and provide encoded picture data 21 (further details are described above 1 to 25).

A communications interface 22 of the source device 12 may be configured to receive the encoded picture data 21 and to transmit the encoded picture data 21 (or any further processed version thereof) over communication channel 13 to another device, for example, the destination device 14 or any other device, for storage or direct reconstruction.

The destination device 14 includes a decoder 30 (for example, a video decoder 30), and may additionally, that is, optionally, include a communications interface or communications unit 28, a post-processor 32 (or post-processing unit 32) and a display device 34.

The communications interface 28 of the destination device 14 is configured to receive the encoded picture data 21 (or any further processed version thereof), for example, directly from the source device 12 or from any other source, for example, a storage device, for example, an encoded picture data storage device, and provide the encoded picture data 21 to the decoder 30.

The communications interface 22 and the communications interface 28 may be configured to transmit or receive the encoded picture data 21 or encoded data 13 via a direct communication link between the source device 12 and the destination device 14, for example, a direct wired or wireless connection, or via any type of network, for example, a wired or wireless network or any combination thereof, or any type of private and public network, or any type of combination thereof.

The communications interface 22 may be, for example, configured to package the encoded picture data 21 into an appropriate format, for example, packets, and/or process the encoded picture data using any type of transmission encoding or processing for transmission over a communication link or communication network.

The communications interface 28, forming the counterpart of the communications interface 22, may be, for example, configured to receive the transmitted data and process the transmission data using any type of corresponding transmission decoding or processing and/or de-packaging to obtain the encoded picture data 21.

Both a communications interface 22 and a communications interface 28 may be configured as unidirectional communications interfaces as indicated by the arrow for the communication channel 13 in FIG. 26 pointing from the source device 12 to the destination device 14, or bi-directional communications interfaces, and may be configured, for example, to send and receive messages, for example, to set up a connection, to acknowledge and exchange any other information related to the communication link and/or data transmission, for example, encoded picture data transmission.

The video decoder (or decoder) 30 is configured to receive the encoded picture data 21 and provide decoded picture data 31 or a decoded picture 31 (further details are described above, for example, based on FIGS. 1 to 25).

The post-processor 32 of the destination device 14 is configured to post-process the decoded picture data 31 (also called reconstructed picture data), for example, the decoded picture 31, to obtain post-processed picture data 33, for example, a post-processed picture 33. The post-processing performed by the post-processing unit 32 may include, for example, color format conversion (for example, from YCbCr to RGB), color correction, trimming, or resampling, or any other processing, for example, for preparing the decoded picture data 31 for display, for example, by display device 34.

The display device 34 of the destination device 14 is configured to receive the post-processed picture data 33 for displaying the picture, for example, to a user or viewer. The display device 34 may be or include any type of display for representing the reconstructed picture, for example, an integrated or external display or monitor. For example, the display may include a liquid crystal display (liquid crystal display, LCD), an organic light emitting diode (organic light emitting diode, OLED) display, a plasma display, a projector, a micro LED display, a liquid crystal on silicon (liquid crystal on silicon, LCoS), a digital light processor (digital light processor, DLP), or any type of other display.

The coding system 10 further includes a training engine 25. The training engine 25 is configured to train the encoder 20 (especially the neural network module in the encoder 20) or the decoder 30 (especially a neural network module in the decoder 30) to process an input picture, a picture region, or a picture block. It is noted that the above described embodiments and examples were explained for a neural network processing pictures (sometimes referred to as frames). However, the present disclosure is also applicable to any other granularity: portions (regions) of the full pictures may be handles as pictures during the encoding and decoding.

It is noted that the training engine does not need to be provided in the system of the present disclosure, as the neural network based embodiments may employ a pre-trained network.

The training data may be stored in a database (not shown). The training engine 25 performs training based on the training data to obtain a target model (for example, the target model may be a neural network used for object recognition, object classification, picture segmentation or picture encoding and reconstruction, or the like). It should be noted that a source of the training data is not limited in this embodiment of this application. For example, the training data may be obtained from a cloud or another place to perform model training.

The target model obtained through training by the training engine 25 may be applied to the coding systems 10 and 40, for example, applied to the source device 12 (for example, the encoder 20) or the destination device 14 (for example, the decoder 30) shown in FIG. 26. The training engine 25 may obtain the target model through training on the cloud, and the coding system 10 downloads the target model from the cloud and uses the target model. Alternatively, the training engine 25 may obtain the target model through training on the cloud and use the target model, and the coding system 10 directly obtains a processing result from the cloud.

Although FIG. 26 depicts the source device 12 and the destination device 14 as separate devices, embodiments of devices may also include both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 26 may vary depending on the actual device and application.

Figure 27:
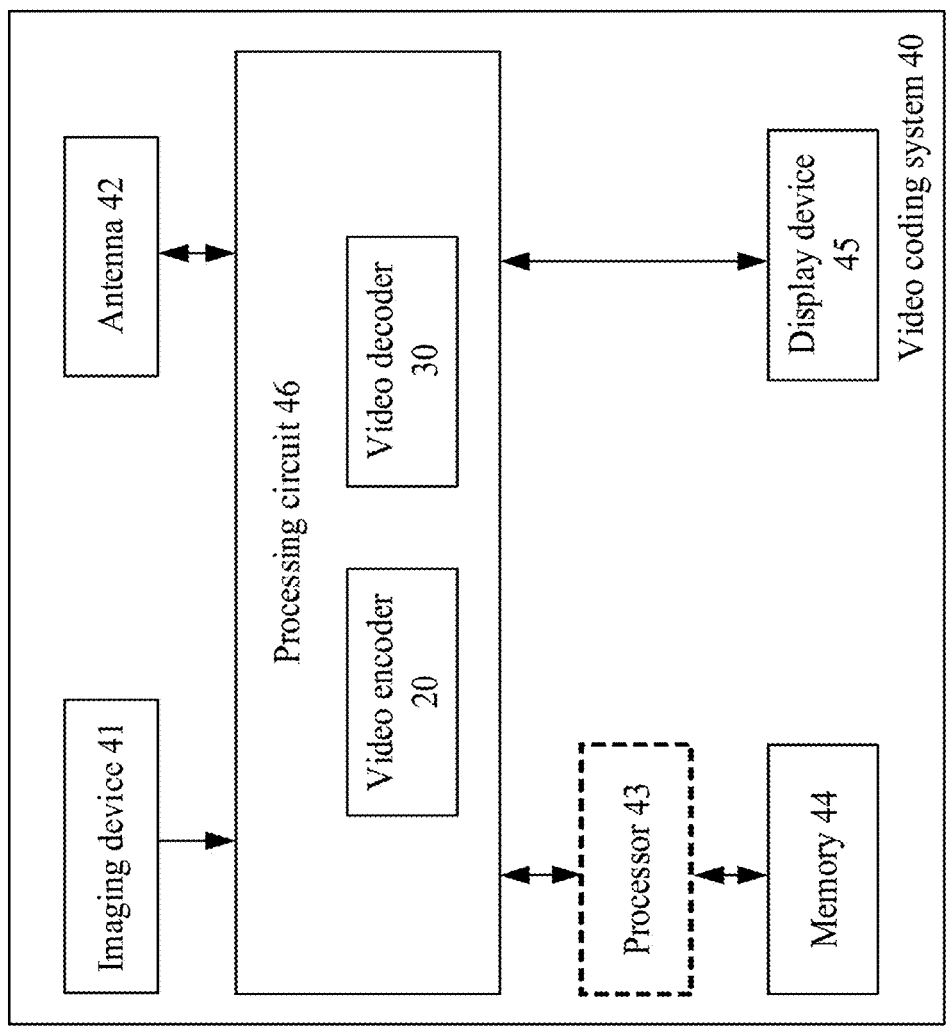
FIG. 27 is a block diagram showing another example of a video coding system configured to implement embodiments of the present invention, where a video encoder and/or a video decoder uses a neural network to encode or decode a video picture.
Figure 29:
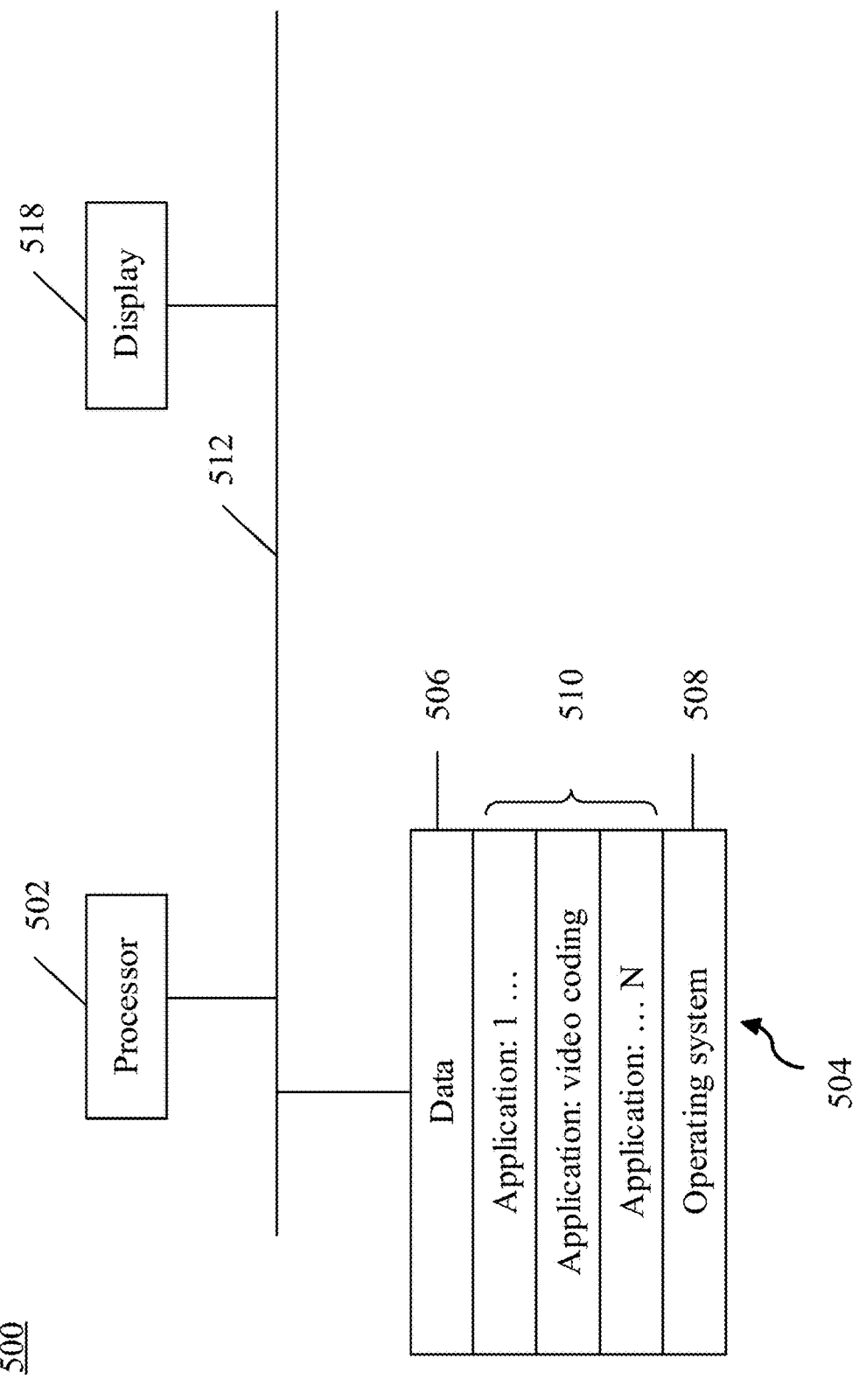
FIG. 29 is a block diagram illustrating a video coding apparatus configured to implement embodiments of the present invention.

The encoder 20 (for example, the video encoder 20) or the decoder 30 (for example, the decoder 30) or both the encoder 20 and the decoder 30 may be implemented via processing circuit as shown in FIG. 27, such as one or more microprocessors, digital signal processors (digital signal processors, DSPs), application-specific integrated circuits (application-specific integrated circuits, ASICs), field-programmable gate arrays (field-programmable gate arrays, FPGAs), discrete logic, hardware, video coding dedicated or any combinations thereof. The encoder 20 may be implemented via a processing circuit 46 to embody the various modules as discussed with respect to the encoder 20 and/or any other encoder system or subsystem described herein. The decoder 30 may be implemented via the processing circuit 46 to embody the various modules as discussed with respect to the decoder 30 and/or any other decoder system or subsystem described herein. The processing circuit may be configured to perform the various operations as discussed later. As shown in FIG. 29, if the techniques are implemented partially in software, a device may store instructions for the software in a suitable, non-transitory computer-readable storage medium and may execute the instructions in hardware using one or more processors to perform the techniques of the present invention. Either of the video encoder 20 and the video decoder 30 may be integrated as part of a combined encoder/decoder (encoder/decoder, CODEC) in a single device, for example, as shown in FIG. 27.

The source device 12 and the destination device 14 may include any of a wide range of devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any type of operating system. In some cases, the source device 12 and the destination device 14 may be equipped for wireless communication. Therefore, the source device 12 and the destination device 14 may be wireless communications devices.

In some cases, the video coding system 10 illustrated in FIG. 26 is merely an example and the techniques of the present application may apply to video coding settings (for example, video encoding or video decoding) that do not necessarily include any data communication between the encoding and decoding devices. In other examples, data is retrieved from a local memory, streamed over a network, or the like. A video encoding device may encode data and store encoded data into the memory, and/or a video decoding device may retrieve data from the memory and decode the data. In some examples, the encoding and decoding is performed by devices that do not communicate with one another, but simply encode data to memory and/or retrieve and decode data from memory.

FIG. 27 is an illustrative diagram of an example of a video coding system 40, including the encoder 20 and/or the decoder 30, according to an example embodiment. The video coding system 40 may include an imaging device 41, the video encoder 20, the video decoder 30 (and/or a video encoder/decoder implemented by the processing circuit 46), an antenna 42, one or more processors 43, one or more memories 44, and/or a display device 45.

As shown in FIG. 27, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include application-specific integrated circuit (application-specific integrated circuit, ASIC) logic, a graphics processor, a general-purpose processor, or the like. The video coding system 40 may also include the optional processor 43. The optional processor 43 may similarly include application-specific integrated circuit (application-specific integrated circuit, ASIC) logic, a graphics processor, a general-purpose processor, or the like. In addition, the memory 44 may be a memory of any type, for example, a volatile memory (for example, a static random access memory (static random access memory, SRAM) or a dynamic random access memory (dynamic random access memory, DRAM)) or a nonvolatile memory (for example, a flash memory). In a non-limitative example, the memory 44 may be implemented by a cache memory. In other examples, the logic circuit 47 and/or the processing circuit 46 may include a memory (for example, a cache) for implementing a picture buffer.

In some examples, the video encoder 20 implemented by using the logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may include video encoder 20 as implemented via logic circuitry 46 to embody the various functional modules as described herein. The logic circuit may be configured to perform various operations described in this specification.

In some examples, the decoder 30 may be implemented by the logic circuit 46 in a similar manner, to implement various modules that are described with reference to the decoder 30 and/or any other decoder system or subsystem described in this specification. In some examples, the decoder 30 implemented by using the logic circuit may include a picture buffer (which is implemented by the processing circuit 44 or the memory 44) and a graphics processing unit (which is implemented by, for example, the processing circuit 46). The graphics processing unit may be communicatively coupled to the picture buffer. The graphics processing unit may include video encoder 30 as implemented via logic circuitry 46 to embody the various modules described herein.

In some examples, the antenna 42 may be configured to receive an encoded bitstream of video data. As described, the encoded bitstream may include data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that in this embodiment of this application, for the example described with reference to the encoder 20, the decoder 30 may be configured to perform a reverse process. With regard to a signaling syntax element, the decoder 30 may be configured to receive and parse such a syntax element and correspondingly decode related video data. In some examples, the encoder 20 may entropy encode the syntax element into an encoded video bitstream. In such examples, video decoder 30 may parse such syntax element and decode the associated video data accordingly.

Figure 28:
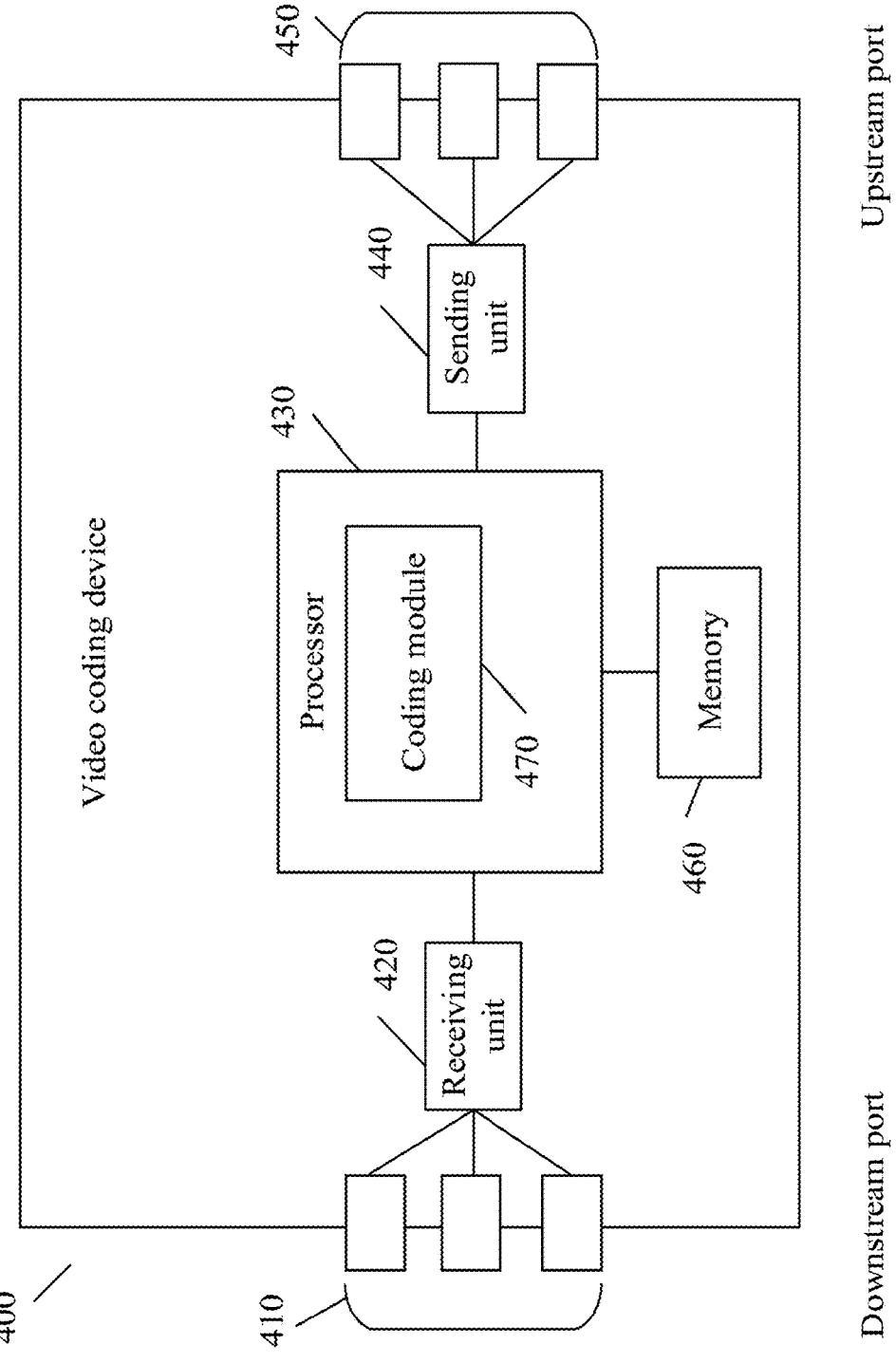
FIG. 28 is a block diagram illustrating a video coding apparatus configured to implement embodiments of the present invention.

FIG. 28 is a schematic diagram of a video coding device 400 according to an embodiment of the disclosure. The video coding device 400 is suitable for implementing the disclosed embodiments as described herein. In an embodiment, the video coding device 400 may be a decoder such as the video decoder 30 of FIG. 26 or an encoder such as the video encoder 20 of FIG. 26. As mentioned above, when referring to the picture (video) encoder and decoder herein, it is not necessarily an encoder and decoder providing picture data encoding decoding including reconstruction for a human viewer. Rather, the encoder may provide bitstream and the decoder may decode picture data or picture feature data to be used in computer vision tasks.

The video coding device 400 includes ingress ports 410 (or input ports 410) and receiver units (receiver unit, Rx) 420 for receiving data; a processor, logic unit, or central processing unit (central processing unit, CPU) 430 to process the data; transmitter units (transmitter unit, Tx) 440 and egress ports 450 (or output ports 450) for transmitting the data; and a memory 460 for storing the data. The video coding device 400 may also include optical-to-electrical (optical-to-electrical, OE) components and electrical-to-optical (electrical-to-optical, EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 is in communication with the ingress ports 410, the receiver units 420, the transmitter units 440, the egress ports 450, and the memory 460. The processor 430 includes a coding module 470 (for example, a neural network NN-based coding module 470). The coding module 470 implements the disclosed embodiments described above. For instance, the coding module 470 implements, processes, prepares, or provides the various coding operations. Therefore, inclusion of the encoding/decoding module 470 provides a substantial improvement to functions of the video coding device 400 and affects a switching of the video coding device 400 to a different state. Alternatively, the coding module 470 is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or non-volatile and may be read-only memory (read-only memory, ROM), random access memory (random access memory, RAM), ternary content-addressable memory (ternary content-addressable memory, TCAM), and/or static random-access memory (static random-access memory, SRAM).

FIG. 29 is a simplified block diagram of an apparatus 500 that may be used as either or both of the source device 12 and the destination device 14 in FIG. 26 according to an exemplary embodiment.

The processor 502 in the apparatus 500 may be a central processing unit. Alternatively, the processor 502 may be any other type of device, or multiple devices, capable of manipulating or processing information now-existing or hereafter developed. Although the disclosed implementations may be practiced with a single processor as shown, for example, the processor 502, advantages in speed and efficiency can be achieved using more than one processor.

A memory 504 in the apparatus 500 may be a read-only memory (read-only memory, ROM) device or a random access memory (random access memory, RAM) device in an implementation. Any other suitable type of storage device may be used as the memory 504. The memory 504 may include code and data 506 that is accessed by the processor 502 using a bus 512. The memory 504 may further include an operating system 508 and application programs 510, where the application programs 510 include at least one program that permits the processor 502 to perform the methods described here. For example, the application programs 510 may include applications 1 through N, which further include a video coding application that performs the methods described here.

The apparatus 500 may also include one or more output devices, such as a display 518. The display 518 may be, in one example, a touch sensitive display that combines a display with a touch sensitive element that is operable to sense touch inputs. The display 518 may be coupled to the processor 502 via the bus 512.

Although depicted here as a single bus, the bus 512 of the apparatus 500 can be composed of multiple buses. Further, a secondary storage 514 may be directly coupled to the other components of the apparatus 500 or may be accessed via a network and may include a single integrated unit such as a memory card or multiple units such as multiple memory cards. The apparatus 500 may thus be implemented in a wide variety of configurations.

The embodiments of this application relate to application of a neural network. For ease of understanding, the following first explains some nouns or terms used in the embodiments of this application. The nouns or terms are also used as a part of contents of the present invention.

(1) Neural Network

A neural network (neural Network, NN) is a machine learning model. The neural network may include neurons. The neuron may be an operation unit that uses $x_s$ and an intercept of 1 as inputs, where an output of the operation unit may be as follows:

$$h_{W,b}(x) = f(W^T x) = f\left(\sum_{s=1}^{n} W_s x_s + b\right) \qquad (1\text{-}1)$$

where, $s=1, 2, \ldots$, or n, n is a natural number greater than 1, $W_s$ is a weight of $x_s$, and b is bias of the neuron. f is an activation function (activation function) of the neuron, and the activation function is used to introduce a non-linear feature into the neural network, to convert an input signal in the neuron into an output signal. The output signal of the activation function may be used as an input of a next convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (deep neural network, DNN), also referred to as a multi-layer neural network, may be understood as a neural network having many hidden layers. The "many" herein does not have a special measurement standard. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron at the ith layer is certainly connected to any neuron at the (i+1)th layer. Although the DNN seems to be complex, the DNN is actually not complex in terms of work at each layer, and is simply expressed as the following linear relationship expression: $\vec{y} = \alpha(W\vec{x} + \vec{b})$, where $\vec{x}$ is an input vector, $\vec{y}$ is an output vector, $\vec{b}$ is a bias vector, W is a weight matrix (also referred to as a coefficient), and $\alpha(\ )$ is an activation function. At each layer, the output vector $\vec{y}$ is obtained by performing such a simple operation on the input vector $\vec{x}$. Because there are many layers in the DNN, there are also many coefficients W and bias vectors $\vec{b}$. Definitions of these parameters in the DNN are as follows: The coefficient W is used as an example. It is assumed that in a three-layer DNN, a linear coefficient from the fourth neuron at the second layer to the second neuron at the third layer is defined as $$w_{24}^3$$

The superscript 3 represents a layer at which the coefficient W is located, and the subscript corresponds to an output third-layer index 2 and an input second-layer index 4. In conclusion, a coefficient from the kth neuron at the (L−1)th layer to the jth neuron at the Lth layer is defined as $$W_{jk}^i.$$

It should be noted that there is no parameter W at the input layer. In the deep neural network, more hidden layers make the network more capable of describing a complex case in the real world. Theoretically, a model with a larger quantity of parameters indicates higher complexity and a larger "capacity", and indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

(3) Convolutional Neural Network

A convolutional neural network (convolutional neuron network, CNN) is a deep neural network with a convolutional structure, and is a deep learning (deep learning) architecture. In the deep learning architecture, multi-layer learning is performed at different abstract levels by using a machine learning algorithm. As a deep learning architecture, the CNN is a feed-forward (feed-forward) artificial neural network. A neuron in the feed-forward artificial neural network may respond to a picture input into the neuron. The convolutional neural network includes a feature extractor constituted by a convolutional layer and a pooling layer. The feature extractor may be considered as a filter. A convolution process may be considered as using a trainable filter to perform convolution on an input image or a convolutional feature plane (feature map).

The convolutional layer is a neuron layer that is in the convolutional neural network and at which convolution processing is performed on an input signal. The convolutional layer 221 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride (stride)) in a horizontal direction on the input image, to extract a specific feature from the image. A size of the weight matrix should be related to a size of the picture. It should be noted that a depth dimension (depth dimension) of the weight matrix is the same as a depth dimension of the input picture. During a convolution operation, the weight matrix extends to an entire depth of the input picture. Therefore, a convolutional output of a single depth dimension is generated through convolution with a single weight matrix. However, in most cases, a single weight matrix is not used, but a plurality of weight matrices with a same size (rows x columns), namely, a plurality of same-type matrices, are applied. Outputs of the weight matrices are stacked to form a depth dimension of a convolutional picture. The dimension herein may be understood as being determined based on the foregoing "plurality". Different weight matrices may be used to extract different features from the picture. For example, one weight matrix is used to extract edge information of the picture, another weight matrix is used to extract a specific color of the picture, and a further weight matrix is used to blur unneeded noise in the picture. Sizes of the plurality of weight matrices (rows× columns) are the same. Sizes of feature maps extracted from the plurality of weight matrices with the same size are also the same, and then the plurality of extracted feature maps with the same size are combined to form an output of the convolution operation. Weight values in these weight matrices need to be obtained through massive training in actual application. Each weight matrix formed by using the weight values obtained through training may be used to extract information from the input image, to enable the convolutional neural network to perform correct prediction. When the convolutional neural network has a plurality of convolutional layers, a relatively large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

A quantity of training parameters often needs to be reduced. Therefore, a pooling layer often needs to be periodically introduced after a convolutional layer. One convolutional layer may be followed by one pooling layer, or a plurality of convolutional layers may be followed by one or more pooling layers. During picture processing, the pooling layer is only used to reduce a space size of the picture. The pooling layer may include an average pooling operator and/or a maximum pooling operator, to perform sampling on the input picture to obtain a picture with a relatively small size. The average pooling operator may be used to calculate pixel values in the picture in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input to the pooling layer. Each pixel in the picture output from the pooling layer represents an average value or a maximum value of a corresponding sub-region of the picture input to the pooling layer.

After processing performed at the convolutional layer/pooling layer, the convolutional neural network is not ready to output required output information, because as described above, at the convolutional layer/pooling layer, only a feature is extracted, and parameters resulting from the input image are reduced. However, to generate final output information (required class information or other related information), the convolutional neural network needs to use the neural network layer to generate an output of one required class or a group of required classes. Therefore, the convolutional neural network layer may include a plurality of hidden layers. Parameters included in the plurality of hidden layers may be obtained through pre-training based on related training data of a specific task type. For example, the task type may include image recognition, image classification, and super-resolution image reconstruction.

Optionally, at the neural network layer, the plurality of hidden layers are followed by the output layer of the entire convolutional neural network. The output layer has a loss function similar to a categorical cross entropy, and the loss function is specifically used to calculate a prediction error. Once forward propagation of the entire convolutional neural network is completed, backward propagation is started to update a weight value and a deviation of each layer mentioned above, to reduce a loss of the convolutional neural network and an error between a result output by the convolutional neural network by using the output layer and an ideal result.

(4) Recurrent Neural Network

A recurrent neural network (recurrent neural network, RNN) is used to process sequence data. In a conventional neural network model, from an input layer to a hidden layer and then to an output layer, the layers are fully connected, and nodes at each layer are not connected. Such a common neural network resolves many difficult problems, but is still incapable of resolving many other problems. For example, if a word in a sentence is to be predicted, a previous word usually needs to be used, because adjacent words in the sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error backward propagation algorithm is also used, but there is a difference: If the RNN is expanded, a parameter such as W of the RNN is shared. This is different from the conventional neural network described in the foregoing example. In addition, during use of a gradient descent algorithm, an output in each step depends not only on a network in a current step, but also on a network status in several previous steps. The learning algorithm is referred to as a backward propagation through time (backward propagation through time, BPTT) algorithm.

Now that there is a convolutional neural network, why is the recurrent neural network required? A reason is simple. In the convolutional neural network, it is assumed that elements are independent of each other, and an input and an output are also independent, such as a cat and a dog. However, in the real world, many elements are interconnected. For example, stocks change with time. For another example, a person says: I like traveling, and my favorite place is Yunnan. I will go if there is a chance. Herein, people should know that the person will go to "Yunnan". A reason is that the people can deduce the answer based on content of the context. However, how can a machine do this? The RNN emerges. The RNN is intended to make the machine capable of memorizing like a human. Therefore, an output of the RNN needs to depend on current input information and historical memorized information.

(5) Recursive Residual Convolutional Neural Network (Recursive Residual Convolutional Neuron Network, RR-CNN)

(5) Artificial Neural Network (Artificial Neural Network, ANN)

(6) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between a predicted value and a target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(7) Backward Propagation Algorithm

The convolutional neural network may correct a value of a parameter in an initial super-resolution model in a training process according to an error backward propagation (backward propagation, BP) algorithm, so that an error loss of reconstructing the super-resolution model becomes smaller. Specifically, an input signal is transferred forward until an error loss occurs at an output, and the parameter in the initial super-resolution model is updated based on backward propagation error loss information, to make the error loss converge. The backward propagation algorithm is an error-loss-centered backward propagation motion intended to obtain a parameter, such as a weight matrix, of an optimal super-resolution model.

(8) Generative Adversarial Network

A generative adversarial network (generative adversarial networks, GAN) is a deep learning model. The model includes at least two modules: a generative model (generative model) and a discriminative model (discriminative model). The two modules learn from each other, to generate a better output. Both the generative model and the discriminative model may be neural networks, and may specifically be deep neural networks or convolutional neural networks. A basic principle of the GAN is as follows: Using a GAN for generating a picture as an example, it is assumed that there are two networks: G (Generator) and D (Discriminator). G is a network for generating a picture. G receives random noise z, and generates the picture by using the noise, where the picture is denoted as G(z). D is a discriminator network used to determine whether a picture is "real". An input parameter of D is x, x represents a picture, and an output D(x) represents a probability that x is a real picture. If a value of D(x) is 1, it indicates that the picture is 100% real. If the value of D(x) is 0, it indicates that the picture cannot be real. In a process of training the generative adversarial network, an objective of the generative network G is to generate a picture that is as real as possible to deceive the discriminative network D, and an objective of the discriminative network D is to distinguish between the picture generated by G and a real picture as much as possible. In this way, a dynamic "gaming" process, to be specific, "adversary" in the "generative adversarial network", exists between G and D. A final gaming result is that in an ideal state, G may generate a picture G(z) that is to be difficultly distinguished from a real picture, and it is difficult for D to determine whether the picture generated by G is real, to be specific, D(G(z))=0.5. In this way, an excellent generative model G is obtained, and can be used to generate a picture.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (digital subscriber line, DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (compact disc, CD), a laser disc, an optical disc, a digital versatile disc (digital versatile disc, DVD), and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (digital signal processor, DSP), general-purpose microprocessors, application-specific integrated circuits (application-specific integrated circuit, ASIC), field programmable gate arrays (field programmable gate array, FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (integrated circuit, IC), or a set of ICs (for example, a chip set). Various components, modules, or units are described in this application to emphasize functional aspects of the apparatuses configured to implement the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

Summarizing, the present disclosure provides methods and apparatuses for processing of picture data or picture feature data using a neural network with two or more layers. The present disclosure may be applied in the field of artificial intelligence (AI)-based video or picture compression technologies, and in particular, to the field of neural network-based video compression technologies. According to some embodiments, two kinds of data are combined during the processing including processing by the neural network. The two kinds of data are obtained from different stages of processing by the network. Some of the advantages may include greater scalability and a more flexible design of the neural network architecture which may further lead to better encoding/decoding performance.

What is claimed is:

1. A method for processing feature data of one or more pictures from a bitstream using a neural network which comprises two or more stages including a first stage and a second stage, the method comprising:

obtaining first data based on the bitstream, processing the first data using the neural network including:

obtaining second data, which is based on data processed previously by the neural network, from the second stage of the neural network, and using the first data together with the second data to generate input to the first stage of the neural network, wherein the first stage precedes the second stage in the feature data processing of the neural network; and outputting the result of the processing, wherein the first data is obtained in a third stage of the neural network preceding the first stage and the second stage or equal to the first stage in the feature data processing of the neural network.

2. The method according to claim 1, wherein the first data represents a prediction error and the second data represents a prediction.

3. The method according to claim 2, wherein the prediction is obtained by:

obtaining reference feature data which is feature data outputted by the neural network at said second stage, obtaining, based on the bitstream, prediction information including motion information or spatial information related to the reference feature data, generating the prediction based on the reference feature data and the prediction information.

4. The method according to claim 3, wherein the prediction error is obtained by processing a current picture with the neural network;

the prediction information is motion information and the reference feature data is generated by the neural network processing of picture data representing picture preceding the current picture in decoding order.

5. The method according to claim 4, wherein the motion information includes motion vectors.

6. The method according to claim 2, wherein the using the first data together with the second data includes element-wise addition of the prediction or re-scaled prediction with the prediction error or re-scaled prediction error.

7. The method according to claim 1, wherein said second stage is the output of the neural network.

8. The method according to claim 1, wherein the first stage is the input of the neural network.

9. The method according to claim 1, wherein the first stage is input of the neural network;

the first data is entropy encoded data;

the second stage is a stage different from the output stage of the neural network; and the second data is probability model data related to the feature data of the second stage, wherein the second data is probability model data for the entropy decoding of the first data.

10. The method according to claim 1, wherein the position of the first stage and/or the second stage are configurable within the neural network, and the method comprises configuring the position of the first stage and/or the second stage according to a gathering condition based on one or more picture coding parameters.

11. The method according to claim 1, further comprising parsing from the bitstream an stage selection indicator specifying said first stage and/or said second stage, wherein the position of the first stage and the second stage within the neural network is configured according to the parsed stage selection indicator.

12. The method according to claim 1, wherein:

the position of said first stage and/or said second stage are configurable within the neural network, and the method comprises configuring the position of said first stage and/or said second stage according to a gathering condition based on one or more picture coding parameters.

13. A computer program stored on a computer-readable, non-transitory medium and including code instructions which, when executed on one or more processors, cause the one or more processors to perform the method according to claim 1.

14. A method for processing at least one picture using a neural network, which comprises two or more stages including a first stage and a second stage, to generate a bitstream, the method comprising:

processing the at least one picture with the neural network including:

obtaining first data based on the at least one picture, and obtaining second data at said second stage of the processing, the second data being based on data processed previously by the neural network;

using the first data together with the second data to generate input at said first stage of the neural network, wherein the first stage precedes the second stage in the feature data processing of the neural network; and including into the bitstream feature data obtained by the processing, wherein the first data is obtained in a third stage of the neural network preceding said first stage and said second stage or equal to said first stage in the feature data processing of the neural network.

15. The method according to claim 14, wherein the first data represents a prediction error and the second data represents a prediction.

16. The method according to claim 15, wherein the prediction is obtained by:

obtaining reference feature data which is feature data outputted by the neural network at said second stage, obtaining, based on the at least one picture, prediction information including motion information or spatial information related to the reference feature data, generating the prediction based on the reference feature data and the prediction information, and inserting the obtained prediction information into the bitstream, wherein the prediction error is obtained by processing a current picture with the neural network, and wherein the prediction information is motion information and the reference feature data is generated by the neural network processing of picture data representing picture preceding the current picture in decoding order.

17. The method according to claim 16, wherein the motion information includes motion vectors.

18. The method according to claim 15, wherein the using the first data together with the second data includes element-wise subtraction of the prediction or re-scaled prediction from the first data or or re-scaled first data.

19. The method according to any of claim 14, wherein said second stage is the output of the decoding neural network representing reconstructed picture data.

20. The method according to any of claim 14, wherein said first stage is the output of the neural network.

21. The method according to claim 14, wherein the first stage is output of the neural network;

the first data is processed data to be entropy encoded;

the second stage is a stage different from the input stage of the neural network; and the second data is probability model data related to the feature data of the second stage, wherein the second data is probability model data for the entropy encoding of the first data.

22. An apparatus for processing feature data of one or more pictures from a bitstream using a neural network which comprises two or more stages including a first stage and a second stage, the apparatus comprising:

processing circuitry configured to:

obtain first data based on the bitstream;

process the first data using the neural network including:

obtaining second data, which is based on data processed previously by the neural network, from the second stage of the neural network, and using the first data together with the second data to generate input to the first stage of the neural network, wherein the first stage precedes the second stage in the feature data processing of the neural network; and output the result of the processing, wherein the first data is obtained in a third stage of the neural network preceding the first stage and the second stage or equal to the first stage in the feature data processing of the neural network.

23. An apparatus for processing at least one picture using a neural network, which comprises two or more stages including a first stage and a second stage, to generate a bitstream, the apparatus comprising:

processing circuitry configured to:

process the at least one picture with the neural network including:

obtaining first data based on the at least one picture, and obtaining second data at said second stage of the processing, the second data being based on data processed previously by the neural network;

use the first data together with the second data to generate input at said first stage of the neural network, wherein the first stage precedes the second stage in the feature data processing of the neural network; and include into the bitstream feature data obtained by the processing, wherein the first data is obtained in a third stage of the neural network preceding said first stage and said second stage or equal to said first stage in the feature data processing of the neural network.

* * * * *